US005790831A

United States Patent [19]
Lin et al.

[11] Patent Number: 5,790,831
[45] Date of Patent: Aug. 4, 1998

[54] VL-BUS/PCI-BUS BRIDGE

[75] Inventors: Fong Lu (David) Lin, San Jose; Cherng-Yeuan (Henry) Tsay, Pleasanton; David H. Doan, San Jose, all of Calif.

[73] Assignee: Opti Inc., Milpitas, Calif.

[21] Appl. No.: 715,901

[22] Filed: Sep. 18, 1996

Related U.S. Application Data

[63] Continuation of Ser. No. 332,858, Nov. 1, 1994, abandoned.

[51] Int. Cl.$^6$ .................... G06F 13/14; G06F 13/42
[52] U.S. Cl. .................. 395/500; 364/240; 364/240.8; 364/240.5; 364/DIG. 1
[58] Field of Search ........................ 395/500, 309, 395/311

[56] References Cited

U.S. PATENT DOCUMENTS

| | | | |
|---|---|---|---|
| 5,218,690 | 6/1993 | Boioli et al. | 395/500 |
| 5,309,568 | 5/1994 | Ghosh et al. | 395/325 |
| 5,335,326 | 8/1994 | Nguyen et al. | 395/250 |
| 5,379,384 | 1/1995 | Solomon | 395/325 |
| 5,446,869 | 8/1995 | Padgett et al. | 395/500 |
| 5,448,704 | 9/1995 | Spaniol et al. | 395/310 |
| 5,455,915 | 10/1995 | Coke | 395/325 |

OTHER PUBLICATIONS

Acer Laboratories, Inc., "M1429G/M1431/M1435", Datasheet (Oct. 1993).
Acer Laboratories, Inc., "M1435 PCI–VL Bus Bridge", Preliminary Data Sheet (Sep. 20, 1993), pp.1–7, 13–14.
Acer Laboratories, Inc., "Pentium Solution of ALI", ALI Pentium Seminar (1994).
Slater, Michael, et al., "Local Buses Poised to Enter PC Mainstream — Intel's PCI and VESA's VL–Bus Vie for Vendors' Attention", Microprocessor Report (Jul. 2, 1992), pp. 7–13.
Intel Corporation, "i486™ Microprocessor", Databook (Nov. 1989).
Intel Corporation, "82434LX/82434NX PCI, Cache and Memory Controller (PCMC)", Advance Information (Mar. 1994), pp. 1–30, 70–104.

*Primary Examiner*—Kevin J. Teska
*Assistant Examiner*—Ayni Mohamed
*Attorney, Agent, or Firm*—Fliesler, Dubb, Meyer & Lovejoy

[57] ABSTRACT

A PCI-bus is added to a VESA local bus (VL-bus) computer system using a VL-bus/PCI-bus bridge. The VL-bus/PCI-bus bridge claims a VL-bus cycle by asserting LDEV# to the VL-bus/system-bus bridge. If no other VL-bus device claims the cycle as well, then the VL-bus/PCI-bus bridge translates the cycle onto the PCI-bus and awaits a response from a PCI device. If no PCI device claims a cycle by the PCI-bus device claiming deadline, then the VL-bus/PCI-bus bridge asserts BOFF# to the host and suppresses its assertion of LDEV# when the host repeats the cycle on the VL-bus. The VL-bus/system-bus bridge therefore can translate the repetition of the cycle onto the system bus. When asserting BOFF# to the host, the VL-bus/PCI-bus bridge also asserts the VL-bus device ready signal LRDY# after assertion of BOFF# and releases LRDY# before releasing BOFF#. The VL-bus controller does not receive BOFF# necessarily, but responds to LRDY# by asserting RDYRTN# onto the VL-bus, thereby signifying to all other VL-bus devices that the VL-bus cycle has ended and permitting them to restart their state machines in anticipation of a new VL-bus cycle. The host ignores RDYRTN# while, and only while, BOFF# is asserted.

33 Claims, 15 Drawing Sheets

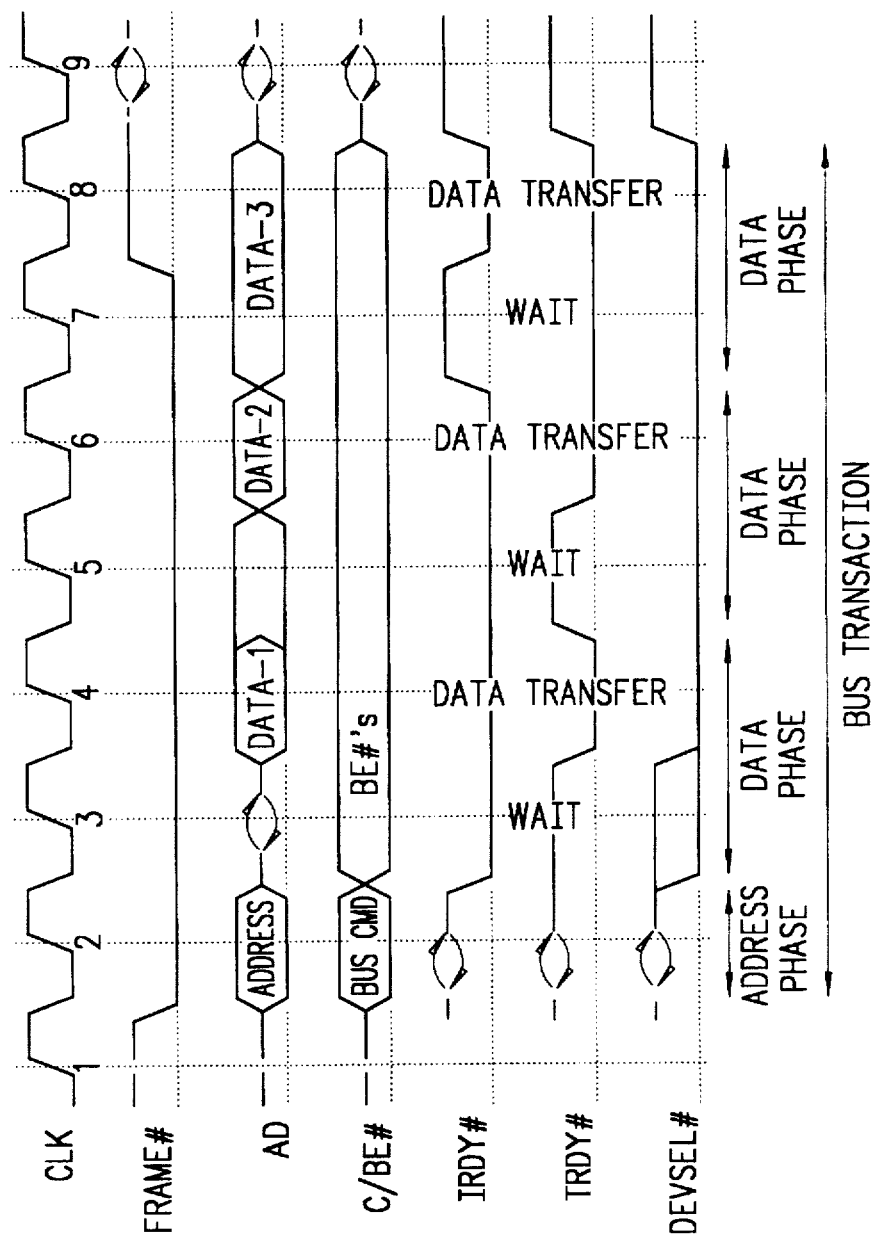
FIG. B1

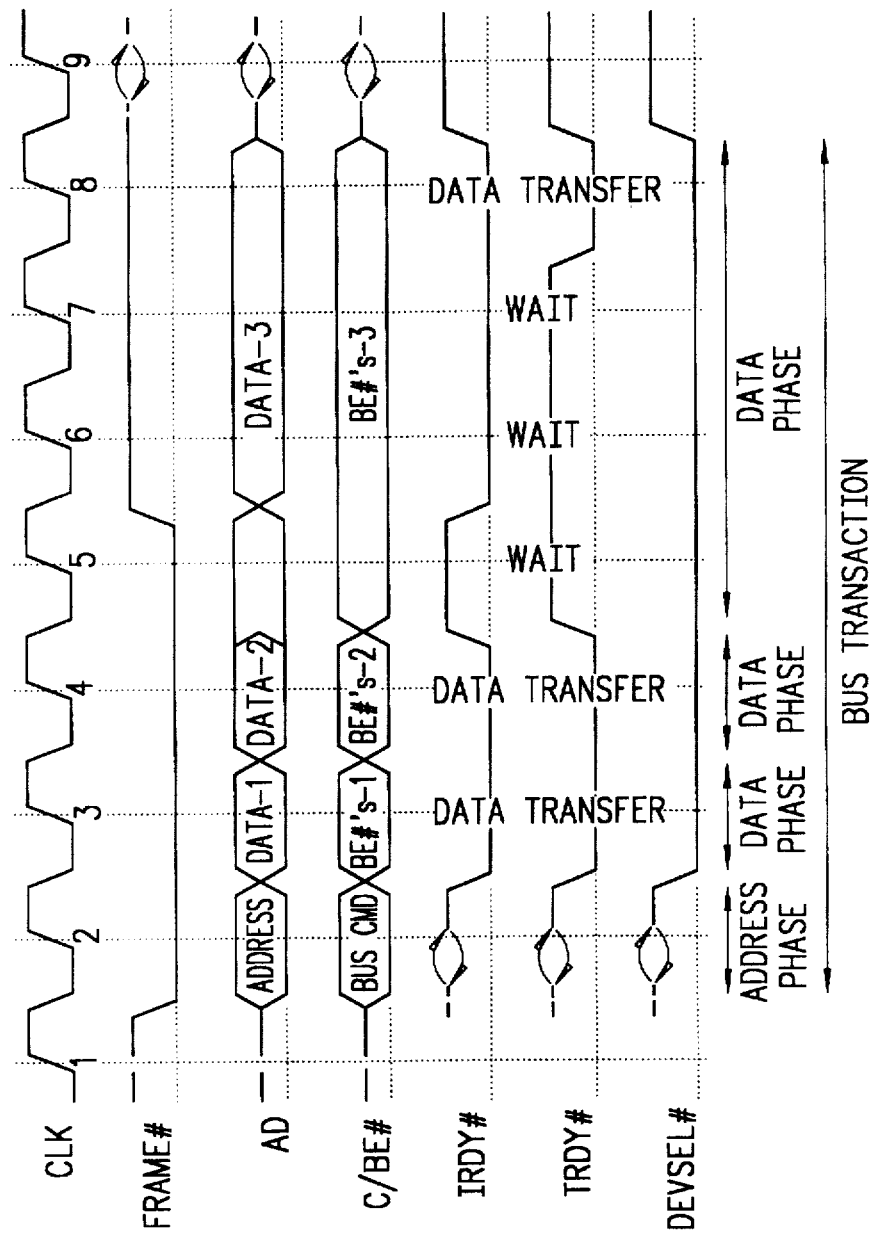
FIG. B2

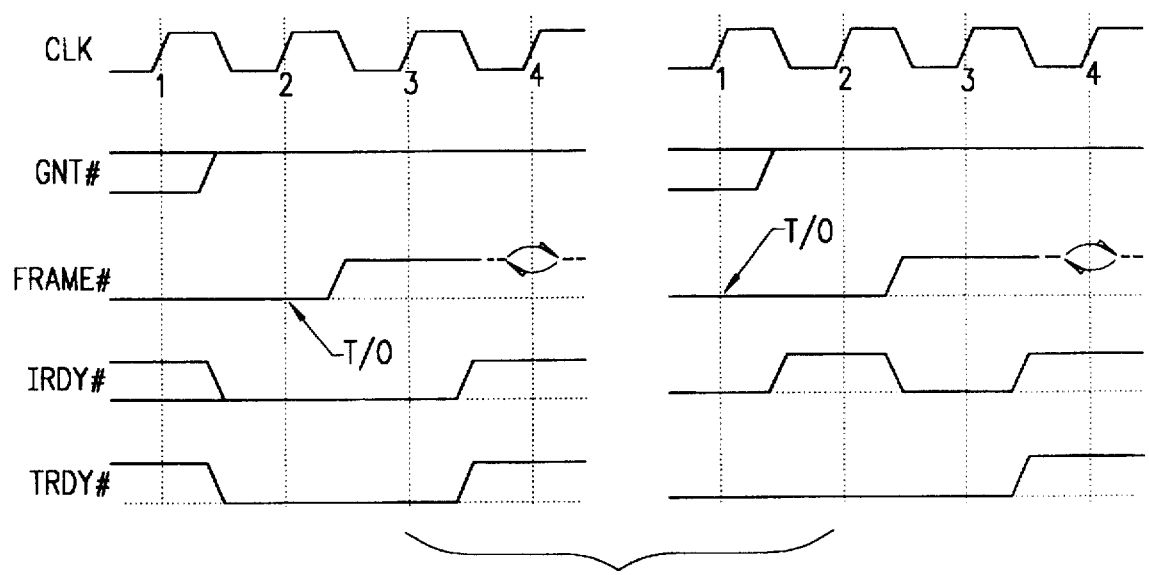
FIG. B3

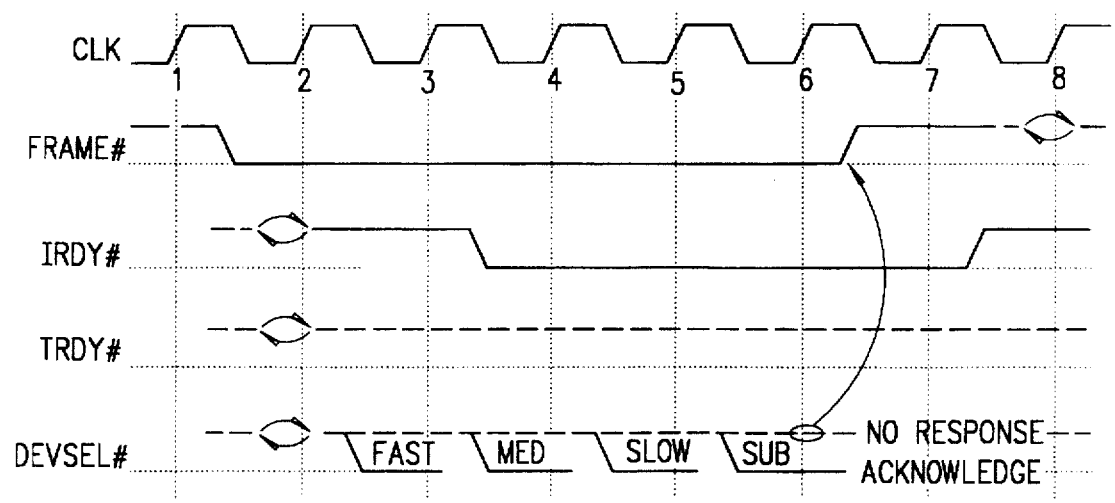
FIG. B4

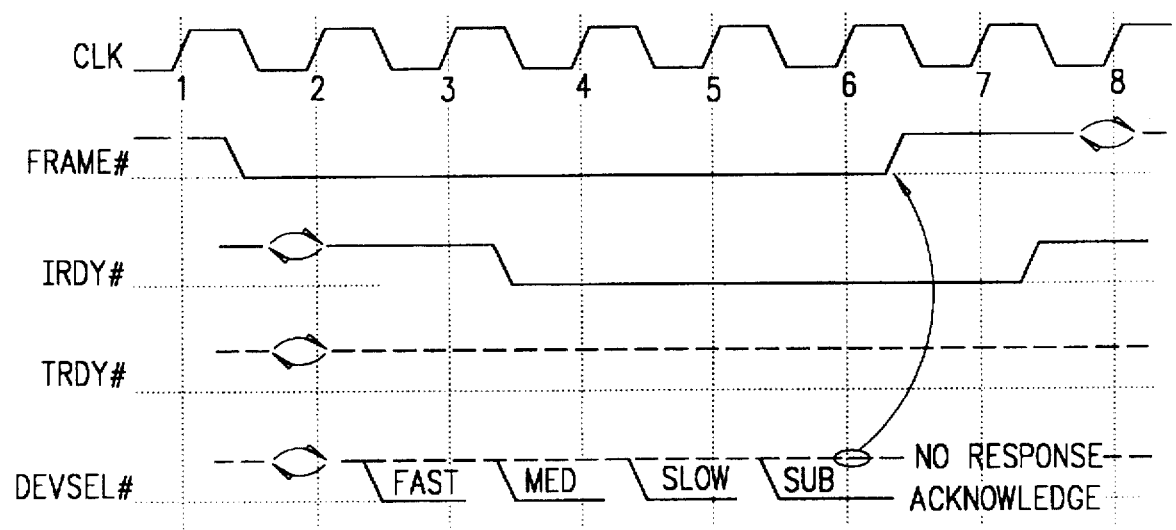
FIG. B5

VL-BUS/PCI-BUS BRIDGE

"This application is a continuation of Ser. No. 08/332,858, filed Nov. 1, 1994, now abandoned."

BACKGROUND

1. Field of the Invention

The invention relates to IBM PC AT-compatible computer architectures, and more particularly, to enhancements thereof for communicating with I/O peripheral devices.

2. Description of Related Art

The IBM PC/AT® computer architecture has become an industry standard architecture for personal computers and is typically built around a host CPU such as an 80386, 80486 or Pentium® microprocessor manufactured by Intel Corporation, or similar microprocessors manufactured by others. The host CPU is coupled to a host bus, capable of performing memory accesses and data transfers at high rates of speed (i.e., on the order of 25–100 MHz with today's technology). The host bus includes 32 or, in the case of computers built around the Pentium, 64 data lines, a plurality of address lines, and various control lines. The typical IBM PC AT-compatible platform also includes DRAM main memory, and in many cases a timer, a real-time clock, and a cache memory.

The typical IBM PC AT-compatible computer also includes an I/O bus, also know as a system bus or AT-bus, which is separate and distinct from the host bus. The system bus usually conforms to one of two industry-established standards known as ISA (Industry Standard Architecture) and EISA (Extended ISA). The system bus is coupled to the host bus via a host-bus/system-bus bridge, and includes, depending on the system bus standard adhered to, 16 or 32 data lines, a plurality of address lines, as well as control lines. The I/O address space is logically distinct from the memory address space and if the CPU desires to access an I/O address, it does so by executing a special I/O instruction. Such an I/O instruction generates memory access signals on the host bus, but also activates an M/IO# signal on the host bus to indicate that this is an access to the I/O address space. The host-bus/system-bus bridge recognizes the I/O signals thereby generated by the CPU, performs the desired operation over the system bus, and if appropriate, returns results to the CPU over the host bus.

In practice, some I/O addresses may reside physically on the host bus and some memory addresses may reside physically on the system bus. More specifically, the devices which respond to accesses to certain I/O space addresses may be connected to the control lines (and usually the address and data lines as well) of the host bus, while the devices which respond to accesses to certain memory space addresses may be connected to the control lines (and usually the address and data lines as well) of the system bus. The host-bus/system-bus bridge is responsible for recognizing that a memory or I/O address access must be emulated by an access to the other bus, and is responsible for doing such emulation. For example, a ROM (or EPROM) BIOS may reside physically on the system bus, but actually form part of the local memory address space. During system boot, when the CPU sends out a non-I/O address which is physically within the ROM BIOS, the host-bus/system-bus bridge recognizes such, enables a buffer (considered herein as being part of the host-bus/system-bus bridge) which couples the address onto the system bus, and activates the chip select for the ROM. The bridge then assembles a data word of the size expected by the host CPU, from the data returned by the ROM, and couples the word onto the host bus for receipt by the CPU. In many systems, at some point during the ROM-based boot-up procedure, the ROM BIOS is copied into equivalent locations in the DRAM main memory, which does reside on the host bus, and thereafter accessed directly.

In the standard architecture, the logical main memory address space is divided into a low memory range (0h–9FFFFh), a reserved memory range (A0000h–FFFFFh) and an extended memory range (100000h to the top of memory). In a typical system the system ROM BIOS is located logically at memory space addresses F0000h–FFFFFh, and resides physically on the system bus. Addresses C0000h–EFFFFh contain ROM BIOS portions for specific add-on cards and reside physically on their respective cards on the system bus. Addresses A0000h–BFFFFh contain the video buffer, which is a part of a video controller residing on the system bus. Duplicate memory space is typically provided in DRAM on the host bus for addresses C0000h–FFFFFh, and the user of the system can select during a setup procedure, which portions of the ROM BIOS are to be "shadowed" by being copied into the duplicate DRAM space during boot-up.

In addition to the above elements, a keyboard controller typically also resides on the system bus, as does the timer and real-time clock. A typical IBM PC AT-compatible system may also include a DMA controller which permits peripheral devices on the system bus to read or write directly to or from main memory, as well as an interrupt controller for transmitting interrupts from various add-on cards to the CPU. The add-on cards are cards which may be plugged into slot connectors coupled to the system bus to increase the capabilities of the system. Add-on cards are also sometimes referred to as expansion cards or accessory cards.

General information on the various forms of IBM PC AT-compatible computers can be found in IBM, "Technical Reference, Personal Computer AT" (1985), in Sanchez, "IBM Microcomputers: A Programmer's Handbook" (McGraw-Hill: 1990), in MicroDesign Resources, "PC Chip Sets" (1992), and in Solari, "AT Bus Design" (San Diego: Annabooks, 1990). See also the various data books and data sheets published by Intel Corporation concerning the structure and use of the iAPX-86 family of microprocessors, including Intel Corp., "Pentiumn™ Processor", Preliminary Data Sheet (1993); Intel Corp., "Pentiumn™ Processor User's Manual" (1994); "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). All the above references are incorporated herein by reference.

The various signals on the host bus include the input/output signals of whichever microprocessor the system is built around. Such signals are therefore well known in the industry and can be determined by reference to the above-incorporated publications. The various signals on the system bus also are well known in the industry. The Solari book incorporated above describes the lines in detail. For present purposes, only the following signals are important:

TABLE I

ISA BUS SIGNALS

| ISA BUS SIGNAL NAME | ISA BUS SIGNAL DESCRIPTION |
|---|---|
| SA(19:0) | 20 address lines. Sufficient to address 1 MB of memory. Only SA(15:0) are used to address the 64k I/O address space, and only SA(9:0) are used to address the basic 1k AT I/O address space. |
| LA(23:17) | Additional address lines for addressing a 16 MB memory address space on the system bus. The LA lines are valid earlier in an I/O bus cycle, but must be latched if needed later in the cycle. The SA lines are not valid as early as the LA lines, but remain valid longer. |
| BALE | Bus address latch enable line. In a CPU initiated system bus cycle, this line indicates when the SA address, AEN and SBHE# lines are valid. In other system bus cycles, the platform circuitry drives BALE high for the entire cycle. |
| SBHE# | System byte high enable. When SBHE# is active and SA(0) is low, then a 16-bit access will be performed. |
| AEN | When active, informs I/O resources on system bus to ignore the address and I/O command signals. Used primarily in DMA cycles where only the I/O resource which has requested and received a DMA acknowledgment signal (DACK#) knows to ignore AEN and respond to the system bus signal lines. Some systems include slot-specific $AEN_x$ signal lines. |
| SD(15:0) | 16 data lines. |
| MEMR#, SMEMR# | Read request lines to a memory resource on the system bus. SMEMR# is the same as MEMR# except that SMEMR# becomes active only when the read address is below 1 MB (i.e., LA(23:20) = 0). Also called MRDC# and SMRDC#, respectively. |
| MEMW# SMEMW# | Write request lines to a memory resource on the system bus. SMEMW# becomes active only when the write address is below 1 MB. Also called MWTC# and SMWTC#, respectively. |
| IOR# | Read request line to an I/O resource on the system bus. Also called IORC#. |
| IOW# | Write request line to an I/O resource on the system bus. Also called IOWC#. |
| MEMCS16# | Memory chip select 16. Asserted by an addressed memory resource on the system bus if the resource can support a 16-bit memory access cycle. |
| IOCS16# | I/O chip select 16. Asserted by an addressed I/O resource on the system bus if the resource can support a 16-bit I/O access cycle. |
| SRDY# | Synchronous Ready line. Also sometimes called OWS#, NOWS# or ENDXFR#. Activated by an addressed I/O resource to indicate that it can support a shorter-than-normal access cycle. |
| IOCHRDY | I/O channel ready line. If this signal is deactivated by an addressed I/O resource, the cycle will not end until it is reactivated. A deactivated IOCHRDY supersedes an activated SRDY#. Also sometimes called CHRDY. |
| MASTER# | After requesting and receiving a DMA-acknowledged (DACK#) signal, a system bus add-on card can assert MASTER# to become the system bus master. |
| REFRESH# | Activated by refresh controller to indicate a refresh cycle. |
| IRQ(15, 14, 12:9, 7:3) | Interrupt request lines to the interrupt controller for CPU. |
| DRQ(7:5, 3:0) | DMA Request lines from I/O resource on system bus to platform DMA controller. |
| DACK(7:5, 3:0) | DMA Acknowledge lines. |
| TC | DMA terminal count signal. Indicates that all data has been transferred. Also called T/C. |
| BCLK | System bus clock signal. 6–8.33 MHz square wave. |
| OSC | 14.318 MHz square wave. |

Note that some of the signals described in this specification are asserted high, whereas others are asserted low. As used herein, signals which are asserted low are given a '#' or 'B' suffix in their names, whereas those asserted high (or for which an assertion polarity has no meaning) lack a '#' or 'B' suffix. Also, two signal names mentioned herein that are identical except that one includes the '#' or 'B' suffix while the other omits it, are intended to represent logical compliments of the same signal. It will be understood that one can be generated by inverting the other, or both can be generated by separate logic in response to common predecessor signals.

Recently, efforts have been made to reduce the size and improve the manufacturability of PC AT-compatible computers. Specifically, efforts have been made to minimize the number of integrated circuit chips required to build such a computer. Several manufacturers have developed "PC AT chipsets" (also known as "core logic chipsets" or "I/O bus interface circuitry"), which integrate a large amount of the host-bus/system-bus bridge circuitry and other circuitry onto only a few chips. An example of such a chipset is the 386WB PC/AT chipset manufactured by OPTi, Inc., Santa Clara, Calif. These chipsets implement the host-bus/system bus bridge, the timer, real-time clock (RTC), DMA controller, as well as some additional functionality.

In the original IBM PC AT computers manufactured by IBM Corp., the system bus operated with a data rate of 8 MHz (BCLK=8 MHz). This was an appropriate data rate at that time since it was approximately equivalent to the highest data rates which the CPUs of that era could operate with on the host bus. Numerous third party vendors have since developed peripheral devices and controller cards which are intended to be plugged into an AT (ISA) slot on the system bus, and which rely upon the 8 MHz maximum data rate. The AT standard also requires a wait state (i.e. 125 nS) for 16-bit data transfers, and four wait states (500 nS) for 8-bit data transfers. A zero wait state data transfer is also available, but only if the peripheral device signals, by activating the SRDY# control line on the system bus, that it can handle such fast data transfers.

In the years since the IBM PC AT was originally introduced, technology has improved dramatically to the point where host buses on high-end PC AT-compatible computers can operate on the order of 100 MHz. Despite these advances, however, such computers are still manufactured with a system bus operating at around 8 MHz because of the need to maintain compatibility with previously designed peripheral devices. These devices were designed in reliance upon the 8 MHz data rate and AT wait state protocol, and many such devices are not capable of operating faster. Even modern designs for AT bus peripherals often rely on the 8 MHz maximum data rate, even though very little additional effort or cost would be involved to design them to operate faster.

In addition to the large disparity between data transfer rates on the system bus as compared to the host bus in modern PC AT-compatible computers, the host-bus/system-bus bridge circuitry needs to delay its handling of requests and responses from one bus to the other merely because the clocks are not synchronized. The circuitry therefore must hold a request or response until the appropriate clock edge on the destination bus appears. This can add on the order of 30–200 nS to each system bus cycle. Accordingly, it can be seen that any access to a peripheral device on the system bus imposes a substantial penalty on the performance of PC AT-compatible computers. This penalty will only become worse as the disparity between the host bus and system bus data rates continues to increase.

The penalty applies for most types of peripheral devices, but in the past it has been most noticeable for video display controllers. Video display controllers have a command port which responds to accesses in the I/O address space, as well as a video memory port which responds to accesses in the memory address space. Manufacturers have traditionally placed both ports on the system bus, however, thereby imposing the speed limitations of the system bus on the video memory port as well as the command port. U.S. patent application Ser. No. 07/851,444, filed Mar. 16, 1992, now U.S. Pat. No. 5,309,568, (Attorney Docket No. OPTI3030WSW), owned by the assignee of the present application and incorporated herein by reference in its entirety, describes certain attempts to permit accesses to the video memory port to take place over the host bus instead of the system bus. In addition, some graphics chip vendors have tried incorporating features into their chips for connection directly to a host bus. For example, see S3, Inc., "86C911 GUI Accelerator", Databook (April 1992), incorporated herein by reference.

However, these solutions all suffer from the problem that they are non-standard. That is, if a vendor of I/O interface chipsets provides for a host bus capability, there is no assurance that it will interface directly with products made by more than one peripheral device controller vendor. A layer of buffers and glue logic therefore may be required to enable such peripheral device controllers to take advantage of the host bus feature, and the glue logic may be different for each different peripheral controller. On the other hand, if a maker of peripheral device controllers, such as a maker of a VGA (Video Graphics Adapter) controller, provides for a host bus capability in the peripheral controller, there is no guarantee that it will interface correctly with the host-bus/system-bus bridge chipsets made by more than one chipset manufacturer. Again, different buffers and glue logic may be required for each vendor of chipsets.

In two different efforts for ameliorating the above problem, instead of creating a private standard, two different organizations have defined different bus protocols and attempted to promulgate them as standards for the entire personal computer industry. One such standard, referred to herein as the VESA (Video Electronics Standards Association) or VL-Bus standard, is defined in VESA, "VESA VL-Bus Local Bus Standard", Revision 1.0 (1992), incorporated herein by reference. Significant aspects of the VL-Bus specifications are described in Appendix A hereto. Further revisions of the VESA standard are in preparation, one recent version being VESA, "VESA VL-Bus Proposal, Version 2.0 p, Revision 0.8 p (May 17, 1993), also incorporated herein by reference. The other such standard, referred to herein as the PCI standard, is defined in Intel Corp., "Peripheral Component Interconnect (PCI), revision 1.0 Specification" (Jun. 22, 1992) and in PCI Special Interest Group, "PCI Local Bus Specification", Revision 2.0 (Apr. 30, 1993), both incorporated herein by reference. Significant aspects of the PCI 2.0 Bus specifications are described in Appendix B hereto. Each standard has advantages and disadvantages over the other, and depending on the application, one standard or the other may be more beneficial to have in a system.

For example, one advantage of the VL-bus is that it is relatively simple to include in a personal computer system, especially those built around an Intel 486 microprocessor. This is because the VL-bus signal lines are similar to signal lines of the 486 CPU, except for a few additional signal lines included on the VL-bus. Thus the only additional expense required to add a VL-bus to a pre-existing 486-based computer design, is a very small VL-bus controller to handle the additional signal lines. Such a controller has already been included in chipsets. An example of such a chipset includes the OPTi 82C802G and either the 82C601 or 82C602, all incorporated herein by reference. The 82C802G is described in OPTi, Inc., "OPTi PC/AT Single Chip 82C802G Data Book", Version 1.2a (Dec. 1, 1993), and significant aspects are also set forth in Appendix C hereto. The 82C601 and 82C602 are described in OPTi, Inc., "PC/AT Data Buffer Chips, Preliminary, 82C601/82C602 Data Book", Version 1.0e (Oct. 13, 1993), and significant aspects are also set forth in Appendix D hereto. Both data books are incorporated herein by reference in their entirety.

While a minimum VL-bus system requires no additional circuitry, the insertion of a simple host-bus/VL-bus bridge provides buffering for additional VL-bus devices. For Pentium®—based systems, the host bus of which has a 64-bit wide data path, the bridge could also include circuitry to break up a 64-bit host-bus originated access, into two 32-bit VL-bus accesses. Such circuitry is still relatively simple. (Extension to the 32-bit VL-bus standard have been proposed in order to accommodate 64-bit access in a single VL-bus cycle, but in general, as the data path of host CPUs continues to expand, it can be expected that at least some future system designs will continue to employ a bridge which breaks up a wider-data-path host bus access into two, four, or some other number of narrower-data-path cycles on the VL-bus.)

A primary advantage of the PCI-bus, on the other hand, is its processor independence. The PCI-bus was intended to provide very high-speed accesses using a standard bus protocol, and to interface those accesses with any host processor bus using an appropriate host-bus/PCI-bus bridge. The host-bus/PCI-bus bridge is significantly more expensive than the circuitry required to implement a VL-bus, but the independence it provides from ever-faster and ever-more varied host processor buses provides a stable target for designers of peripheral products. A peripheral device designed for the PCI-bus would not need to be redesigned for each new version of an Intel microprocessor, or indeed, for each new microprocessor that might in the future power a personal computer system.

To date, neither the VL-bus standard nor the PCI-bus standard has achieved dominance in the marketplace for personal computer systems or in the marketplace for peripheral devices. Thus peripheral device manufacturers designing cards intended to bypass the slow system bus, still usually must design one version of the card for the PCI-bus and one version for the VL-bus. Similarly, computer system integrators and chipset manufacturers often find themselves having to double their product offerings since each market segment for VL-bus systems can have an equivalent but separate market segment for PCI-bus systems.

It is possible to overcome these problems by designing a computer system which incorporates both VL-bus expansion slots and PCI-bus expansion slots, in addition to the standard ISA— or EISA-bus expansion slots. The motherboard circuitry to implement this would be expected to include programmable registers which would indicate whether a particular valid cycle definition on the host bus is to be handled by a device on the host bus (such as main memory), a device on the VL-bus (which may be the same as the host bus in 486 systems), by a device on the PCI-bus, or by a device on the system bus. Such motherboard circuitry would be expensive, however, and may require an entirely new chipset design.

In Acer Laboratories, Inc., "M1435 PCI-VL__Bus Bridge, Preliminary Datasheet" (Sep. 20, 1993), incorporated by reference herein, there is described a VL-bus/PCI-bus bridge chip which, together with the Acer M1429kG/M1429 VESA chip, permits both a VL-bus and a PCI-bus to be included in a single system. According to the datasheet, when the M1435 chip detects a valid VL-bus cycle, it first determines whether the cycle is intended for system memory or for another VL-bus device. The chip is believed to perform a positive decode of the address to determine whether the cycle is intended for system memory, and it observes the LDEV signal to determine whether the cycle has been claimed by another VL-bus device. If neither is the case, then the M1435 translates the cycle to the PCI-bus. If no PCI agent claims the translated PCI cycle, then the M1435 asserts an ISA REQJ signal to the M1429 chip, thereby informing the M1429 to start an ISA cycle. See also Acer Laboratories, Inc., "M1429G/M1431/M1435 Data Sheet" (October 1993), incorporated herein by reference.

The Acer technique for accommodating both the VL-bus and PCI-bus in a single system is limited in that it operates only with a host-bus/system-bus interface chipset which observes and understands the ISA REQJ signal asserted by the M1435 bridge. Other inter-chip signals may also be required between the M1435 and M1429. Since most interface chipsets do not understand these signals, such chipsets would have to be modified by the chipset manufacturer before they could be used with the M1435 bridge. It would be desirable, therefore, to provide a VL-bus/PCI-bus bridge which does not require modification of any existing VL-bus/system-bus chipset. Such a bridge could be used in conjunction with the chipset of any manufacturer which supports the VL-bus.

SUMMARY OF THE INVENTION

The invention takes advantage of a feature of Intel 486 and Pentium microprocessors, known as the back-off feature. These microprocessors sense a BOFF# signal, which is not considered part of the VL-bus. When the microprocessor detects assertion of BOFF#, while a host bus cycle is in progress, it aborts the cycle and restarts it after it detects BOFF# negated. According to the invention, roughly described, a VL-bus/PCI-bus bridge claims a VL-bus cycle by asserting LDEV# to the VL-bus/system-bus bridge. If no other VL-bus device claims the cycle as well, and the cycle is not to system memory, then the VL-bus/PCI-bus bridge translates the cycle onto the PCI-bus and awaits a response from a PCI device. If no PCI device claims a cycle by the PCI-bus device claiming deadline, then the bridge asserts BOFF# to the host. The bridge then awaits the host's repetition of the cycle which was subject to the BOFF#, and suppresses its assertion of LDEV# so that the VL-bus/system-bus bridge can translate the cycle onto the system bus.

In another aspect of the invention, a VL-bus device can take advantage of the back-off feature of the 486 and Pentium CPU's by asserting the VL-bus device ready signal LRDY# after assertion of BOFF#, and negating LRDY# before or at the same time as negating BOFF#. The VL-bus controller does not receive BOFF# necessarily, but responds LRDY# by asserting RDYRTN# onto the VL-bus, thereby signifying to all other VL-bus devices that the VL-bus cycle has ended and permitting them to restart their state machines in anticipation of a new VL-bus cycle.

BRIEF DESCRIPTION OF THE DRAWINGS

The invention will be described with respect to particular embodiments thereof, and reference will be made to the drawings, in which.

Figure 2:
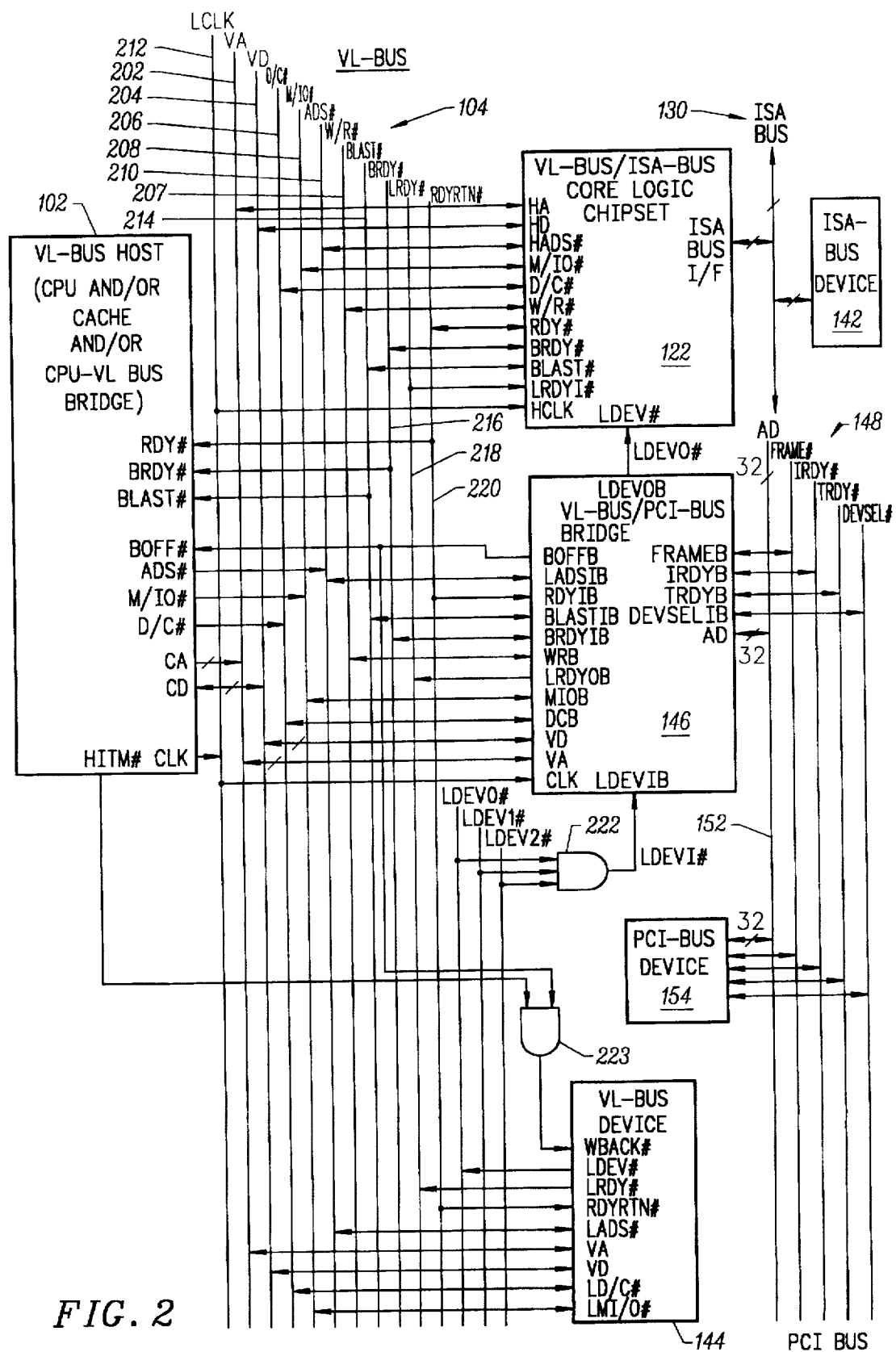

FIGS. B1–B5 are timing diagrams for certain signals on the PCI-bus of FIG. 2.

DETAILED DESCRIPTION

Figure 1:
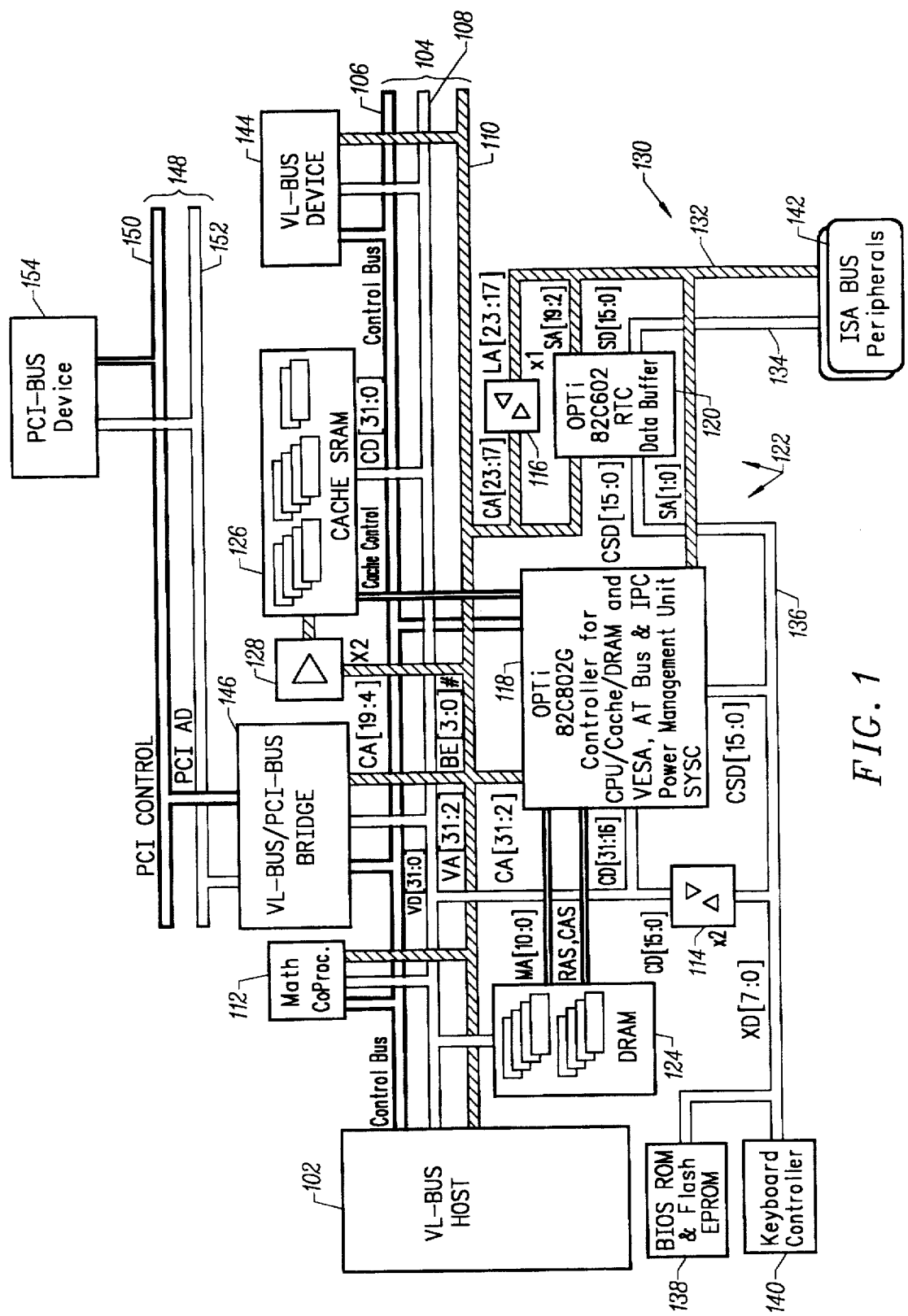
FIGS. 1 and 2 are block diagrams of a computer system incorporating the invention.

FIG. 1 is a block diagram illustrating pertinent features of a computer system incorporating the invention. The system includes a VL-bus host 102, which may, for example, be an Intel 80386 or 80486 microprocessor, or it may include an Intel Pentium microprocessor in combination with a conventional host-bus/VL-bus bridge. The VL-bus host 102 is connected to a VL-bus 104, comprising VL-bus control lines 106, VL-bus data lines 108, and VL-bus address lines 110. The system can also include a math coprocessor 112 connected to the VL-bus 104; if the VL-bus host includes a bridge, then the math coprocessor 112 can instead be coupled to the host bus (not shown). The system of FIG. 1 also includes a core logic chipset comprising an 82C802G chip 118 and an 82C602 chip 120, both manufactured by OPTi, Inc., Santa Clara, Calif., as well as two sets of buffers 114 and 116. The chipset (referred to collectively herein as 122) is coupled to the VL-bus 104 and provides control and address signals to main memory DRAM 124, cache SRAM 126, as well as other components in the system. The cache SRAM 126 also receives address signals from the VL-bus address lines 110 via buffer 128, and both the cache SRAM 126 and the main memory DRAM 124 are coupled bi-directionally to the VL-bus data lines 108. The system also includes an ISA bus 130, which includes address lines 132, a 16-bit SD data bus 134, and an 8-bit XD data bus 136. The XD data bus 136, together with accompanying control and address signals (collectively the X-bus), are considered herein to form part of the ISA bus 130.

The core logic chipset 122 is responsible for many functions in the system, including recognizing VL-bus cycles intended for devices which reside on the ISA bus, and translating such cycles onto the ISA bus 130. Address signals are transferred between the VL-bus address leads 110 and the ISA-bus address leads 132 via buffers 116 and the 82C602 data buffer 120, and data is transmitted between the VL-bus data lines 108 and the ISA-bus data lines 134 and 136 via the buffers 114 and the 82C602 data buffer 120. A BIOS ROM and flash EPROM 138 reside on the ISA bus 130, as does a keyboard controller 140 and other ISA-bus peripherals 142. Residing on the VL-bus 104 is a VL-bus device 144, as well as a VL-bus/PCI-bus bridge 146 (also referred to herein as a PCI bridge 146) described in more detail below. The PCI-bus bridge is also described in OPTi, Inc., "82C822 PCIB VESA Local Bus to PCI Bridge Interface," Data Sheet (April, 1994), incorporated herein in its entirety, and is described in Appendix E hereto. The VL-bus/PCI-bus bridge 146 is also connected to a PCI-bus 148, comprising control lines 150 and a multiplexed AD address/data bus 152. A PCI-bus device 154 resides on the PCI-bus 148. Although VL-bus 144 is shown residing exclusively on the VL-bus 104, it will be understood that in accordance with the VL-bus specification incorporated above, such device may also be connected to the ISA bus 130. The signals on the VL-bus 104 and the PCI-bus 148 conform to those set forth above and in the appendices with respect to the respective standards.

FIG. 2 is a block diagram showing some of the components of the system of FIG. 1, and providing additional detail regarding the control signals. Only signals pertinent to an understanding of the invention are illustrated, and it will be understood that other signals exist as well. Referring to FIG. 2, it can be seen that the VL-bus host 102 has its CPU address (CA) lines connected to the VL-bus VA lines 202 and its CD data lines connected to the VL-bus data lines 204. It also has its ADS#, R/W#, M/IO# and D/C# outputs connected to the corresponding VL-bus signal lines 206, 207, 208 and 210. The CLK output of the VL-bus host 102 drives the VL-bus LCLK lines 212, and the VL-bus host 102 BLAST# and BRDY# inputs are connected to receive the signals on the corresponding lines 214 and 216 of the VL-bus. As in conventional VL-bus system implementations, the VL-bus host 102 is not connected to the VL-bus LRDY# signal line 218, but rather has its RDY# input connected the VL-bus RDYRTN# signal line 220. Additionally, although the BOFF# input of the VL-bus host 102 is not used in many conventional VL-bus implementations, in the system of FIGS. 1 and 2, it is connected to a corresponding BOFFB output of the VL-bus/ PCI-bus bridge 146 for reasons hereinafter described. The BOFFB output of the VL-bus/PCI bridge 146 is also coupled to a WBACK# input of VL-bus device 144. In Pentium systems, the coupling of BOFFB to WBACK# takes place via an AND gate 223, the other input of which is connected to the HITM# output of the Pentium host.

The VL-bus address lines 202 are also connected to the core logic chipset 122, as are the VL-bus data lines 204, the D/C# line 206, the W/R# line 207, the M/IO# line 208, and the ADS# line 210. The core logic chipset 122 also has its BRDY# and BLAST# lines connected to the respective lines 216 and 214 of the VL-bus 104, has its LRDYI# input connected to the LRDY# line 218 of VL-bus 104, and has its RDY# line connected to the VL-bus RDYRTN# line 220. It also has its HCLK input connected to receive the signal on LCLK line 212. The LDEV# input of core logic chipset 122 is connected as hereinafter described.

As previously mentioned, the VL-bus/PCI-bus bridge 146 has a BOFFB output which is connected to the BOFF# input of the VL-bus host 102. If the host 102 separates the VL-bus 104 from the host bus (not shown) connected to the host CPU, and if such bridge does not translate the BOFF# signal between the two buses, then BOFFB is connected directly to the BOFF# input of the host CPU itself. The VL-bus/PCI-bus bridge 146 also includes an LADSIB signal line connected to the ADS# signal line of the VL-bus 104, an MIOB signal line connected to the M/IO# signal line of VL-bus 104, a DCIB signal line connected to the D/C# signal line of VL-bus 104, VD signal lines connected to the data lines of VL-bus 104, VA signal lines connected to the address lines 202 of VL-bus 104, and a clock input connected to the LCLK line 212 of VL-bus 104. The VL-bus/PCI-bus bridge 146 also includes a BLASTIB signal line connected to the VL-bus BLAST# line, a BRDYIB signal line connected to the BRDY# signal line, an RDYIB input connected to the VL-bus RDYRTN# line 220, and an LRDYOB output connected the VL-bus LRDY# signal line 218.

In a conventional VL-bus system implementation, the VL-bus signal lines LDEV<x># are typically ANDed together before being provided to the VL-bus/ISA-bus core logic chipset 122 LDEV# input. In the present embodiment, however, the combined signal (called LDEVI# is intercepted by the VL-bus/PCI-bus bridge 146 before being provided (by the name LDEVO#) to the LDEV# input of the VL-bus/ ISA-bus core logic chipset 122. Accordingly, in FIG. 2, the VL-bus signal lines LDEV0#, LDEV1# and LDEV2# are connected to respective inputs of a 3-input AND gate 222, the output of which forms the LDEVI# signal. This signal is provided to an LDEVIB input of the VL-bus/PCI-bus bridge 146, which produces an LDEVOB output on a signal line LDEVO#. The LDEVO# is connected to the LDEV# input of VL-bus/ISA-bus core logic chipset 122.

On the PCI-bus side of VL-bus/PCI-bus bridge 146, the bridge is connected to the 32-bit multiplexed address/data bus 152. The bridge 146 also has a FRAMEB signal line connected to the FRAME# control signal line of the PCI-bus 148, an IRDYB signal line connected to the IRDY# signal line of the PCI-bus 148, a TRDYB signal line connected to the TRDY# signal line of PCI-bus 148, and a DEVSELIB signal line connected to the DEVSEL# signal line of the PCI-bus 148.

FIG. 2 also illustrates an ISA-bus device 142 connected to the ISA-bus 130 which is connected to the VL-bus/ISA-bus core logic chipset 122, a PCI-bus device 154 which is connected to all of the signal lines of PCI-bus 148, and a VL-bus device 144 which is connected to appropriate signal lines of the VL-bus 104. Pertinent to the present description, the VL-bus device 144 is able to listen to the VL-bus cycle definition signals (VA, BE#, R/W#, D/C#, and M/IO#). If it recognizes a valid cycle to which it can respond, the VL-bus device 144 can assert LDEV# onto the VL-bus LEDV0# signal line, and can terminate its VL-bus cycle by asserting LRDY# on the VL-bus LRDY# signal line 218. The PCI-bus device 154 and the VL-bus device 144 can constitute any desired expansion devices, but typically they will include a video display driver, possibly SCSI adapters, disk controllers, LAN adapters, and so on.

Figure 3:
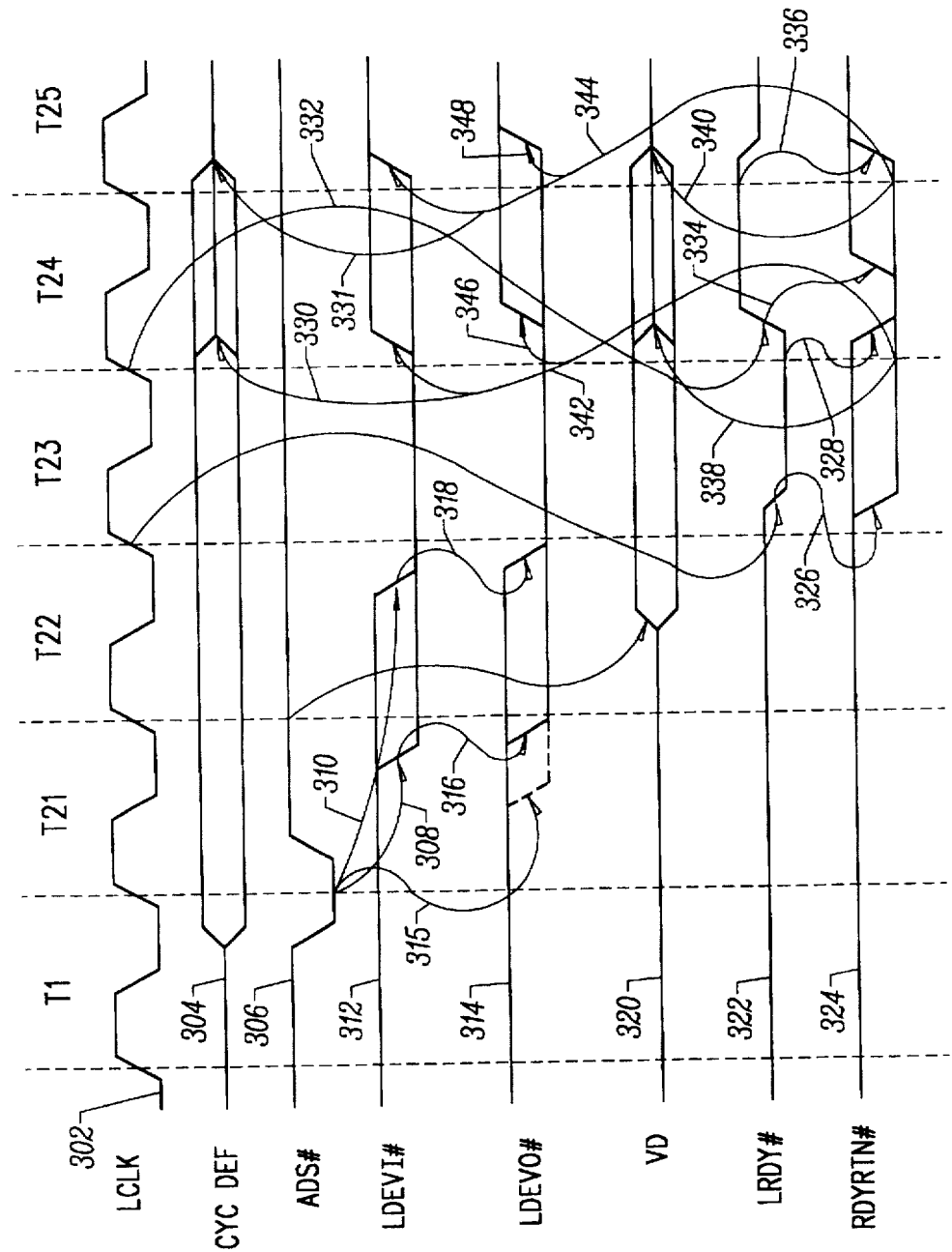
FIGS. 3, 4 and 5 are timing diagrams of signals in the computer system of FIG. 2.

The operation of the system of FIGS. 1 and 2 will be described with respect to certain timing diagrams beginning with FIG. 3. FIG. 3 simplified is a timing diagram illustrating the timing of signals on the VL-bus 104 for a VL-bus read cycle initiated by the VL-bus host 102 and claimed by a conventional VL-line target device. Possible variations, and the timing of various signals not shown in FIG. 3, can be gleaned from the above-incorporated VL-bus specifications. The timing is the same for a VL-bus master-initiated cycle, except that it is preceded by a bus arbitration procedure.

Referring to FIG. 3, the LCLK signal is indicated at line 302. Six LCLK cycles are shown, labeled T1, T21, ..., T25. Cycle T1 corresponds to the T1 cycle of an Intel 80486 microprocessor, and cycles T21 ... T25 correspond to five consecutive T2 cycles of such a microprocessor (see the Intel databooks incorporated above).

In LCLK cycle T1, as indicated on line 304, the host 102 places the cycle definition signals (ADR[31:2], M/IO#, W/R#, D/C# and BE[3:0]#) on the appropriate signal lines of the VL-bus 104. It then strobes the ADS# signal to assert the validity of the cycle definition signals and to start the VL-bus cycle as shown in line 306. If a VL-bus target device, such as 144 in FIG. 2, recognizes the cycle definition and desires to claim the VL-bus cycle, it must do so within 20 nanoseconds after sampling ADS# low at the rising edge which begins T21. To claim the cycle, VL-bus target device 144 asserts its LDEV# output onto the VL-bus LDEV<x># signal to which it is connected. This causes AND gate 222 (FIG. 2) to assert LDEVI# low, which signal is passed through the VL-bus/PCI-bus bridge 146 to the LDEVO# signal line and onto the LDEV# input of VL-bus/ISA-bus core logic chipset 122. The core logic chipset 122 samples LDEV# on the first rising edge of LCLK following the 20 nanosecond period to determine whether any VL-bus device has claimed the cycle. Such rising edge is referred to herein as the VL-bus device bus-claiming deadline, and is relative to the LCLK rising edge at which ADS# is sampled asserted. For systems with LCLK≦33.3 MHz, the VL-bus device claiming deadline is typically the first rising edge of LCLK following the rising edge on which ADS# is sampled asserted, and for systems in which LCLK≦40 MHz, the VL-bus device claiming deadline is typically the second rising edge of LCLK following the rising edge in which ADS# is sampled asserted.

Accordingly, referring again to FIG. 3, the VL-bus device 144, through the AND gate 222, asserts LDEVI# within T21 for 33.3 MHz systems (arrow 308), or within T21 or T22 for 40 MHz systems and above (arrow 310), as indicated on line 312. In either case, VL-bus/PCI-bus bridge 146 asserts LDEVO# to the VL-bus/ISA-bus core logic chipset 122 immediately thereafter as indicated on line 314 (arrows 316 and 318, respectively). (Note that the VL-bus/PCI-bus bridge 146 is at the same time decoding the address and cycle definition signals as described elsewhere herein, and may assert LDEVO# as a result of the decode as well. The bridge 146 therefore may actually assert LDEVO# before receipt of LDEVI# as indicated by arrow 315.)

The VL-bus host 102 unasserts (negates) ADS# 306 after being sampled asserted, i.e. within LCLK cycle T21. The VL-bus device 144 therefore detects ADS# negated at the rising edge which begins T22, and within T22, begins driving its read data onto the VD lines 204 of VL-bus 104 as indicated on line 320.

The cycle definition signals remain active until RDYRTN# is sampled asserted on a rising edge of LCLK, i.e. in LCLK cycle T24 or T25 as indicated by arrows 330 and 331.

After the end of the second T2 state (i.e., in LCLK cycle T23), the VL-bus device 144 begins asserting LRDY# as indicated in line 322 for one LCLK cycle. This signal is detected at the LRDYI# input of the VL-bus/ISA-bus core logic chipset 122, which responds by asserting RDYRTN# on the VL-bus 104 (line 324 and arrow 326 in FIG. 3). For 40 MHz systems and faster, the core logic chipset 122 may wait until the first rising edge of LCLK following detection of LRDY# asserted to assert RDYRTN# (arrow 328), thereby resynchronizing the ready signals with LCLK. For 33 MHz systems, LRDYI# can be connected directly to RDYRTN#. The VL-bus host detects RDYRTN# asserted on its RDY# input, and terminates the VL-bus cycle.

The rising edge of LRDY# in T24 causes the core logic chipset 122 to unassert RDYRTN# either immediately thereafter (arrow 334), or for faster systems, in response to the first LCLK rising edge following detection of LRDY# unasserted (arrow 336). The VL-bus device 144 drives the VL-bus LRDY# signal line to a high logic level for one-half LCLK cycle following deassertion of LRDY#, and then floats LRDY#.

The VL-bus device 144 continues to drive data onto the VD lines 204 until the first LCLK rising edge at which it detects RDYRTN# asserted (arrow 338 or 340). It also cause AND gate 222 to de-assert LDEVI# at the same time (arrows 342, 344), and the VL-bus/PCI-bus bridge 146 de-asserts LDEVO# to the core logic chipset 122 at the same time (arrows 346, 348).

Thus it can be seen that the VL-bus/PCI-bus bridge 146 does not interfere with VL-bus read accesses to VL-bus target devices such as 144. The same is true with VL-bus write accesses to VL-bus target devices, and to VL-bus read and write accesses regardless of whether the originator is the VL-bus host 102, the VL-bus/ISA-bus core logic chipset 122 (e.g. acting for an ISA-bus master), or a VL-bus master device. Note that in the timing diagram of FIG. 3, if no VL-bus device had asserted its corresponding LDEV<x># signal by the VL-bus device claiming deadline, then the chipset 122 translates the cycle onto the ISA-bus 130 and returns any read data onto the VD lines 204 of the VL-bus 104.

Figure 4:
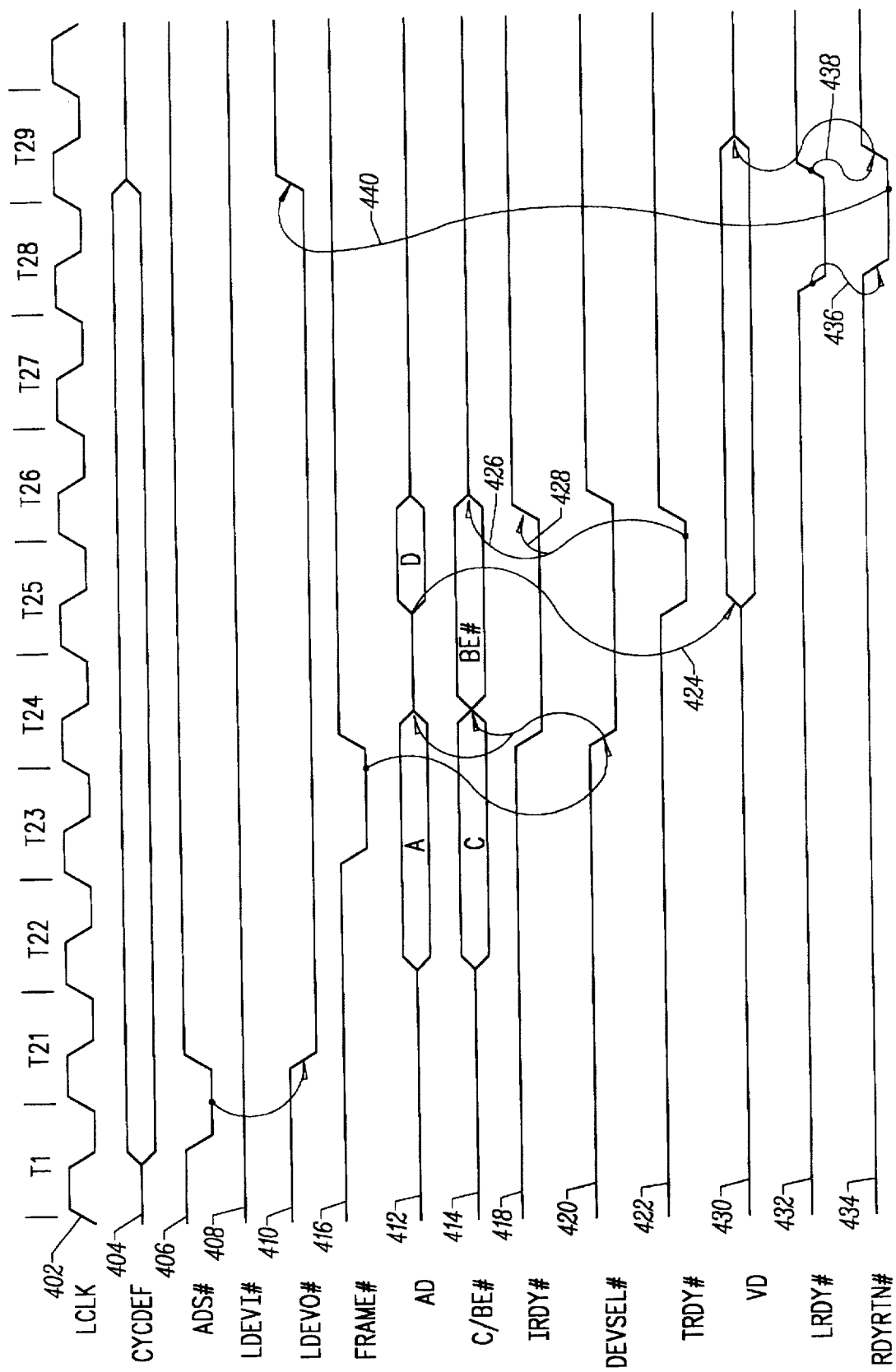

FIG. 4 is a timing diagram illustrating the operation of the system of FIGS. 1 and 2 when the target device of a VL-bus access resides on the PCI-bus 148. The timing diagram of FIG. 4, like that of FIG. 3, has been simplified for clarity of description. In addition, a system with LCLK ≦33.3 MHz is assumed, and it is assumed that the PCI-bus clock is the same as the VL-bus clock, LCLK, but is treated asynchronously.

Referring to FIG. 4, as with FIG. 3, an LCLK signal is indicated on line 402. One T1 cycle is shown, followed by nine T2 cycles labeled T21 ....T29. The VL-bus host 102 drives a cycle definition onto the VL-bus 104 prior to T1 as indicated on line 404, and asserts ADS# as indicated on line 406. It is assumed that no VL-bus device claims the cycle, so LDEVI# remains high throughout the VL-bus cycle as indicated on line 408. Nevertheless, the VL-bus/PCI-bus bridge 146 asserts LDEVO# to VL-bus/ISA-bus core logic chipset 122 in response to detection of ADS# asserted at the beginning of the first T2 cycle. The core logic chipset 122 thus considers the VL-bus cycle as having been claimed by a VL-bus device, and withholds any translation of the cycle onto the ISA-bus 130. The VL-bus/PCI-bus bridge 146 also drives the address from VA lines 202 onto the AD lines 152 of PCI-bus 148 (line 412 in FIG. 4), and drives an appropriate command onto the C/BE# lines of PCI-bus 148 (line 414 in FIG. 4). After a delay for synchronizing to the PCI-bus clock signal, in T23, VL-bus/PCI-bus bridge 146 asserts FRAME# on the PCI-bus 148 (line 416 in FIG. 4). It also asserts the PCI-bus IRDY# signal in T24 (line 418). It is assumed that only one data phase will occur on the PCI-bus in response to the present example VL-bus cycle, so the bridge 146 de-asserts FRAME# in T24.

Prior to the PCI-bus device claiming deadline, the target PCI-bus device 154 (FIG. 2) claims the PCI-bus cycle by asserting DEVSEL#. The PCI-bus device 154 is assumed to be a fast device, so as indicated on line 420 (FIG. 4), it asserts DEVSEL# during T24 in response to detection of FRAME# asserted at the rising edge which begins T24. The bridge 146 releases the address and command from the PCI-bus AD and C/BE# signal lines, respectively, in response to the assertion of DEVSEL#, and asserts BE# onto the C/BE# signal lines. In T25, the PCI-bus device 154 drives the read data onto the PCI-bus AD lines 152 and asserts TRDY# for one clock cycle as indicated on line 422. The bridge 146 latches the data from AD lines 152 onto the VL-bus VD data lines 204 as indicated by line 430 and arrow 424 (although initially invalid data may be driven from AD to VD as early as T22). At the beginning of T26, the VL-bus/PCI-bus bridge 146 samples TRDY# asserted, and in response thereto, releases C/BE# and de-asserts IRDY# (arrows 426 and 428, respectively). The PCI-bus device 154 also releases the AD lines 152 and negates DEVSEL# in T26.

After another synchronization delay, in T28, the VL-bus/PCI-bus bridge 146 asserts LRDY# as indicated on line 432 for one LCLK cycle. The VL-bus/ISA-bus core logic chipset 122 responds by asserting RDYRTN# on the VL-bus 104 (line 434 and arrow 436 in FIG. 4); it de-asserts RDYRTN# in response to the de-assertion of LRDY# (arrow 438). The VL-bus/PCI-bus bridge 146 samples RDYRTN# asserted at the beginning of T29, and in response thereto, negates LDEVO# to the core logic chipset 122 (arrow 440).

Accordingly, it can be seen that the VL-bus/PCI-bus bridge translates VL-bus cycles onto the PCI-bus 148 for response by PCI-bus devices. This is accomplished without the need for any special signals between the VL-bus/PCI-bus bridge 146 and either the VL-bus host 102 or the VL-bus/ISA-bus core logic chipset 122. It will be understood that the same is true of VL-bus data write cycles, and VL-bus cycles originated by VL-bus device masters and by the core logic chipset 122 for an ISA-bus master. Essentially the VL-bus/PCI-bus bridge appears to each of the VL-bus devices as a VL-bus target and appears to each PCI-bus device as the host-bus/PCI-bus bridge. It will also be understood that numerous types of PCI-bus transactions are defined in the PCI-bus specification incorporated above, and while only one such transaction type is illustrated in FIG. 4, different situations may result in different PCI-bus transaction types as appropriate or desirable.

Figure 5:
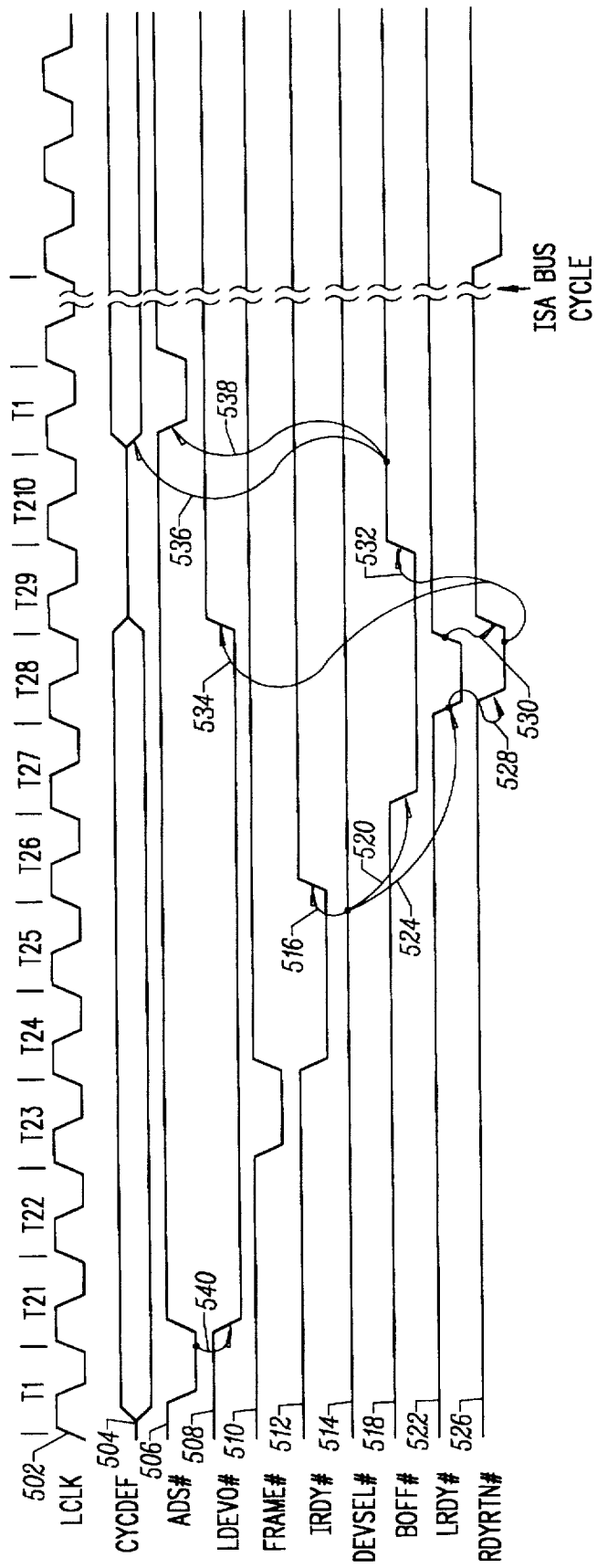

FIG. 5 is a timing diagram illustrating the operation of the system of FIGS. 1 and 2 for a VL-bus read access to a device which resides on the ISA-bus 130 (or to an address to which no device responds). As with FIGS. 3 and 4, the timing diagram of FIG. 5 is simplified for clarity of illustration. Possible variations, and the timing of various signals not shown in FIG. 5, can be gleaned from the above-incorporated references. As with FIGS. 3 and 4, the timing shown in FIG. 5 is the same for a VL-bus master-initiated cycle, except that it is preceded by a bus arbitration procedure.

Referring to FIG. 5, the LCLK signal is illustrated as line 502. Certain signals, such as the VL-bus signals VD and LDEVI#, and PCI-bus signals AD, C/BE#, TRDY#, are omitted from FIG. 5 for clarity. Signal line 504 illustrates the cycle definition signals on the VL-bus 104, and line 506 illustrates the ADS# signal. The VL-bus host 102 drives the cycle definition lines and asserts ADS# during the T1 cycle in order to define a valid VL-bus cycle. At the beginning of T21, the VL-bus/PCI-bus bridge 146 samples ADS# asserted, and asserts LDEVO# in response thereto (line 508 and arrow 540). It is assumed that no other VL-bus device intends to claim the VL-bus cycle, so LDEVI# (not shown in FIG. 5) remains high for the entire process of FIG. 5.

As with the VL-bus cycle illustrated in FIG. 4, after a synchronization delay, the VL-bus/PCI-bus bridge 146 asserts FRAME# during T23 on the PCI-bus 148 as shown at line 510 in FIG. 5. Again, since only one PCI-bus data phase is assumed to be desired, the bridge 146 negates FRAME# during T24. The bridge 146 also asserts IRDY# on the PCI-bus 148 during T24 as indicated at line 512 in FIG. 5.

According to the PCI-bus specification, a PCI-bus controller can be programmed to expect a PCI-bus device claiming signal asserted prior to a PCI-bus claiming deadline which is programmable to be 1, 2 or 3 PCI-clock rising edges after the rising edge at which FRAME# is sampled asserted. This is true of the bridge 146, and it is assumed that the bridge 146 has been programmed for the medium PCI-bus device claiming deadline of two PCI-bus clock cycles. Such programming was accomplished during system boot-up, in which the boot-up code surveyed the PCI-bus devices included in the system and determined that none required longer than two PCI-bus clock cycles to claim a PCI-bus cycle; this information was written into the register address offset 52h(1:0) of the PCI-bus bridge 146. Accordingly, since no PCI-bus device claims the cycle by asserting DEVSEL# by the LCLK rising edge which begins T26, (line 514 in FIG. 5), the VL-bus/PCI-bus bridge 146 issues a "master abort". This negates RDY# (arrow 516).

At this point, since the VL-bus/PCI-bus bridge 146 has asserted LDEVO# to the VL-bus/ISA-bus core logic chipset 122, the chipset 122 will not know that it needs to try finding the destination device on the ISA-bus 130. One solution would be to provide additional signals between the VL-bus/PCI-bus bridge 146 and the core logic chipset 122 in order to so inform the chipset 122, but this would require a modification of standard VL-bus/ISA-bus core logic chipsets such as 122. Accordingly, in the system of FIGS. 1 and 2, the VL-bus/PCI-bus bridge 146, in response to its failure to detect DEVSEL# asserted at the LCLK rising edge which begins T26, asserts BOFF# in T27 to the VL-bus host 102 (line 518 and arrow 520 in FIG. 5). As indicated on line 522 and arrow 524, after assertion of BOFF#, the VL-bus/PCI-bus bridge 146 asserts LRDY# in LCLK cycle T28 to cause the termination of the VL-bus cycle. LRDY# is delayed by one LCLK cycle (programmable to 0, 1 or 2 LCLK cycles) after BOFF# for reasons which will become apparent. As indicated by arrow 528, the VL-bus controller in 122 asserts RDYRTN# in response to detection of LRDY# asserted, and negates RDYRTN# in T29 in response to the negation of LRDY# in T29 (arrow 530). After the PCI-bus bridge 146 detects RDYRTN# asserted at the beginning of LCLK period T29, it negates LDEV# in LCLK period T29 as indicted by arrow 534. It also negates BOFF# in LCLK period T210 as indicated by arrow 532. The delay from RDYRTN# to negation of BOFF#, like the delay from BOFF# to LRDY#, is programmable in PCI-bus bridge 146 in order to be assured that the host CPU has itself received the BOFF# signal despite any time delays in a host-bus/VL-bus bridge in VL-bus host 102.

At the first LCLK rising edge in which BOFF# is sampled negated, the VL-bus host 102 repeats the VL-bus cycle which was aborted by the PCI-bus bridge 146. It does this by starting a new T1 cycle in which it once again drives the cycle definition signals on the VL-bus 104 as indicated on line 504 in FIG. 5, and asserts ADS# as indicated on line 506 in FIG. 5 (arrows 536 and 538, respectively). The VL-bus host 102 negates ADS# in the following LCLK cycle and withdraws the cycle definition signals in due course. Unlike the initial assertion of the VL-bus cycle, however, the VL-bus/PCI-bus bridge 146 does not assert LDEVO# in response to the repetition of the cycle, nor does it assert any signals on the PCI-bus 148. Instead, the VL-bus/ISA-bus core logic chipset 122 performs its usual duties of translating the cycle to the ISA-bus 130 and returning any read data back to the VL-bus VD lines 204. If no ISA-bus device responds to the access, then as in a conventional system, the data which the chipset 122 returns to the VL-bus VD lines 204 will be undefined. The chipset 122 then assert RDYRTN# for one LCLK cycle to end the VL-bus cycle.

The timing relationship between the PCI-bus bridge's assertion of LRDY# and BOFF# (lines 522 and 518 in FIG. 5) solves a problem which could otherwise preclude the use of LDEVO# and BOFF# to add PCI-bus 148 to a conventional system without modifying the core logic chipset 122. In particular, if the PCI-bus bridge 146 were to assert BOFF# without asserting LRDY#, then the VL-bus controller in VL-bus/PCI-bus core logic chipset 122 would not know one VL-bus cycle has ended and a new VL-bus cycle will soon begin, since the chipset 122 does not necessarily receive BOFF#. Other VL-bus devices would have the same problem, since they too do not necessarily receive BOFF#. VL-bus devices need only observe the RDYRTN# line (and BRDY# with BLAST#) to determine that a VL-bus cycle has ended, and RDYRTN# will not occur unless LRDY# is asserted first. On the other hand, the PCI-bus bridge 146 cannot assert LRDY# without asserting BOFF#, since LRDY# causes the VL-bus controller in core logic chipset 122 to assert RDYRTN#, which is connected to the VL-bus host 102 RDY# input. Thus the VL-bus host 102 would consider the VL-bus cycle terminated successfully, and would have no reason to repeat it. Thus the PCI-bus bridge 146 needs to assert both BOFF# and LRDY#.

If the bridge 146 were to assert LRDY# before asserting BOFF#, then once again, the VL-bus controller in chipset 122 would assert RDYRTN# and the VL-bus host 102 would receive RDY# possibly before it receives BOFF#. In this case the VL-bus host 102 would consider the original VL-bus cycle terminated successfully, begin a subsequent (non-repeat) VL-bus cycle, and apply the back-off to the subsequent cycle instead of the original cycle. On the other hand, if the PCI-bus bridge 146 asserts LRDY# too late, such that the core logic chipset 122 does not assert RDYRTN# until after BOFF# has been negated at the input of the host, then the VL-bus host 102 might repeat the back-offed VL-bus cycle before the VL-bus devices, including that in the VL-bus/ISA-bus core logic chipset 122, can reset their VL-bus state machines and prepare to detect it.

According to an aspect of the invention, therefore, the PCI-bus bridge 146 does not assert LRDY# until after it has asserted BOFF#. The 80486 and Pentium-compatible processors ignore their RDY# input while BOFF# is being asserted. Advantageously, the PCI-bus bridge 146 delays assertion of LRDY# by a number of LCLK cycles in order to ensure that the microprocessor itself has had an opportunity to sample BOFF# asserted before (or no later than the LCLK rising edge that) it detects an active RDY# from the RDYRTN# line. This delay, which is programmable in the PCI-bus bridge 146, accommodates any timing delays which might occur between the BOFFB output of PCI-bus bridge 146 and the BOFF# input of the microprocessor itself. Additionally, the PCI-bus bridge 146 does not negate BOFF# until after it detects RDYRTN# asserted. As previously mentioned, advantageously the PCI-bus bridge 146 can be programmed to delay negation of BOFF# by one or two additional LCLK cycles in order to ensure that BOFF# is still asserted at the host microprocessor BOFF# input when the microprocessor's RDY# input is asserted.

The timing diagram of FIG. 5 also describes a VL-bus master-initiated access to an ISA-bus device. VL-bus devices are not required to receive BOFF#, but they do receive a WBACK# signal. In a conventional system, WBACK# is typically connected to the HITM# output of a Pentium-based VL-bus host. The Pentium contains an on-chip write-back cache memory, and it asserts HITM# whenever it has an internal cache miss and a write-back to system memory is required. When a bus master detects HITM# asserted (e.g. via a WBACK# input), the bus master is required to immediately abort its cycle and float all address data and control signals that it drives as master. When the device later samples WBACK# inactive, the device may restart the bus cycle with a new ADS#.

Conveniently, this required operation of a VL-bus master in response to WBACK# is the same as the operation of the VL-bus host in response to BOFF#. Thus VL-bus masters can be accommodated in a system incorporating the invention, by coupling the BOFFB output of the PCI-bus bridge 146 to the WBACK# inputs of each such device. In systems having a write-back cache, the BOFFB signal can be ANDed with HITM# such that either HITM# or BOFFB will force the VL-bus master to perform a backoff function.

As previously mentioned, some VL-bus implementations are built around a host microprocessor whose data path is twice as wide as the VD lines 204 on VL-bus 104. Such is the case for systems built around the Intel Pentium microprocessor, for example. In order to accommodate these arrangements, a conventional VL-bus system includes a host-bus/VL-bus bridge (not shown) within the VL-bus host 102 of FIG. 2. Such a bridge will assert two accesses on the VL-bus in response to each access on the host bus if the data path on the host bus is twice as wide as that on the VL-bus 104. Described more generally, since it is also possible that a future system could be built around a microprocessor whose data path is four times as wide as the VD lines 204, or more, such bridge will assert a "plurality" of accesses on the VL-bus 104 in response to each access on the host bus (not shown).

In order to accommodate a situation where the host-bus data path is twice as wide as the VL-bus data path, the VL-bus/PCI-bus bridge 146 uses its BE4# input pin to determine whether two VL-bus "sub-cycles" are being issued for each host-bus cycle. In systems whose CPUs have only a 32-bit wide data bus, such as 486 systems, the BE4# input pin is strapped high. In Pentium systems, the BE4# input of the bridge 146 is connected to the BE4# address lead of VL-bus 104. If BE4# is high in a particular cycle, then only one sub-cycle will occur. If BE4# is low in the particular cycle, then two sub-cycles will occur. In the latter case the VL-bus/PCI-bus bridge 146 will assert LDEVO# and subsequently LRDY# for both of the sub-cycles, but will assert BOFF# only for the last such sub-cycle. On repetition, the VL-bus/PCI-bus bridge 146 blocks assertion of LDEVO# for both sub-cycles of the host bus cycle repetition. In this manner, the host-bus/VL-bus bridge (not shown) also need not be modified in any way to accommodate the addition of a VL-bus/PCI-bus bridge such as 146.

In the computer system illustrated in FIGS. 1 and 2, any ISA-bus device, PCI-bus device or VL-bus device, in addition to the VL-bus host 102, can be a master for any particular access. The target for such accesses can be main memory (not shown in FIG. 2), or any ISA-bus device, PCI-bus device, or VL-bus device. The VL-bus/PCI-bus bridge therefore accommodates a wide variety of different kinds of accesses, only some of which have been described in detail with respect to FIGS. 3, 4 and 5. Such descriptions are sufficient for an understanding of the invention, but for completeness, an overview of the remainder of the cycle permutations is included in Appendix E.

FIGS. 6 through 10 are schematic diagrams of pertinent portions of the VL-bus/PCI-bus bridge 146 which control various signals used for implementing the invention. While the descriptions above and in the appendices are sufficient to enable implementation of the invention, descriptions at the schematic level for some aspects are provided for those interested in more details about an example implementation.

Figure 6:
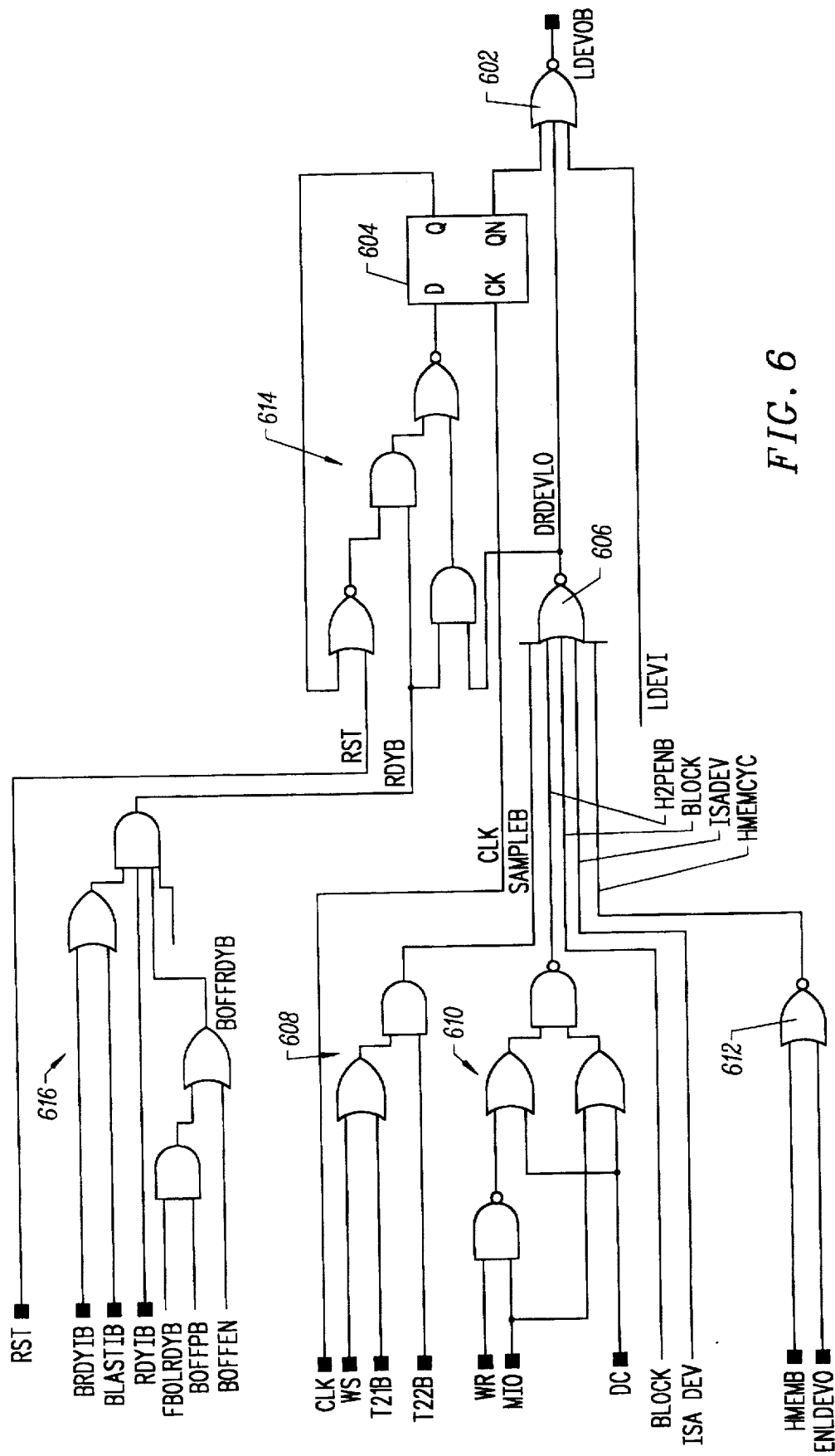
FIGS. 6–10 are schematic diagrams of circuitry in the VL-bus/PCI-bus bridge of FIG. 2.

FIG. 6 is a schematic diagram for circuitry which generates the LDEVOB output of the PCI-bus bridge 146. It comprises a 3-input NOR gate 602 which generates such a signal, the three inputs of which receive a QN output of a D-flip-flop 604, a DRDEVLO signal, and an LDEVI signal. The LDEVI signal is the inverse of the LDEVIB input of PCI-bus bridge 146. The DRDEVLO signal is generated by a 5-input NOR gate 606, the five inputs of which receive signals labeled: SAMPLEB, H2PENB, BLOCK, ISADEV and HMEMCYC. The SAMPLEB signal is generated by gates 608 in response to WS, T21B and T22B signals according to the formula:

$$SAMPLEB = (WS + T21B) \cdot T22B.$$

WS is a programmable signal which is asserted high to indicate that the LCLK signal is operating at a high enough frequency such that the local device claiming deadline is to be delayed by one wait state. T21B is a signal generated by means not shown in the PCI-bus bridge 146, which is asserted low at the beginning of T21 (see FIG. 3, for example) and returns high at the beginning of T22. The T22B signal is asserted low by means not shown in the PCI-bus bridge 146 at the beginning of T22, and returns high at the beginning of T23.

The H2PENB signal is generated by logic 610 in response to the following signals from the VL-bus 104 (FIG. 2): WR, MIO, and DC. The formula to produce H2PENB is:

$$H2PENB = WR \cdot MIO \cdot \overline{DC} + \overline{MIO} \cdot DC.$$

The BLOCK signal is generated by circuitry described below with respect to FIG. 10, and the ISADEV signal is generated by circuitry (not shown) which, based on a positive decode of the cycle definition signals on VL-bus 104 asserts ISADEV when the intended recipient of the bus cycle is known to reside on the ISA-bus 130 (FIG. 2). The HMEMCYC signal is generated by NOR gate 612, the two inputs of which receive an HMEMB signal and an ENLDEVO signal, respectively. The HMEMB signal corresponds to the LMEM# input of the PCI-bus bridge 146 (see Appendix E) or, depending on a register bit selection, a positive decode of the VL-bus cycle definition signals. If the PCI-bus bridge 146 is programmed to perform such a positive decode, then circuitry (not shown) in PCI-bus bridge 146 asserts HMEMB low when the destination of the cycle is known to be host memory on the host memory bus or VL-bus 104. ENLDEVO is a register bit which is programmable to enable (when asserted high) or disable (when low) the use of HMEMB in the determination of whether to assert LDEVOB.

The flip-flop 604 has a clock input connected to receive CLK, which is the LCLK signal on VL-bus 104. The flip-flop 604 also has a D input connected to receive the output of logic 614, which generates the D input according to the formula:

$$D = [DRDEVLO + (Q \cdot \overline{RST})] \cdot RDYB.$$

In this formula, Q is the Q output of flip-flop 604, RST is a chip-wide reset signal, and DRDEVLO is a signal generated by NOR gate 606 discussed above. RDYB is generated by logic circuitry 616 according to the inverse of the formula:

$$RDY = BRDYI \cdot BLASTI + RDYI + BOFFRDY + Other,$$

where BRDYI and BLASTI are the VL-bus BRDY# and BLAST# signals, respectively; RDYI is connected to the VL-bus RDYRTN# signal line; and "Other" represents other ready signals not important for an understanding of the present invention. BOFFRDY is given by the formula:

$$BOFFRDY = (FBOLRDY + BOFFP) \cdot \overline{BOFFEN},$$

where FBOLRDY and BOFFP are both generated by circuitry described below with respect to FIGS. 9 and 7, respectively, and BOFFEN is a register bit which enables the entire back-off process when set.

In operation, the circuitry of FIG. 6 asserts LDEVOB low in response to a logic high value on any of the three inputs of NOR gate 602. Thus due to the LDEVI input, it can be seen that whenever any VL-bus device asserts one of the LDEV<∞># signal lines in FIG. 2, the LDEVI# signal provided to the PCI-bus bridge 146 will pass therethrough to the LDEV# input of the VL-bus/ISA-bus core logic chipset 122. The other circuitry in FIG. 6 also will activate LDEVOB in most cases, so LDEVOB will remain asserted until the VL-bus device unasserts LDEV<∞># or until the flip-flop 604 QN output goes low, whichever occurs later.

The remainder of the circuitry of FIG. 6 operates by asserting DRDEVLO before the VL-bus device claiming deadline, to thereby assert LDEVOB, and by maintaining LDEVOB asserted with the flip-flop 604 until an appropriate ready signal has been received by the PCI-bus bridge 146. More specifically, NOR gate 606 will assert DRDEVLO only when all five of its inputs are low. The SAMPLEB signal is a temporal qualifier on the assertion of DRDEVLO, since SAMPLEB is asserted low only during T22 (for systems with LCLK operating at frequencies greater than or equal to 40 MHz) or during T21 and T22 (for systems operating at LCLK frequencies less than or equal to 33 MHz). The inverse of SAMPLEB is given by:

$$SAMPLE = (WS \cdot T21) + T22$$

Thus if NOR gate 606 asserts DRDEVLO at all, it unasserts DRDEVLO at the beginning of T23.

The H2PENB input of NOR gate 606 is asserted low unless the cycle definition signals on VL-bus 104 indicate that the present cycle is an interrupt acknowledge cycle, a halt/special cycle, or a reserved cycle, all as defined at page 7 of the above-incorporated "i486 MICROPROCESSOR" Databook. These are VL-bus cycles which are known in advance not to be destined for any device residing on the PCI-bus bridge 148.

The BLOCK signal input of NOR gate 606 will block assertion of DRDEVLO only if the current VL-bus cycle definition is a repeat of a prior VL-bus cycle for which the PCI-bus bridge 146 asserted BOFF# to the VL-bus host 102. In Pentium-based systems, BLOCK remains asserted for the repetition of both sub-cycles in a repeat of a BOFF#'d host cycle. The BLOCK signal therefore prevents the PCI-bus bridge 146 from claiming the repetition of a VL-bus cycle which the PCI-bus bridge 146 has already attempted on the PCI-bus 148. The circuitry which generates BLOCK is described below with respect to FIG. 10.

The ISADEV signal of NOR gate 606 is asserted high on a positive decode indicating that the target of the current VL-bus cycle is already known to reside on the ISA-bus 130. The ISADEV signal thus prevents the PCI-bus bridge 146 from claiming the cycle and trying it on the PCI-bus first. Note that another embodiment of the invention need not prevent this attempt, but rather can rely on the BOFF# procedures described herein for the cycle eventually to reach the ISA-bus 130.

The HMEMCYC signal is asserted high on a positive decode of the VL-bus cycle, performed either inside or outside the PCI-bus bridge chip 146, to indicate that the access is to host memory. The positive decode, if performed internally to the PCI-bus bridge 146, is performed identically, with a parallel set of configuration registers, to that in the VL-bus/ISA-bus core logic chipset 122. The PCI-bus bridge 146 further includes a register bit ENLDEVO which can be used to permit NOR gate 606 to assert DRDEVLO even if the positive decode indicates that the VL-bus cycle destination is in fact host memory; an attempt by the PCI-bus bridge 146 to claim such a cycle by asserting LDEVO# would not have any effect in most systems because most VL-bus/ISA-bus core logic chipsets ignore their LDEV# inputs when their own internal decode indicates that the VL-bus cycle is to host memory.

Thus it can be seen that the circuitry of FIG. 6 will assert LDEVOB in either the T21 or T22 states of the VL-bus host 102, whichever is appropriate, unless the current VL-bus cycle is a repeat of a prior VL-bus cycle which was subject to BOFF#, and unless it is known in advance that the target of the VL-bus cycle is not on the PCI-bus 148. The latter condition, which may be omitted in whole or in part in a different embodiment, occurs in the present embodiment when it is known in advance that the cycle is a special kind of cycle defined only for targets which do not reside on the PCI-bus, if at all (H2PENB), when the target is known in advance to reside on the ISA-bus 130 (ISADEV), and when the VL-bus cycle is known in advance to be destined for host memory.

When DRDEVLO is asserted, its inverse is written into D-flip-flop 604 on the next LCLK rising edge in order to maintain a logic 1 input of NOR gate 602 from the QN output of flip-flop 604. The logic 614 repeatedly rewrites this value into flip-flop 604 until either a system-wide reset occurs, or RDYB is asserted low by circuitry 616. Circuitry 616 asserts RDYB low upon receipt of RDYRTN# asserted by the VL-bus controller 122. It asserts RDYB low also when it detects both BRDY# and BLAST# asserted on VL-bus 104. Thus the circuitry of FIG. 6 maintains LDE-VOB asserted until the rising edge of LCLK which follows completion of the VL-bus cycle which the circuitry claimed by asserting LDEVOB. Note that as described in more detail below, if the PCI-bus bridge 146 did translate the cycle onto the PCI-bus bridge 148, then the RDYRTN# signal will be asserted by the VL-bus controller 122 only after having detected LRDY# asserted by the PCI-bus bridge 146. If the circuitry of FIG. 6 had asserted LDEVOB only because another VL-bus device had caused the assertion of LDEVI, then the cycle will have been terminated only in response to ready signals from the VL-bus device which had claimed the cycle.

The logic circuitry 616 asserts RDYB also in response to a pulse on FBOLRDY or BOFFP, but only if the PCI-bus bridge 146 has been programmed to defeat the back-off feature (BOFFEN=0). FBOLRDY and BOFFP each carry a high-going pulse for one LCLK cycle in response to a master-abort on the PCI-bus 148, although the FBOLRDY pulse occurs only if the current VL-bus cycle is the first sub-cycle of a Pentium cycle, and the BOFFP pulse occurs only if the current VL-bus cycle is anything other than the first sub-cycle of a Pentium cycle. These pulses occur only after the PCI-bus bridge 146 has translated a cycle onto the PCI-bus 148, and failed to detect a PCI-bus device claiming signal prior to the PCI-bus device claiming deadline. Accordingly, if the back-off feature of PCI-bus bridge 146 has been disabled, the logic circuitry 616 causes the release of LDEVO# if the PCI-bus bridge 146 attempted, but failed, to find a target device on the PCI-bus 148. In this case, with BOFFEN=0, it is then up to external circuitry (not shown) to handle the VL-bus cycle.

Figure 7:
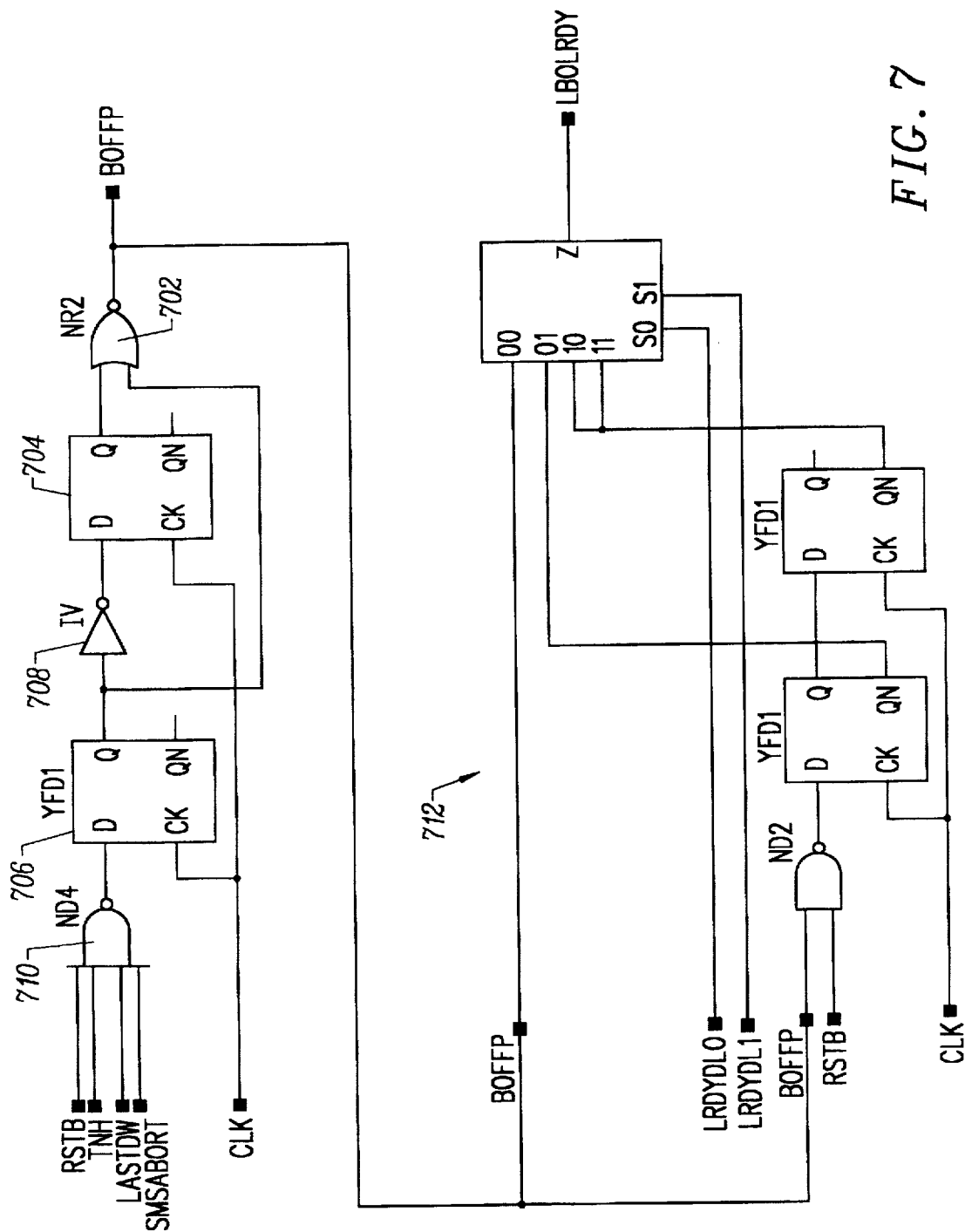

FIG. 7 is a schematic diagram of circuitry in the PCI-bus bridge 146 which generates the BOFFP signal used in the circuitry of FIG. 6. FIG. 7 also shows circuitry which generates an LBOLRDY signal, and this will be described subsequently. Referring to FIG. 7, the BOFFP signal is the output of a NOR gate 702, one input of which is connected to the Q output of a D-flip-flop 704, the D input of which is connected to the Q output of a flip-flop 706 via an inverter 708. The second input of NOR gate 702 is connected to the Q output of flip-flop 706. Both flip-flops 704 and 706 are clocked by the CLK signal which is connected to the VL-bus LCLK line.

The D input to flip-flop 706 connected to the output of a 4-input NAND gate 710, the inputs of which are connected to signals labeled RSTB, TNH, LASTDW and SMSABORT. The RSTB signal is the system-wide reset signal as previously described. TNH indicates the state of the state machine in PCI-bus bridge 146 which controls PCI-bus cycles. While the details of this state machine are unimportant for an understanding of the present invention, it will be useful to understand that the state machine is in state TNH (TNH=1) while the PCI-bus bridge is controlling a PCI-bus cycle, and is in a TH state (TH=1) while a VL-bus cycle is in process but the PCI-bus bridge 146 will not translate it onto the PCI-bus. The LASTDW signal is generated by circuitry described below with respect to FIG. 8, and basically is asserted during all VL-bus cycles in non-Pentium-based systems, and only during the last data word sub-cycle in Pentium-based systems. Thus LASTDW indicates that the present VL-bus cycle is the last (or only) sub-cycle of a 32-bit or 64-bit access. The SMSABORT signal is generated by circuitry described below with respect to FIG. 9. Essentially it is a PCI-bus master-abort signal, synchronized to the VL-bus LCLK if necessary.

The flip-flop 704 and 706, together with the inverter 708 and NOR gate 702, produce a high-going pulse on the BOFFP in response to a high-to-low transition on the output of NAND gate 710. The output of NAND gate 710 will go low only when all of its inputs are high. Thus it can be seen that the circuitry in FIG. 7 will generate a high-going BOFFP pulse, for one LCLK cycle, in response to a master-abort which occurs while the PCI-bus bridge 146 is translating the last VL-bus cycle of a 32-bit or 64-bit access, onto the PCI-bus 148. As previously mentioned, the circuitry does not generate a pulse on BOFFP if the system is Pentium-based, and the current VL-bus cycle is only the first sub-cycle of a Pentium access. (Note that while reset signals are incorporated throughout the schematic diagrams set forth herein, they are asserted only in unusual situations not relative to an understanding of the present invention. Thus, while their effect can be determined from the schematics, it is unnecessary to describe such effects as well. Hereinafter, reset signals will always be assumed to be unasserted.)

Figure 8:
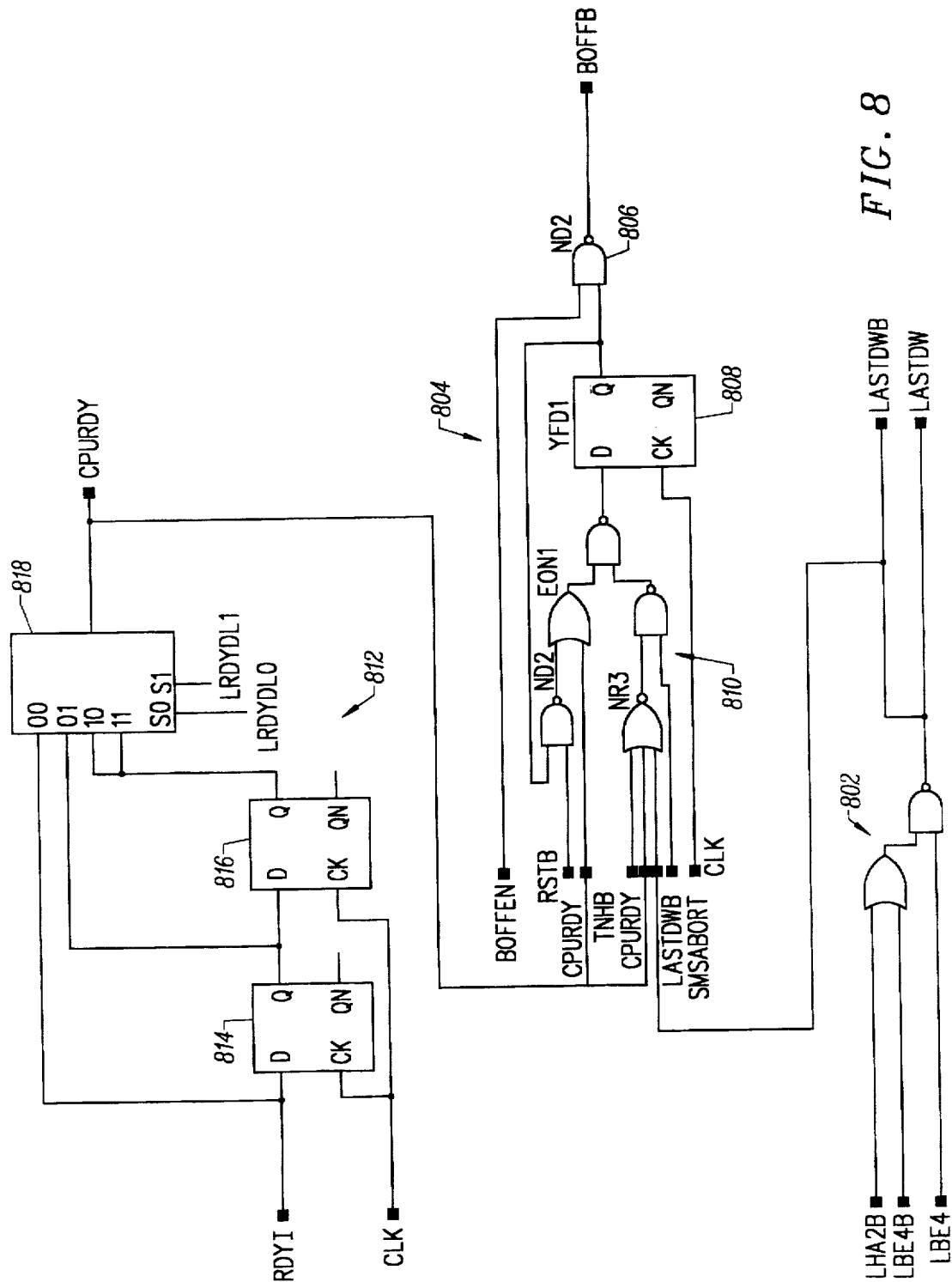

The LASTDW signal is generated by circuitry 802 in FIG. 8 according to the formula:

$$LASTDW = \overline{LBE4} + (LHA2 \cdot LBE4).$$

LHA2 is the $2^2$ address bit on the VL-bus 104, and therefore indicates whether the current VL-bus cycle is to an even- or odd-numbered data word address. In non-Pentium-based systems, VL-bus cycles can be addressed to any 32-bit data word. But in Pentium-based systems, a 64-bit access always appears on a 32-bit VL-bus as an access to an even-numbered data word followed by an access to an odd-numbered data word. Thus for Pentium-based systems only, LHA2 indicates which sub-cycle is currently taking place on the VL-bus in response to a 64-bit access.

LBE4 is an input pin which, when asserted, indicates that the system is a Pentium-based system. Thus the circuitry 802 asserts LASTDW whenever the system is not a Pentium-based system ($\overline{LBE4}=1$), and if it is a Pentium-based system, asserts LASTDW only during the second sub-cycle of a 64-bit access.

Figure 9:
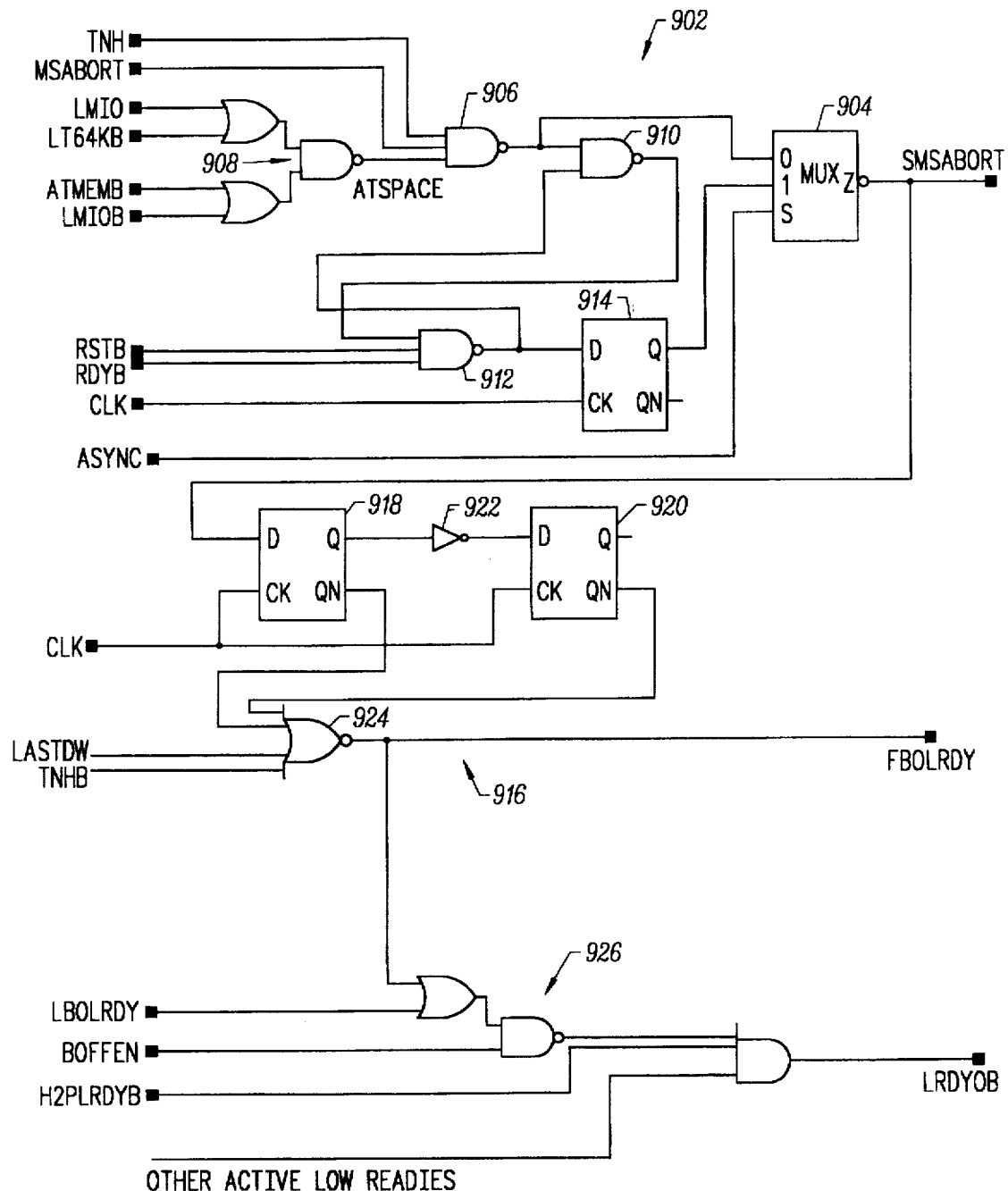

The SMSABORT signal used in the circuitry of FIG. 6 is generated by circuitry 902 in FIG. 9. Circuitry 902 includes an inverting multiplexer 904, the output of which produces SMSABORT. The multiplexer 904 has a '0' input, a '1' input and a select input S, the last of which is connected to receive an ASYNC signal from a register bit. The '0' input of multiplexer 904 is connected to the output of a NAND gate 906, the three inputs of which are connected to receive TNH, MSABORT and an ATSPACE signal. The TNH signal has been described previously, and the MSABORT signal is generated by the PCI-bus bridge 146 in response to the failure of any PCI-bus device to claim a cycle on the PCI-bus 148 prior to the PCI-bus device claiming deadline. The ATSPACE signal is produced by circuitry 908 according to the formula:

$$ATSPACE = (\overline{LMIO} \cdot LT64K) + (LMIO \cdot ATMEM),$$

where LMIO is a latched version of the VL-bus M/IO# signal. ATSPACE is asserted for VL-bus I/O cycles to an address within the 64 k I/O memory space, and for VL-bus memory cycles to an address within the 16-megabyte memory address space which can be supported on a standard ISA bus. (In an EISA implementation, the 16-megabyte limitation would be omitted since the EISA-bus supports a full 4 GB of memory address space.) Thus ATSPACE is high for accesses which could possibly be directed to devices residing on the ISA-bus 130; more intuitively, if ATSPACE is low, then the current VL-bus cycle cannot be directed to a device on the ISA-bus 130.

The output of NAND gate 906, in addition to being connected to the '0'input of multiplexer 904, is also connected to one input of a 2-input NAND gate 910, the other input of which is connected to the output of a 3-input NAND gate 912. The output of NAND gate 910 is cross-coupled to one of the inputs of NAND gate 912. The other two inputs of NAND gate 912 are connected to receive RSTB and a ready signal RDYB previously described with respect to FIG. 6. The output of NAND gate 912 is connected to the D input of a flip-flop 914 which is also clocked by LCLK. The output of flip-flop 914 is connected to the '1' input of multiplexer 904.

The circuitry 902 operates in either a synchronous mode or an asynchronous mode, depending on the programming of register bit ASYNC. Basically, if the clock signal on the VL-bus and the PCI-bus are the same, then ASYNC=0 and multiplexer 904 selects the output of NAND gate 906 directly for driving the SMSABORT signal. If the two clocks are asynchronous, either because they operate at different speeds or because clock skew considerations suggest that re-synchronization be performed, the VL-bus host 102 will have programmed ASYNC=1. In this situation, multiplexer 904 selects the LCLK-synchronized output of flip-flop 914 to drive SMSABORT. Essentially cross-coupled NAND gates 910 and 912 latch the signal output of NAND gate 906, and flipflop 914 synchronizes the result with the VL-bus LCLK signal. The latch is cleared when circuitry 616 (FIG. 6) asserts RDYB, indicating either completion of the VL-bus cycle or, if the back-off feature of PCI-bus bridge 146 is disabled, an appropriate time to clear SMSABORT.

Thus circuitry 902 asserts SMSABORT whenever the output of NAND gate 906 goes low. This occurs only when all three inputs of NAND gate 906 are high, thereby requiring (1) that a master abort have occurred on the PCI-bus 148 (MSABORT=1); (2) that the VL-bus cycle not be to a memory or I/O address which clearly cannot reside on the ISA- bus 130 (ATSPACE=1); and (3) that the PCI-bus bridge 146 presently be translating a cycle onto the PCI-bus 148 (TNH=1) (i.e. SMSABORT will not be asserted if the bridge 146 is not acting as the PCI-bus master).

The FBOLRDY signal, the inverse of which is used in FIG. 6, is generated by circuitry 916 in FIG. 9. Circuitry 916 includes a pulse generator comprising D flip-flops 918 and 920 separated by inverter 922, and 4-input NOR gate 924. The QN outputs of flip-flops 918 and 920 are connected to respective inputs of NOR gate 924, the other two inputs of which are connected to receive LASTDW (previously described) and the inverse of TNH (previously described). It can be seen that if LASTDW=0 and TNH=1, then circuitry 916 will produce a high-going pulse for one LCLK period on FBOLRDY, in response to a high-to-low transition of SMSABORT. The high-going pulse on FBOLRDY will be prevented if TNH=0, indicating that any PCI-bus cycle which resulted in a master-abort was not generated by PCI-bus bridge 146. The high-going pulse on FBOLRDY will be prevented also if LASTDW=1, which occurs for all VL-bus cycles except for the first sub-cycle of a 64-bit Pentium access. Thus considering the circumstances under which circuitry 902 generates SMSABORT, circuitry 916 will produce a high-going pulse on FBOLRDY only in response to a master-abort on the PCI-bus 148, occurring during a PCI-bus cycle originated by PCI-bus bridge 146 (TNH=1) in response a VL-bus cycle which constitutes the first subcycle of a Pentium-based 64-bit access.

Circuitry 804 of FIG. 8 generates the BOFFB signal for driving the BOFF# input of VL-bus host 102. Referring to FIG. 8, BOFFB is produced by a 2-input NAND gate 806, one input of which is connected to receive the register programmable BOFFEN signal previously described. The other input of NAND gate 806 is connected to the Q output of a D-flip-flop 808 clocked by LCLK. The D input of flip-flop 808 is driven by circuitry 810 according to the formula:

$$D = (TNH \cdot \overline{CPURDY} \cdot LASTDW \cdot SMSABORT) + (Q \cdot \overline{RST} \cdot \overline{CPURDY}).$$

All signals in this formula have been previously described except Q and CPURDY. Q is the output of flip-flop 808, and CPURDY is the output of circuitry 812 (FIG. 8), comprising sequential D-flip-flops 814 and 816 and 4:1 multiplexer 818. The input to the circuitry 812 is the RDYI signal, which is connected to receive RDYRTN# from the VL-bus controller in 122.

The two select inputs of multiplexer 818 are connected to receive two register bits LRDYDL0 and LRDYDL1. In a system with no bridge between the host CPU and the VL-bus 104, the LRDYDL0 and LRDYDL1 signals (collectively, the LRDYDL signals) would be programmed such that multiplexer 818 passes RDYRTN# directly through to CPURDY. In systems which include a host-bus/VL-bus bridge, the LRDYDL signals can be programmed to have multiplexer 818 pass to CPURDY either the Q output of flip-flop 814 or the Q output of flip-flop 816. These represent versions of RDYRTN# delayed by one and two LCLK cycles, respectively. Thus by proper programming of the LRDYDL register bits, the circuitry 812 asserts CPURDY only after it is certain that the RDYRTN# signal on VL-bus 104 has reached and been detected by the host CPU itself on its RDY# input.

In the operation of circuitry 804, referring to the above formula for the D input of flip-flop 808, the NAND gate 806 will never assert BOFFB unless the back-off feature of PCI-bus bridge 146 is enabled (BOFFEN=1). If it is enabled, then the circuitry will assert BOFFB when the first term of the above formula is true. It will hold BOFFB asserted until both terms of the above-formula are false--usually the second term will be true for the longest period of time. The first term will be true in response to a master-abort on the PCI-bus 148 (SMSABORT=1) which was controlled by the PCI-bus bridge (TNH=1) in response to either the only sub-cycle of a 32-bit access or the last sub-cycle of a Pentium 64-bit access (LASTDW=1). CPURDY must also be negated, but this is always the case at the time of SMSABORT. The circuitry 804 will hold D asserted due to the second term of the above formula, until CPURDY is asserted to indicate that RDYRTN# has already reached the host CPU.

As previously described and as described in more detail with reference to schematics below, the assertion a by PCI-bus bridge 146 of LRDY# to terminate the VL-bus cycle in the view VL-bus devices, must reach the host CPU neither before nor after BOFF# in order to ensure that the CPU will ignore it. The VL-bus controller 122 generates the signal (RDYRTN#) which drives the RDY# input of the CPU for one LCLK cycle, in response the PCI-bus bridge's assertion of LRDY#. Thus by maintaining BOFFB asserted until 0, 1 or 2 LCLK cycles (as appropriate) after the PCI-bus bridge 146 detects RDYRTN# asserted, circuitry 804 ensures that the BOFF# input of the host CPU will still be active when the host CPU receives an active RDY#.

The LRDYOB signal output of the PCI-bus bridge 146, which drives the LRDY# line of VL-bus 104, is generated by circuitry 926 in FIG. 9, according to the inverse formula:

LRDYO=(FBOLRDY+LBOLRDY)·BOFFEN+H2PLRDY+Others.

The circuitry 926 will assert LRDYOB in response to any one of several readies. In particular, it will assert LRDYOB when a PCI-bus-bridge-originated PCI-bus cycle terminates normally (H2PLRDYB=0), as well as when any of several other readies are received (collectively called "Others"). If the back-off feature is enabled (BOFFEN=1), then circuitry 926 asserts LRDYOB also in response to a pulse on either FBOLRDY or LBOLRDY. FBOLRDY, as previously explained, carries a pulse in response to SMSABORT only if the current VL-bus cycle, which the PCI-bus bridge 146 attempted on the PCI-bus 148 prior to master-abort, was the first sub-cycle of a Pentium 64-bit access. Like BOFFP, described above, LBOLRDY carries a pulse in response to SMSABORT only if the current VL-bus cycle, which the PCI-bus bridge 146 attempted on the PCI-bus 148 prior to master-abort, was the only sub-cycle of a non-Pentium 32-bit access or the last sub-cycle of a Pentium 64-bit access. LBOLRDY is generated from BOFFP by circuitry 712 in FIG. 7, which merely delays the BOFFP pulse by 0, 1 or 2 LCLK cycles depending the programming of the LRDYDL bits. By delaying LBOLRDY in this manner, the PCI-bus bridge 146 ensures that for VL-bus cycles in which BOFF# is asserted to the host CPU, the RDYRTN# signal will not reach the CPU's RDY# input any earlier than BOFF#.

As can be seen, for non-Pentium systems, PCI-bus bridge 146 will generate both BOFF# and LRDY# when its attempt to find a target device on the PCI-bus 148 fails. In a Pentium-based system, the PCI-bus bridge 146 will assert LRDY# in both such sub-cycles, but will assert BOFF# only in the last sub-cycle of the Pentium 64-bit access.

Figure 10:
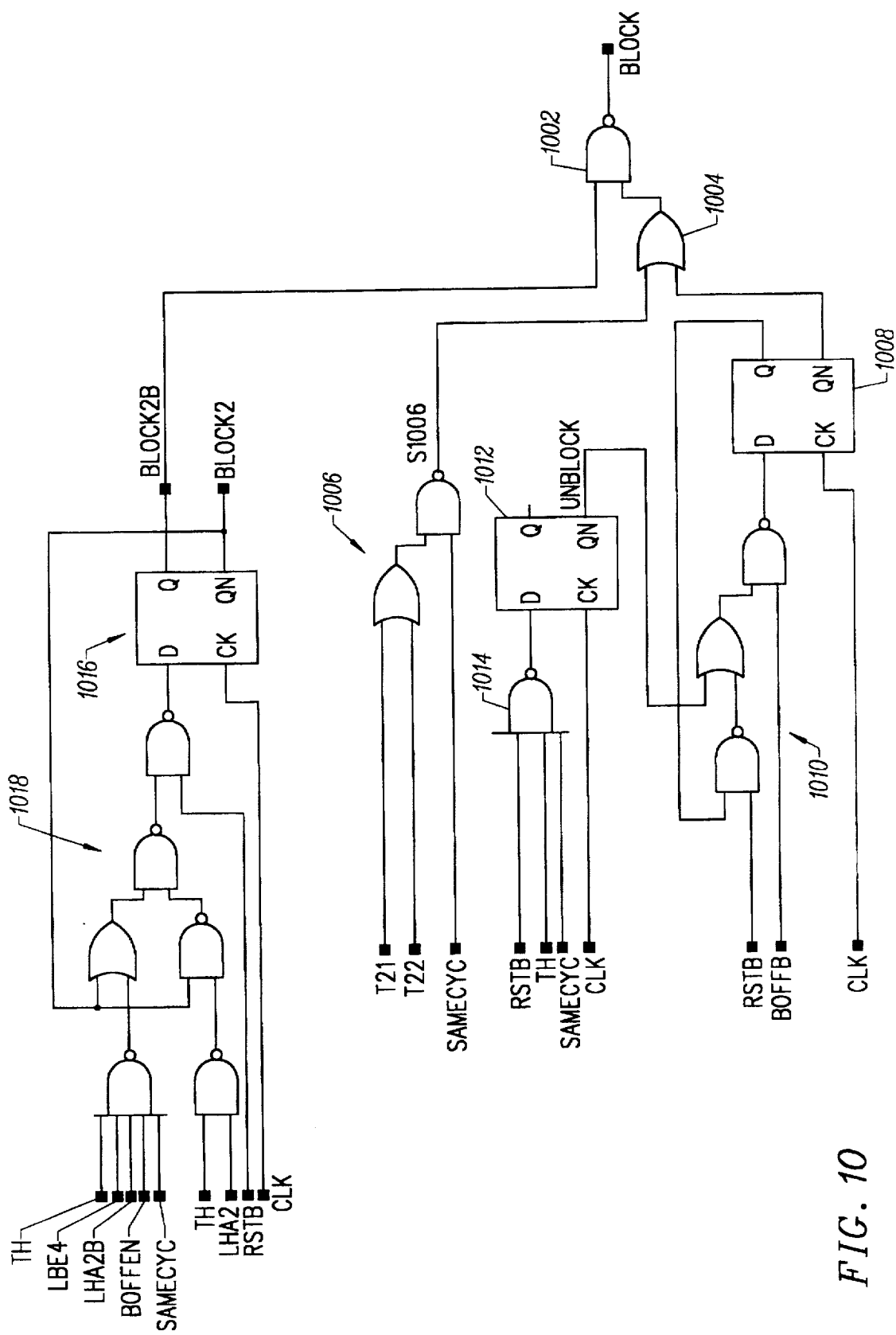

FIG. 10 illustrates circuitry which produces the BLOCK signal used in FIG. 6 to block DRDEVLO when the VL-bus host 102 repeats a cycle which has been subject to BOFF#. As shown in FIG. 10, BLOCK is produced by 2-input NAND gate 1002, one input of which is connected to receive a BLOCK2B signal, and the other of which is connected to the output of an OR gate 1004. One input of OR gate 1004 is connected to the output of logic 1006, which asserts its output low according to the formula:

$$\overline{S1006}=(T21+T22)\cdot SAMECYC.$$

SAMECYC is a signal generated by circuitry (not shown) in the PCI-bus bridge 146 which indicates that the current VL-bus cycle definition signals match those previously latched for the VL-bus which is subject to the BOFF#. For Pentium-based systems, SAMECYC is asserted on both sub-cycles of a Pentium 64-bit access.

The other input of OR gate 1004 is connected to the QN output of a D-flip-flop 1008, the D input of which is connected the output of circuitry 1010 which drives D according to the formula:

$$D=BOFF+(Q\cdot \overline{RST}\cdot \overline{UNBLOCK}).$$

UNBLOCK is the QN output of a D flip-flop 1012, the D input of which is connected to the output of a 3-input NOR gate 1014. The three inputs of NOR gate 1014 are connected to receive RSTB, TH and SAMECYC.

The BLOCK2B signal is the Q output of a D flip-flop 1016, the D input of which is connected to the output of logic 1018 implementing the inverse of the formula:

$$\overline{D}=\{[(TH\cdot LBE4\cdot \overline{LHA2}\cdot BOFFEN\cdot SAMECYC)\cdot \overline{BLOCK2}]+[(TH+\overline{LHA2})\cdot BLOCK2]\}\cdot \overline{RST}.$$

In operation, NAND gate 1002, in combination with OR gate 1004, asserts BLOCK whenever BLOCK2B goes low and whenever both the output of circuitry 1006 and the QN output of flip-flop 1008 are low. Essentially, the QN output of flip-flop 1008 goes low when BOFFB is asserted, and remains low until flip-flop 1012 asserts UNBLOCK. Flip-flop 1012 asserts UNBLOCK when the cycle repetition appears. Circuitry 1006 temporally qualifies BLOCK by allowing the QN output of flip-flop 1008 to pass through OR gate 1004 only during T21 and T22 of the cycle repetition.

Since flip-flop 1008 is cleared when the cycle repetition appears, its QN output is no longer low during the second sub-cycle of a Pentium-based 64-bit access. In this situation, BLOCK2B is low. Referring to the above formula for the D input of flip-flop 1016, it can be seen from the first term that a logic 0 will be written into the flip-flop on the first sub-cycle (LHA2=0) of the cycle repetition (SAMECYC=1) of a Pentium-based (LBE4=1) host memory cycle (TH=1) in a system where the back-off feature of PCI-bus bridge 146 is enabled (BOFFEN=1). Thereafter, since BLOCK2=1, the second term of the formula will control the writing of a logic 1 into the flip-flop 1016. Specifically, the circuitry 1018 will maintain BLOCK2B=0 until the end of the second (LHA2=1) host memory (TH=1) VL-bus cycle of the Pentium 64-bit access.

Thus the circuitry of FIG. 10 will correctly block assertion by the PCI-bus bridge 146 of LDEVO# for the only sub-cycle of the repetition of a BOFF#'d non-Pentium-originated access, and for both sub-cycles of a repetition of a BOFF#'d Pentium 64-bit access.

As used herein, a given signal or event is "responsive" to a predecessor signal or event if the predecessor signal or event influenced the given signal or event. If there is an intervening processing element or time period, the given event or signal can still be "responsive" to the predecessor signal or event. If the intervening processing element combines more than one signal or event, the signal output of the processing element is considered "responsive" to each of the signal or event inputs. If the given signal or event is the same as the predecessor signal or event, this is merely a degenerate case in which the given signal or event is still considered to be "responsive" to the predecessor signal or event.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, adaptations will be apparent for using the invention with an EISA bus instead of an ISA bus. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX A VL-BUS SIGNALS

The following signals are defined in the VL-bus standard 1.0.

| VL-BUS SIGNAL NAME | VL-BUS SIGNAL DESCRIPTION |
| --- | --- |
| RESET# | System reset. |
| LCLK | VL-bus clock signal. This is 1x clock that follows the same phase as a 486-type CPU clock signal. It is driven by the VL-bus controller to all VL-bus masters and targets. In the case of CPUs that use a clock running at 2x, the 2x clock must be divided down to a 1x clock to drive this signal line. The rising edge of the clock signifies the change of CPU states. |
| RDYRTN# | Ready return. This signal establishes a handshake to enable VL-bus devices to know when a VL-bus cycle has ended. If there is no bridge between the VL-bus and the host CPU, then RDYRTN# will typically be tied directly to the CPU or cache controller RDY# input line. RDYRTN# is always driven by the VL-bus controller. For LCLK speeds up to 33 MHz, the VL-bus controller will typically assert RDYRTN# in the same LCLK cycle as LRDY# is asserted. At higher LCLK speeds, RDYRTN# may trail LRDY# by one LCLK cycle to enable the VL-bus controller to perform signal resynchronization. The RDYRTN# signal allows all VL-bus devices to monitor one signal that strobes the end of all types of VL-bus cycles. However, while some VL-bus controllers assert RDYRTN# also in response to BRDY# with BLAST#, this is not a requirement and VL-bus devices should also monitor BRDY# and BLAST# to reliably detect the end of all VL-bus cycles. |
| ID[4:0] | Identifier pins which identify to all VL-bus devices the type and speed of the VL-bus host. As used herein, the VL-bus host is the device that owns the VL-bus when no other VL-bus master is requesting the VL-bus. If no bridge exists between the host CPU and the VL-bus, then the VL-bus host is simply the CPU itself. If a bridge exists, and/or a cache controller, then the VL-bus host is considered herein to include such a bridge and cache controller in addition to the CPU itself. |
| ADR[31:2] (Also called VA[31:2].) | VL-bus address signals. The address bus furnishes the physical memory or I/O port address to the VL-bus target. In CPU-originated transfers, ADR[31:2] is driven by the CPU (or CPU bridge). During system bus master or DMA cycles, the VL-bus controller drives the system bus address signals onto ADR[31:2]. During VL-bus master cycles, the VL-bus master drives ADR[31:2]. In a CPU-originated transfer or a VL-bus master-originated transfer, if no VL-bus target claims the transfer by a VL-bus device claiming deadline, then the VL-bus controller drives the address onto the system bus. |
| DAT[31:0] (Also called VD[31:0].) | VL-bus data signals. This is a bi-directional data path between VL-bus devices and the VL-bus host. During read transfers, the active VL-bus target drives data onto DAT[31:0]. If the read is initiated from a system bus master or motherboard DMA, the VL-bus controller drives the data from DAT[31:0] onto the system bus. During write transfers, the VL-bus host, DMA slave or VL-bus master drives data onto DAT[31:0]. |
| BE[3:0]# | Byte enables. These signals indicate which byte lanes (i.e. which bytes) of DAT[31:0] are involved with the current VL-bus transfer. They are driven similarly to ADR[31:2]. Many VL-bus controllers at least internally encode BE[3:0]# into two low-order address bits. For convenience, therefore, the full VL-bus address is sometimes referred to herein as ADR[31:0] or VA[31:0]. |
| M/IO# | Memory or I/O status. Indicates whether the address on ADR[31:0] is to be interpreted as being in the memory address space (when low) or in the I/O address space (when high). Driven by whichever device drives ADR[31:0]. |
| W/R# | Write or read status. Indicates whether the current access on the VL-bus is a write access or a read access. Driven by whichever device is driving ADR[31:0]. |
| D/C# | Data or code status. Indicates whether the current VL-bus cycle is transferring data or code. Driven by whichever device is driving ADR[31:0]. |
| BLAST# | Burst last. Indicates that the next time BRDY# is asserted, a VL-bus burst cycle will be complete. BLAST# is connected to the VL-bus host BLAST# signal line. During a VL-bus master transfer, the VL-bus master drives BLAST#. A VL-bus master that does not support burst of transfers drives BLAST# low whenever it controls the VL-bus. |
| ADS# | Address data strobe. The VL-bus cycle start |

| VL-BUS SIGNAL NAME | VL-BUS SIGNAL DESCRIPTION |
|---|---|
| | signal. Driven by whichever VL-bus device drives ADR[31:0]. ADS# is strobed by such device for one LCLK cycle after the address bus and status lines (collectively the VL-bus cycle definition signal lines) are valid, to indicate the start of a VL-bus cycle. As used herein, a VL-bus device defines a "valid" VL-bus access or cycle by asserting at least VA[31:2], BE#[3:0], M/IO#, W/R#, D/C# and ADS# on the VL-bus. |
| LEADS# | Local external address data strobe. Cache coherency signal. |
| LGNT<x># | Local bus grant. Used in conjunction with LREQ<x># to establish a VL-bus arbitration protocol. There is one pair of LREQ# and LGNT# signals per slot. |
| LKEN# | Local cache enable. Cache coherency signal. |
| LDEV<x># | Local device. This is a VL-bus device claiming signal. Each VL-bus slot or device has its own LDEV# signal and asserts its LDEV# signal if it recognizes and wants to claim a current VL-bus cycle. The VL-bus controller samples LDEV<x># on the rising edge of LCLK one cycle after ADS# (for LCLK ≦ 33 MHz), or two LCLK cycles after ADS# (for LCLK > 33 MHz). Whichever such rising edge of LCLK is appropriate determines a VL-bus device claiming deadline for the cycle. If the VL-bus/system-bus bridge detects LDEV<x># asserted, then it does not start a system-bus cycle even if its internal map indicates that the current VL-bus access is to a device which resides on the system bus. The VL-bus controller may optionally start a VL-bus transfer even before sampling LDEV<x># asserted, if the controller knows that the cycle is owned by VL-bus target. For cache-hit and system DRAM cycles, the VL-bus controller ignores LDEV<x>#. |
| LRDY# | Local ready. LRDY# begins the handshake that terminates a current active VL-bus cycle. A single LRDY# line is shared among all VL-bus devices. The active VL-bus device asserts LRDY# only during the cycle that it has claimed as its own. It asserts LRDY# low for one LCLK period to terminate an active VL-bus cycle, and then drives it high for one LCLK period before being released. The originator of the cycle must wait until RDYRTN# is asserted low before it terminates the active VL-bus cycle. |
| LBS16# | Local bus size 16. Asserted by 16-bit VL-bus target to force the originator of a cycle to run multiple 16-bit transfers instead of 32-bit transfers. |
| BRDY# | Burst ready. Terminates the current active burst of cycle. It is asserted low for one LCLK period at the end of each burst of transfer. If LRDY# is asserted at the same time as BRDY#, BRDY# is ignored and the remainder of the current burst cycle falls back to non-burst cycles. Like LRDY#, the BRDY# signal line is shared among all the VL-bus devices. The active VL-bus target therefore drives the RDY# only during a burst transfer that it has claimed as its own. BRDY# must not be driven while ADS# is asserted, and also should not be driven during the first T2 because the system cache controller may be driving it. |
| LREQ<x># | Local request. Used in conjunction with LGNT<x># to gain control of the VL-bus device. |
| IRQ9 | Interrupt request line 9. IRQ9 is a high-asserted, level-triggered interrupt that is electrically connected to IRQ9 on the system bus. |
| WBACK# | Write-back. In VL-Bus Specification Version 2.0, WBACK# is an output of the VL-Bus controller usually used to maintain cache coherency in systems that have a cache structure that requires this function. An example of this is a system with a CPU (such as a Pentium) containing a write back cache. The VL-Bus controller may assert WBACK# at any time after an ADS# is issued and before or coincident with the first READY (either RDYRTN# or BRDY#) of that access. When an active VL-Master samples WBACK# asserted, it must immediately abort the bus cycle and float all address, data and control signals that it drives as master. When WBACK# is sampled inactive, the VL-Master restarts the bus cycle with a new ADS#. If a ready was returned at the same time as WBACK# was sampled active, the ready (as well as the data on a read) should be ignored. WBACK# may be generated on either a read or a write and is synchronous to LCLK. |

APPENDIX B PCI-BUS 2.0

The PCI Local Bus is a high performance, 32-bit or 64-bit bus with multiplexed address and data lines. It is intended for use as an interconnect mechanism between highly integrated peripheral controller components, peripheral add-in boards, and processor/memory systems.

Configuration registers are specified for PCI components and add-in cards. A system with embedded auto configuration software can automatically configure PCI add-in cards at power on.

Typical PCI Local Bus implementations will support up to three add-in board connectors, although expansion capability is not required. The PCI add-in board connector is a Micro Channels (MC)-style connector. The same PCI expansion board can be used in ISA-, EISA-, and MC-based systems.

Relevant PCI-bus signals are defined below. The second column indicates a signal type as is defined in as follows:

| | Signal Type Definitions |
|---|---|
| in | input-only signal, as viewed from a PCI-bus expansion device. |
| out | standard output, as viewed from PCI-bus expansion device. |
| t/s | bidirectional signal. |
| s/t/s | active low 3-state signal owned and driven by only one agent at a time. That agent drives the pin low and must drive it high for at least one clock before letting it float. A new agent cannot start driving the signal any sooner than one clock after the previous owner lets it float. A pullup is provided by a central resource. |
| o/d | open drain output viewed from expansion device. |

System Pins

| | | |
|---|---|---|
| CLK | in | Clock provides timing for all transactions on PCI and is an input to every PCI device. All other PCI signals, except RST#, IRQA#, IRQB#, IRQC#, and IRQD#, are sampled on the rising edge of CLK, and all other timing parameters are defined with respect to this edge. PCI operates up to 33 MHz, and in general, the minimum frequency is DC (0 Hz). |
| RST# | in | Reset is used to bring PCI-specific |

| | | |
|---|---|---|
| | | registers, sequencers, and signals to a consistent state. Anytime RST# is asserted, all PCI output signals must be driven to their benign state. RST# may be asynchronous to CLK when asserted or deasserted. Although asynchronous, deassertion is guaranteed to be a clean, bounce-free edge. Except for configuration accesses, only devices that are required to boot the system will respond after reset. |

Address and Data Pins

| | | |
|---|---|---|
| AD[31::00] | t/s | Address and Data are multiplexed on the same PCI pins. A bus transaction consists of an address phase followed by one or more data phases. The DAC uses two address phases to transfer a 64-bit address. PCI supports both read and write bursts. The address phase is the clock cycle in which FRAME# is asserted. During the address phase AD[31::00] contain a physical address (32 bits). For I/O, this is a byte address; for configuration and memory it is a DWORD address. During data phases AD[07::00] contain the least significant byte (lsb) and AD[31::24] contain the most significant byte (msb). Write data is stable and valid when IRDY# is asserted and read data is stable and valid when TRDY# is asserted. Data is transferred during those clocks where both IRDY# and TRDY# are asserted. |
| C/BE[3::0]# | t/s | Bus Command and Byte Enables are multiplexed on the same PCI pins. During the address phase of a transaction, C/BE[3::0]# define the bus command. During the data phase C/BE[3::0]# are used as Byte Enables. The Byte Enables are valid for the entire data phase and determine which byte lanes carry meaningful data. C/BE[0]# applies to byte 0 (lsb) and C/BE[3]# applies to byte 3 (msb). |
| PAR | t/s | Parity is even parity across AD[31::00] and C/BE[3::0]#. Parity generation is required by all PCI agents. PAR is stable and valid one clock after the address phase. For data phases PAR is stable and valid one clock after either IRDY# is asserted on a write transaction or TRDY# is asserted on a read transaction. Once PAR is valid, it remains valid until one clock after the completion of the current data phase. (PAR has the same timing as AD[31::00] but delayed by one clock.) The master drives PAR for address and write data phases; the target drives PAR for read data phases. |

Interface Control Pins

| | | |
|---|---|---|
| FRAME# | s/t/s | Cycle Frame is driven by the current master to indicate the beginning and duration of an access. FRAME# is asserted to indicate a bus transaction is beginning. While FRAME# is asserted, data transfers continue. When FRAME# is deasserted, the transaction is in the final data phase. |
| IRDY# | s/t/s | Initiator Ready indicates the initiating agent's (bus master's) ability to complete the current data phase of the transaction. IRDY# is used in conjunction with TRDY#. A data phase is completed on any clock both IRDY# and TRDY# are sampled asserted. During a write, IRDY# indicates that valid data is present on AD[31::00]. During a read, it indicates the master is prepared to accept data. Wait cycles are inserted until both IRDY# and TRDY# are asserted together. |
| TRDY# | s/t/s | Target Ready indicates the target agent's (selected device's) ability to complete the current data phase of the transaction. TRDY# is used in conjunction with IRDY#. A data phase is completed on any clock both TRDY# and IRDY# are sampled asserted. During a read, TRDY# indicates that valid data is present on AD[31::00]. During a write, it indicates the target is prepared to accept data. Wait cycles are inserted until both IRDY# and TRDY# are asserted together. |
| STOP# | s/t/s | Stop indicates the current target is requesting the master to stop the current transaction. |
| LOCK# | s/t/s | Lock indicates an atomic operation that may require multiple transactions to complete. |
| IDSEL | in | Initialization Device Select is used as a chip select during configuration read and write transactions. |
| DEVSEL# | s/t/s | Device Select, when actively driven, indicates the driving device has decoded its address as the target of the current access. As an input, DEVSEL# indicates whether any device on the bus has been selected. |

Arbitration Pins (Bus Masters Only)

| | | |
|---|---|---|
| REQ# | t/s | Request indicates to the arbiter that this agent desires use of the bus. This is a point to point signal. Every master has its own REQ#. |
| GNT# | t/s | Grant indicates to the agent that access to the bus has been granted. This is a point to point signal. Every master has its own GNT#. |

Error Reporting Pins

| | | |
|---|---|---|
| PERR# | s/t/s | Parity Error is only for the reporting of data parity errors during all PCI transactions except a Special Cycle. |
| SERR# | o/d | System Error is for reporting address parity errors, data parity errors on the Special cycle command, or any other system error where the result will be catastrophic. |

Interrupt Pins (Optional)

Interrupts on PCI are optional and defined as "level sensitive", asserted low (negative true), using open drain output drivers. The assertion and deassertion of INTx# is asynchronous to CLK. PCI defines one interrupt line for a single function device and up to four interrupt lines for a multi-function device or connector. For a single function device, only INTA# may be used while the other three interrupt lines have no meaning.

| | | |
|---|---|---|
| INTA# | o/d | Interrupt A is used to request an interrupt. |
| INTB# | o/d | Interrupt B. is used to request an interrupt and only has meaning on a multi-function device. |
| INTC# | o/d | Interrupt C is used to request an interrupt and only has meaning on a multi-function device. |
| INTD# | o/d | Interrupt D is used to request an interrupt and only has meaning on a multi-function device. |

Any function on a multi-function device can be connected to any of the INTx# lines. The file Interrupt Pin register defines which INTx# line the function uses to request an interrupt. If a device implements a single INTx# line, it is called INTAKE if it implements two lines, then they are called INTA# and INTB#, and so forth. For a multi-function device, all functions may use the same INTx# line or each may have its own (up to a maximum of four functions) or any combination thereof. A single function can never generate an interrupt request on more than one INTx# line.

The system vendor is free to combine the various INTx# signals from PCI connector(s) in any way to connect them to the interrupt controller. They may be wire-ORed or electronically switched under program control, or any combination-thereof. This means the device driver may not make any assumptions about interrupt sharing. All PCI device drivers must be able to share an interrupt (chaining) with any other logical device, including devices in the same multi-function package.

Cache Support Pins (Optional)

A cacheable PCI memory should implement both cache support pins as inputs, to allow it to work with either write-through or write-back caches. If cacheable memory is located on PCI, a bridge connecting a write-back cache to PCI must implement both pins as outputs; a bridge connecting a write-through cache may only implement one pin.

| | | |
|---|---|---|
| SBO# | in/out | Snoop Backoff indicates a hit to a modified line when asserted. |
| SDONE | in/out | Snoop Done indicates the status of the snoop for the current access. |

64-Bit Bus Extension Pins (Optional)

The 64-bit extension pins are collectively optional. That is, if the 64 bit extension is used, all the pins in this section are required.

| | | |
|---|---|---|
| AD[63::32] | t/s | Address and Data are multiplexed on the same pins and provide 32 additional bits. During an address phase (when using the DAC command and when REQ64# is asserted), the upper 32-bits of a 64 bit address are transferred; otherwise, these bits are reserved but are stable and indeterminate. During a data phase, an additional 32-bits of data are transferred when REQ64# and ACK64# are both asserted. |
| C/BE[7::4]# | t/s | Bus Command and Byte Enables are multiplexed on the same pins. During an address phase (when using the DAC command and when REQ64# is asserted), the actual bus command is transferred on C/BE[7::4]#, otherwise, these bits are reserved and indeterminate. During a data phase, C/BE[7::4]# are byte enables indicating which byte lanes carry meaningful data when REQ64# and ACK64# are both asserted. C/BE[4]# applies to byte 4 and C/BE[7]# applies to byte 7. |
| REQ64# | s/t/s | Request 64-bit Transfer, when actively driven by the current bus master, indicates it desires to transfer data using 64 bits. REQ64# has the same timing as FRAME#. REQ64# has meaning at the end of reset. |
| ACK64# | s/t/s | Acknowledge 64-bit Transfer, when actively driven by the device that has positively decoded its address as the target of the current access, indicates the target is willing to transfer data using 64 bits. ACK64# has the same timing as DEVSEL#. |
| PAR64 | t/s | Parity Upper DWORD is the even parity bit that protects AD[63::32] and C/BE[7::4]#. PAR64 is valid one clock after the initial address phase when REQ64# is asserted and the DAC command is indicated on C/BE[3::0]#. PAR64 is valid the clock after the second address phase of a DAC command. The master drives PAR64 for address and write data phases; the target drives PAR64 for read data phases. |

Bus Commands

Bus Commands indicate to the target the type of transaction the master is requesting. Bus Commands are encoded on the C/BE[3::0]# lines during the address phase, and include the following:

The Special Cycle command provides a simple message broadcast mechanism on PCI. It is designed to be used as an alternative to physical signals when sideband communication is necessary.

The I/O Read command is used to read data from an agent mapped in I/O address space. AD[31::00] provide a byte address. All 32 bits must be decoded. The Byte Enables indicate the size of the transfer and must be consistent with the byte address.

The I/O Write command is used to write data to an agent mapped in I/O address space. All 32 bits must be decoded. The Byte Enables indicate the size of the transfer and must be consistent with the byte address.

The Memory Read command is used to read data from an agent mapped in the memory address space. The target is free to do an anticipatory read for this command only if it can guarantee that such a read will have no side effects. Furthermore, the target must ensure the coherency (which includes ordering) of any data retained in temporary buffers after this PCI transaction is completed. Such buffers must be invalidated before any synchronization events (e.g. updating an I/O status register or memory flag) are passed through this access path.

The Memory Write command is used to write data to an agent mapped in the memory address space. When the target returns "ready", it has assumed responsibility for the coherency (which includes ordering) of the subject data. This can be done either by implementing this command in a fully synchronous manner, or by insuring any software transparent posting buffer will be flushed before synchronization events (e.g., updating an I/O status register or memory flag) are passed through this access path. This implies that the master is free to create a synchronization event immediately after using this command.

The Configuration Read command is used to read the configuration space of each agent. An agent is selected when its IDSEL signal is asserted and AD[1::0] are 00. During the address phase of a configuration cycle, AD[7::2] address one of the 64 DWORD registers (where byte enables address the byte(s) within each DWORD) configuration space of each device and AD[31::11] are logical don't cares. AD[10::08] indicate which device of a multi-function agent is being addressed.

The Configuration write command is used to transfer data to the configuration space of each agent. An agent is selected when its IDSEL signal is asserted and AD[1::0] are 00. During the address phase of a configuration cycle, the AD[7::2] lines address the 64 DWORD (where byte enables address the byte(s) within each DWORD) configuration space of each device and AD[31::11] are logical don't cares. AD[10::08] indicate which device of a multi-function agent is being addressed.

The Memory Read Multiple command is semantically identical to the Memory Read command except that it additionally indicates that the master may intend to fetch more than one cache line before disconnecting. The memory controller should continue pipelining memory requests as long as FRAME# is asserted. This command is intended to be used with bulk sequential data transfers where the memory system (and the requesting master) might gain some performance advantage by sequentially reading ahead an additional cache line when a software transparent buffer is available for temporary storage.

The Dual Address Cycle (DAC) command is used to transfer a 64-bit address to devices that support 64-bit addressing. Targets that support only 32-bit addresses must treat this command as reserved and not respond to the current transaction in any way.

The Memory Read Line command is semantically identical to the Memory Read command except that it additionally indicates that the master intends to complete more than two 32-bit PCI data phases. This command is intended to be used with bulk sequential data transfers where the memory system (and the requesting master) might gain some performance advantage by reading up to a cache line boundary in response to the request rather than a single memory cycle. As with the Memory Read command, pre-fetched buffers must be invalidated before any synchronization events are passed through this access path.

The Memory Write and Invalidate command is semantically identical to the Memory Write command except that it additionally guarantees a minimum transfer of one complete cache line; i.e. the master intends to write all bytes within the addressed cache line in a single PCI transaction. The master may allow the transaction to cross a cache line boundary only if it intends to transfer the entire next line also. This command requires implementation of a configuration register in the master indicating the cache line size. It allows a memory performance optimization by invalidating a "dirty" line in a write-back cache without requiring the actual write-back cycle, thus shortening access time.

PCI Protocol Fundamentals

The basic bus transfer mechanism on PCI is a burst. A burst is composed of an address phase and one or more data phases. PCI supports bursts in both memory and I/O address spaces. The host bridge (that resides between the host processor and PCI) may merge (or assemble) memory write accesses into a single transaction when no side effects exist. A device indicates no side effects (allow prefetching of read data and merging of write data in any order) by setting the prefetch bit in the base address register. A bridge may distinguish where merging is allowed and where it is not, by an address range which could be provided by configuration software during initialization. Merging of data into that buffer must stop (and the buffer flushed) when a subsequent write occurs that is not prefetchable or a read (to any range). Write transactions following either of these two events may be merged with subsequent writes, but not to previously merged data, if in the prefetchable range.

Since I/O accesses from the processor cannot be combined, they will normally only have a single data phase. However, it will not be precluded. There is no implied addressing on I/O bursts. When I/O bursts are done, the target and master must understand the implied addressing. PCI devices that do not deal with multiple I/O data phases must disconnect the access after the first data phase. To ensure that I/O devices will operate correctly, bridges may never merge or combine sequential I/O accesses into a single PCI access or burst. All I/O accesses must appear on PCI exactly as the host generated them. (If a target of an I/O access is selected by its address but the byte enables indicate a transfer larger than the device supports, the target terminates with target-abort.)

All signals are sampled on the rising edge of the clock, except RST#, INTA#, INTB#, INTC#, and INTD#. Each signal has a setup and hold aperture with respect to the rising clock edge, in which transitions are not allowed. Outside this aperture, signal values or transitions have no significance. This aperture occurs only on "qualified" clock edges for AD[31::0], AD[63::32], PAR2, PAR64, and IDSEL signals and on every clock edge for LOCK#, IRDY#, TRDY#, FRAME# DEVSEL#, STOP#, REQ#, GNT#, REQ64#, ACK64#, SBO#, SDONE, SERR# (on falling edge only), and PERR#. C/BE[3::0]#, C/BE[7::4]# (as bus commands) are qualified on the clock edge that FRAME# is first asserted. C/BE[3::0]#, C/BE[7::4]# (as byte enables) are qualified on each rising clock edge following the completion of an address phase or data phase. RST#, IRQA#, IRQB#, IRQC#, and IRQD# are not qualified or synchronous.

Basic Transfer Control

The fundamentals of all PCI data transfers are controlled with three signals. Refer to FIG. A1.

| FRAME# | is driven by the master to indicate the beginning and end of a transaction. |
| IRDY# | is driven by the master, allowing it to force wait cycles. |
| TRDY# | is driven by the target, allowing it to force wait cycles. |

The interface is IDLE when both FRAMES and IRDY# are deasserted. The first clock edge on which FRAME# is asserted is the address phase, and the address and bus command code are transferred on that clock edge. The next clock edge begins the first of one or more data phases, during which data is transferred between master and target on each clock edge for which both IRDY# and TRDY# are asserted. Wait cycles may be inserted in a data phase by either the master or the target with IRDY# and TRDY# signals respectively.

The source of the data is required to assert its xRDY# signal unconditionally when data is valid (IRDY# on a write transaction, TRDY# on a read transaction). The receiving agent may assert its xRDY# as it chooses.

Once a master has asserted IRDY# it cannot change IRDY# or FRAMES# until the current data phase completes regardless of the state of TRDY#. Once a target has asserted TRDY# or STOP# it cannot change DEVSEL#, TRDY# or STOP# until the current data phase completes. Neither the master nor the target can change its mind once it has committed to the data transfer.

At such time as the master intends to complete only one more data transfer (which could be immediately after the address phase), FRAME# is deasserted and IRDY# is asserted indicating the master is ready. After the target indicates the final data transfer (TRDY# is asserted), the interface returns to the IDLE state with both FRAME# and IRDY# deasserted.

Addressing

PCI defines three physical address spaces. The memory and I/O address spaces are customary. The configuration address space has been defined to support PCI hardware configuration.

Each agent is responsible for its own address decode. PCI supports two styles of address decoding: positive and subtractive. Positive decoding is faster since each device is looking for accesses in the address range(s) that it has been assigned. Subtractive decoding can be implemented by only one device on the bus, since it accepts all accesses not positively decoded by some other agent. This decode mechanism is slower since it must give an other bus agents a "first right of refusal" on the access. However, it is very useful for an agent like a standard expansion bus that must respond to address phase or data phase. RST#, IRQA#, IRQB#, IRQC#, and IRQD# are not qualified or synchronous.

The information contained in the two low order address bits (AD[1::0]) varies by address space. In the I/O address space, all 32 AD lines are used to provide a full byte address. This allows an agent requiring byte level address resolution to complete address decode and claim the cycle without waiting an extra cycle for the byte enables (thus delaying all subtractive decode cycles by an extra clock). AD[1::0] are used for the generation of DEVSEL# only and indicate the least significant valid byte involved in the transfer. For example, if BE0# were asserted then AD[1::0] would be "00"; if only BE3# were asserted, then AD[1::0] would be "11". Once a target has claimed an I/O access (using AD[1::0]), it then determines if it can complete the entire access as indicated in the byte enables. If all the selected bytes are not in the selected target's address range, the entire access cannot be completed. In this case, the target does not transfer any data but terminates with a target-abort.

Bus Driving and Turnaround

A turnaround cycle is required on all signals that may be driven by more than one agent. This is indicated on the timing diagrams as two arrows pointing at each others' tail. This turnaround cycle occurs at different times for different signals. For instance, IRDY#, TRDY#, DEVSEL#, STOP#, and ACK64# use the address phase as their turnaround-cycle. FRAME#, REQ64#, C/BE[3::0]#, C/BE[7::4], AD[31::00], and AD[63::32] use the IDLE cycle between transactions as their turnaround cycle. An IDLE cycle is when both FRAME# and IRDY# are deasserted (e.g., clock 9 in FIG. B1).

Read Transaction

FIG. B1 illustrates a read transaction and starts with an address phase which occurs when FRAME# is asserted for the first time and occurs on clock 2. During the address phase AD[31::00] contain a valid address and C/BE[3::0]# contain a valid bus command.

The first clock of the first data phase is clock 3. During the data phase C/BE# indicate which byte lanes are involved in the current data phase. A data phase may consist of a data transfer and wait cycles. The C/BE# output buffers must remain enabled (for both read and writes) from the first clock of the data phase through the end of the transaction. This ensures C/BE# are not left floating for long intervals.

The first data phase on a read transaction requires a turnaround-cycle (enforced by the target via TRDY#), in this case the address is valid on clock 2 and then the master stops driving AD. The earliest the target can provide valid data is clock 4. The target must drive the AD lines following the turnaround cycle when DEVSEL# is asserted. Once enabled, the output buffers must stay enabled through the end of the transaction. (This ensures AD are not left floating for long intervals.)

A data phase completes when data is transferred, which occurs when both IRDY# and TRDY# are asserted on the same clock edge. (TRDY# cannot be driven until DEVSEL# is asserted.). When either is deasserted a wait cycle is inserted and no data is transferred. As noted in the diagram, data is successfully transferred on clocks 4, 6, and 8, and wait cycles are inserted on clocks 3, 5, and 7.

The master knows at clock 7 that the next data phase is the last. However, because the master is not ready to complete the last transfer (IRDY# is deasserted on clock 7), FRAME# stays asserted. Only when IRDY# is asserted can FRAME# be deasserted, which occurs on clock 8.

Write Transaction

FIG. B2 illustrates a write transaction. The transaction starts when FRAME# is asserted for the first time which occurs on clock 2. A write transaction is similar to a read transaction except no turnaround cycle is required following the address phase because the master provides both address and data. Data phases work the same for both read and write transactions.

Transaction Termination

Termination of a PCI transaction may be initiated by either the master or the target. While neither can actually stop the transaction unilaterally, the master remains in ultimate control, bringing all transactions to an orderly and systematic conclusion regardless of what caused the termination. All transactions are concluded when FRAME# and IRDY# are both deasserted, indicating an IDLE cycle (e.g., clock 9 in FIG. B2).

Master Initiated Termination

The mechanism used in master initiated termination is when FRAME# is deasserted and IRDY# is asserted. This signals the target that the final data phase is in progress. The final data transfer occurs when both IRDY# and TRDY# are asserted. The transaction reaches completion when both FRAME# and IRDY# are deasserted (IDLE bus condition).

A modified version of master-initiated termination mechanism allows the master to terminate the transaction when no target responds. This abnormal termination is referred to as master-abort. Although it may cause a fatal error for the application originally requesting the transaction, the transaction completes gracefully, thus preserving normal PCI operation for other agents.

Two examples of normal completion are shown in FIG. B3. The final data transfer is indicated when FRAME# is deasserted and when both IRDY# and TRDY# are asserted which occurs at clock 3. The bus reaches an IDLE condition when IRDY# is deasserted which occurs on clock 4. Because the transaction has completed, TRDY# is deasserted on clock 4 also. Note that TRDY# is not required to be asserted on clock 3, but could have delayed the final data transfer (and transaction termination) until it is ready by delaying the final assertion of TRDY#. If the target does that, the master is required to keep IRDY# asserted until the final data transfer occurs.

Both sides of FIG. B3 could have been caused by a timeout termination. On the left side, FRAME# is deasserted on clock 3 because the timer expires, GNT# is deasserted and the master is ready (IRDY# asserted) for the final transfer. Because GNT# was deasserted when the timer expired continued use of the bus is not allowed except when using the Memory Write and Invalidate command, which must be stopped at the cache line boundary. Termination then proceeds as normal. If TRDY# is deasserted on clock 2, that data phase continues until TRDY# is asserted. FRAME# and IRDY# must remain asserted until the data phase completes.

The right-hand example shows a timer expiring on clock 1. Because the master is not ready to transfer data (IRDY# is deasserted on clock 2) FRAME# is required to stay asserted. FRAME# is deasserted on clock 3 because the master is ready (IRDY# is asserted) to complete the transaction on clock 3. The master must be driving valid data (write) or be capable of receiving data (read) whenever IRDY# is asserted. This delay in termination should not be extended more than 2 or 3 cycles. Also note that the transaction need not be terminated after timer expiration unless GNT# is deasserted.

Master-abort termination, as shown in FIG. B4, is an abnormal case (except for configuration or Special Cycle commands) of master initiated termination. A master determines that there will be no response to a transaction if DEVSEL# remains deasserted on clock 6. The master must assume that the target of the access is incapable of dealing with the requested transaction or that the address was bad. Once the master has detected the missing DEVSEL# (clock 6 in this example), FRAME# is deasserted on clock 7 and IRDY# on clock 8. The earliest a master can terminate a transaction with master-abort is five clocks after FRAME# was first sampled asserted, which occurs when the master attempts a single data transfer. However, the master may take longer to deassert FRAME# and terminate the access. The master must support the FRAME#-IRDY# relationship on all transactions which includes master-abort. FRAME# cannot be deasserted before IRDY# is asserted and IRDY# must remain asserted for at least one clock after FRAME# is deasserted, even when the transaction is terminated with master-abort.

Alteratively, IRDY# could be deasserted on clock 7, if FRAME# was deasserted as in the case of a transaction with a single data phase. The master will normally not retry this access. Note that if DEVSEL# had been asserted on clocks 3, 4, 5, or 6 of this example, it would indicate the request had been acknowledged by an agent, and master-abort termination would not be permissible.

The host bus bridge, in PC compatible systems, must return all 1's on a read transaction and discard data on a write transaction when terminated with master-abort. The bridge is required to set the master-abort detected bit in the status register. Other master devices may report this condition as an error by signaling SERR# when the master cannot report the error through its device driver.

In summary, the following general rules govern FRAME# and IRDY# in all PCI transactions.

1. FRAME# and its corresponding IRDY# define the busy/IDLE state of the bus; when either is asserted, the bus is busy; when both are deasserted, the bus is IDLE.

2. Once FRAME# has been deasserted, it cannot be reasserted during the same transaction.

3. FRAME# cannot be deasserted unless IRDY# is asserted. (IRDY# must always be asserted on the first clock edge that FRAME# is deasserted.)

4. Once a master has asserted IRDY#, it cannot change IRDY# or FRAME# until the current data phase completes.

Target Initiated Termination

The mechanism used in target initiated termination is the STOP# signal. The target asserts STOP# to request that the master terminate the transaction. A modified version of this mechanism allows the target to terminate a transaction in which a fatal error has occurred, or to which the target will never be able to respond. This abnormal termination is referred to as target-abort.

In summary, the following general rules govern FRAME#, IRDY#, TRDY#, and STOP# in all PCI transactions.

Whenever STOP# is asserted, FRAME# must be deasserted as soon as possible pursuant to the rules for the deassertion of FRAME# (i.e., IRDY# must be asserted). The deassertion of FRAME# should occur as soon after STOP# is asserted as possible, preferably within two or three cycles. The target must not assume any timing relationship between STOP# assertion and FRAME# deassertion, but must Keep STOP# asserted until FRAME# is deasserted. When the master samples STOP# asserted, it must deassert FRAME# on the first cycle thereafter in which IRDY# is asserted. This assertion of IRDY# (and therefore FRAME# deassertion) may occur as a consequence of the normal IRDY# behavior of the master (had the Current transaction not been target terminated), and be delayed zero or more cycles depending on when the master is prepared to complete a data transfer. Alteratively, the master may assert IRDY# immediately (even without being prepared to complete a data transfer) if TRDY# is deasserted, thus indicating there will be no further data transfer.

Once asserted, STOP# must remain asserted until FRAME# is deasserted, whereupon, STOP# must be deasserted.

During the final data phase of a transaction (FRAME# deasserted and IRDY# asserted), any clock edge on which either STOP# or TRDY# is asserted becomes the last cycle of the transaction, and IRDY# is deasserted on the following clock edge. (This creates an IDLE cycle and defines the end of the transaction.)

The master must retry an access that was target terminated (except target-abort) with the address of the next untransferred data if it intends to complete the access. If the deice was prefetching, it may elect not to retry the access.

Once a target has asserted TRDY# or STOP#, it cannot change DEVSEL#, TRDY# or STOP# until the current data phase completes.

Device Selection

DEVSEL# is driven by the target of the current transaction as shown in FIG. B5. DEVSEL# may be driven one, two or three clocks following the address phase. Each PCI-bus device supports a Device Status register which indicates, among other things, the slowest time (fast, medium or slow) in which it will assert DEVSEL# for any bus command except Configuration Read and Configuration Write. DEVSEL# must be asserted with or prior to the edge at which the target enables its TRDY#, STOP#, or data (read). In other words, a target must assert DEVSEL# (claim the transaction) before it is allowed to issue any other target response. In all cases except one, once a target asserts DEVSEL# it must not deassert DEVSEL# until FRAME# is deasserted (IRDY# is asserted) and the last data phase has completed. With normal master termination, DEVSEL# deassertion must be coincident with the deassertion of TRDY#. The exception is the target-abort.

If no agent asserts DEVSEL# within three clocks of FRAME#, the agent doing subtractive decode may claim and assert DEVSEL#. If the system does not have a subtractive decode agent, the master never sees DEVSEL# asserted and terminates the transaction per the master-abort mechanism.

A target must do a full decode before driving/asserting DEVSEL#, or any other target response signal It is illegal to drive DEVSEL# prior to a complete decode and then let the decode combinationally resolve on the bus. (This could cause contention.) A target must qualify the AD lines with FRAME# before DEVSEL# can be asserted on commands other than configuration. A target must qualify IDSEL with FRAME# and AD[1::0] before DEVSEL# can be asserted on a Configuration command.

It's expected that most (perhaps all) target devices will be able to complete a decode and assert DEVSEL# within one or two clocks of FRAME# being asserted (fast and medium in the figure). Accordingly, the subtractive decode agent may provide an optional device dependent configuration register that can be programmed to pull in by one or two clocks the edge at-which it samples DEVSEL#, allowing faster access to the expansion bus. Use of such an option is limited by the slowest positive decode agent on the bus. The edge at which it samples DEVSEL# is referred to herein as the PCI-bus device claiming deadline.

Once DEVSEL# has been asserted, it cannot be deasserted until the last data phase has completed, except to signal target-abort.

If the first access maps into the target's address range, it asserts DEVSEL# to claim the access. But if the master attempts to continue the burst access across the resource boundary, the target is required to signal disconnect.

When a target claims an I/O access, and the byte enables indicate one or more bytes of the access are outside the target's address range, it must signal target-abort. To deal with this type of I/O access problem, a subtractive decode device (expansion bus bridge) may do one of the following: (1) do positive decode (by including a byte map) on addresses for which different devices share common DWORDs, additionally using byte enables to detect this problem and signal target-abort; or (2) pass the full access to the expansion bus, where the portion of the access that cannot be serviced will quietly drop on the floor. (This occurs only when first addressed target resides on the expansion bus and the other is on PCI.)

APPEND)IX C OPTi® 82C802
82C802G OVERVIEW

The OPTi® 82C802G provides a highly integrated solution for fully compatible, high performance PC/AT platforms. This chipset will support 486SX/DX/DX2 and P24T microprocessors in the most cost effective and power efficient designs available today. For power users, this chipset offers optimum performance for systems running up to 50 MHz.

Based fundamentally on the proven 82C801 and 82C802 design architectures, the 82C802G adds additional memory configurations and power management for the Processor and other motherboard components. As an upgrade from the OPTi 82C802, the 82C802G adds extensive power management control.

The 82C802G supports the latest in Writeback Processor designs from Intel, AMD and Cyrix, as well as supporting the AT bus and VESA local bus for compatibility and performance. It also includes an integrated '206 IPC controller, all in a single 208-pin PFP package for low cost.

FUNCTIONAL DESCRIPTION
System Clock Generation

The 82C802G has a single high frequency clock input, CLK. CLK is a master single phase clock which is used to drive all host CPU synchronous signals and all of the 82C802G's internal state machines. This clocking scheme provides operation to support platforms at system speeds up to 50 MHz.

The 82C802G generates the AT bus clock (ATCLK) from an internal division of CLK. The ATCLK frequency is programmable and can be set to any of four synchronous mode clock division options by programming Register 25h [1:0]. In addition to the CLK source, there is an asynchronous mode available by clearing Register 27h bit 1, which generates ATCLK by dividing the ATBUS OSC oscillator by 2 (OSC/2). This asynchronous mode is important when entering GREEN mode, where the CPU clock rate can change and thereby generate unsuitable ATCLK frequencies if left in synchronous mode. This allows the system designer to tailor the AT bus clock frequency to support a wide range of system designs and performance platforms, as well as to function reliably during power savings mode.

CPU Burst-Mode Control

The 82C802G chipset fully supports 486 burst cycles. The 82C802G cache and DRAM controllers insure that data is burst into the CPU whenever the 486 requests a burst line fill. The secondary cache provides data on read-hits and the DRAM supplies the data during cache read-misses.

For the cache read-hit cycle, BRDY# (Burst Ready) is asserted during the first T2 state when a 2-1-1-1 (zero wait state) cache burst cycle is chosen, otherwise it is asserted during the second T2 state when one wait state is required. If a read-miss occurs, the DRAM controller will burst new data into both the cache memory and CPU simultaneously. BRDY# will be asserted for each double-word during these cache read-miss update cycles. For a zero wait state cache burst read cycle, 2-11-1, BRDY# will be asserted during the first T2 and remain active until BLST# (Burst Last) from the CPU is detected. For a 3-2-2-2 cache burst read cycle, BRDY# will be toggled active on an every-other-clock basis to accommodate the more relaxed data access timing required above 33 MHz operation. BRDY# is never active during DMA or MASTER cycles.

The 82C802G contains separate burst counters to support DRAM and external cache burst cycles. The Read/Write DRAM burst counter performs the cache read-miss line fill (DRAM to external cache/CPU) and the cache burst counter supports the 486 burst line fill (external cache to the 486 CPU). The access order of the burst counter exactly matches the double-word address sequencing expected by the 486 CPU. The DRAM burst counter is used for cache read-miss cycles and dirty line fill write operations.

L1 Writeback Timing Description
Level 1 Write Back Support:

The L1 cache can contain modified data that is not contained in the L2 cache or DRAM. The CPU will not allow external devices to access its internal cache. The 82C802G will execute an inquire cycle to the L1 cache for all master accesses to the system memory area. Master devices, whether local or on the ISA bus must snoop the L1 cache during every access to system memory. If valid information is in the L1 cache and this information has been modified without being updated to the system memory, the HITM# signal will be generated. A write back cycle must be generated whenever a modified line was hit.

VESA Local Master Cycles

The L1 Cache Inquire Cycle begins with the CPU relinquishing the bus with the assertion of HLDA on sampling HLDA, the local bus card will generate ADS#. EADS# will be generated by the 82C802G for one clock following the ADS# generation. If the CPU does not respond with assertion of HITM#, the 82C802G will complete the cycle from the L2 cache or the system memory. If HITM# is asserted, the 82C802G will expect a castout cycle from the L1 cache. HITM# is connected to the WBACK# signal on the VL bus which will abort the VL cycle and allow the CPU to perform its castout cycle. The 82C802G will release hold to the CPU and generate a RDY to terminate the local bus cycle. Next, the CPU will write back its L1 contents to cache/system memory.

Master/DMA Write Cycle

HOLD will then be generated to the CPU in response to an ISA master or DMA cycle. The CPU will relinquish the bus with the assertion of HLDA. The 82C802G will issue AHOLD to the CPU to tristate the CPU's address bus. At this time, the DMA or master device drives the address onto the CPU bus. IOCHRDY# will be released. EADS# is generated by the 82C802G. HITM# will be generated if the address is a modified line in the cache. The CPU will then perform its castout cycle always starting at the address 0X0 of the 16 byte line. After the castout cycle, the CPU will deassert HITM# and issue HLDA. The ISA master or DMA device can then finish its cycle.

Cache Subsystem

The integrated cache controller, which uses a direct-mapped, bank-interleaved scheme dramatically boosts the overall performance of the local memory subsystem by caching writes as well as reads (write-back mode). Cache memory can be configured as one or two banks, and sizes of 64K, 128K, 256K, and 512K are supported. Provisions for two programmable non-cacheable regions are provided. The cache controller operates in non-pipeline mode, with a fixed 16-byte line size (optimized to match a 486 burst line fill) in order to simplify the motherboard design without increasing cost or degrading system performance. For 486 systems, the secondary cache operates independently and in addition to the CPU's internal cache.

Local DRAM Control Subsystem

The 82C802G supports up to 8 banks of page-mode local DRAM memory for configurations of up to 64 Mb. 256 Kb, 1 Mb, 4 Mb or 16 Mb page-mode DRAM devices may be used. The DRAM configuration is programmable through configuration register 24h. DRAM performance features are programmable through configuration register 25h.

AT-Bus State Machine

The AT Bus state machine gains control when the 82C802G's decoding logic detects a non-local memory cycle. It monitors status signals M16#,IO16#, CHRDY and NOWS# and performs the necessary synchronization of control and status signals between the AT Bus and the microprocessor. The 82C802G supports 8 and 16 bit memory and I/O devices located on the AT bus.

An AT bus cycle is initiated by asserting ALE in AT-TS I state. On the trailing edge of ALE, M 16# is sampled for a memory cycle to determine the bus size. It then enters AT-TC state and provides the command signal. For an I/O cycle, IO16# is sampled after the trailing edge of ALE until the end of the command.

Typically, the wait state for an AT 8/16 bit transaction is 5/1 respectively. The command cycle is extended when CHRDY is detected inactive, or the cycle is terminated when zero wait state request signal (NOWS#) from the AT bus is active. Upon expiration of the wait states, the AT State Machine terminates itself and passes internal READY to the CPU State Machine for outputting synchronous RDY# to the CPU. Index register 20h/bit 2 allows for the addition of an AT cycle wait state; bit 3 of this same register allows for the generation of a single ALE instead of multiple ALEs during bus conversion cycles. The AT bus state machine also routes data and address when an AT bus master or DMA controller accesses memory.

Bus Arbitration Logic

The 82C802G provides arbitration between the CPU, DMA controller, AT Bus masters, and the refresh logic. During DMA, AT bus master, and conventional refresh cycles, the 82C802G asserts HOLD to the CPU. The CPU will respond to an active HOLD signal by generating HLDA (after completing its current bus cycle) and placing most of its output and I/O pins in a high impedance state. After the CPU relinquishes the bus, the 82C802G responds by issuing RFSH# (refresh cycle) or generating the appropriate DRQ (AT bus master or DMA cycle), depending on the requesting device. During hidden refresh, HOLD remains negated and the CPU continues it's current program execution as long as it services internal requests or achieves cache hits (refer to the refresh section for additional information). The AT bus controller in the 82C802G arbitrates between DMA/Master and refresh requests, deciding which will own the bus once the CPU relinquishes control with the HLDA signal. The arbitration between refresh and DMA/Master is based on, FIFO (first in-first out) priority. However, a refresh request (RFSH#) will be internally latched and serviced immediately after the DMA or master finishes its term if queued after. DRQ's must remain active to be serviced if a refresh request come first. The "MASTER#" signal from the AT bus indicates an active AT bus master cycle.

Local Bus Interface

The 82C802G allows peripheral devices to share the "local bus" with the CPU. The performance of these devices (which may include the video subsystem, hard disk adapters, LAN and other PC/AT controllers) will dramatically increase when allowed to operate in this high-speed environment. These devices are responsible for their own address and bus cycle decode and must be able to operate compatibly at the elevated frequencies required for operation on the local CPU bus.

The LDEV# input signal to the 82C802G indicates that a local device is intercepting the current cycle. If this signal is sampled at the end of the first T2 clock cycle (end of the second T2 at 50 Mhz), then the 82C802G will allow the responding local device to assume responsibility for the current local cycle. When the device has completed its operation, it must terminate the cycle by asserting RDY# or BRDY# to the CPU. RDY# and BRDY# are bi-directional pins on the 82C802G and may be driven by a local bus peripheral or the chipset to terminate their respective cycles.

Data Bus Conversion/Data Path Control Logic

The 82C802G performs data bus conversion when the CPU accesses 16 or 8 bit devices through 16 or 32 bit instructions. It also handles DMA and AT master cycles that transfer data between local DRAM or cache memory and locations on the AT bus. The 82C802G provides all of the signals to control external bi-directional data buffers.

Special Cycles

The 486 microprocessor provides special bus cycles to indicate that certain instructions have been executed, or certain conditions have occurred internally. Special cycles such as SHUTDOWN and HALT cycles are covered by dedicated handling logic in the 82C802G. This logic decodes the CPU bus status signals M/IO#, D/C# and W/R# and executes the appropriate action.

TABLE C1

82C802G SIGNAL DESCRIPTIONS

| Name | Type | Description |
|---|---|---|
| | | VL-bus Interface Signals |
| BLST# | I | 486 Burst Last cycle indication |
| BRDY# | B | Burst Ready output to the VL-bus host |
| BE[3:0]# | B | VL-bus Byte Enables 3–0. The byte enables identify the bytes involved in a data transfer. Input during host cycles and output during non-host cycles. |
| A[24:25], CA26 | I | Host Address Lines 24, 25 and 26. The CA26 pin allows the local DRAM memory configuration to be expanded to 128 Mb. |
| A[17:23] | B | Host Address Lines [23:17]. Inputs during host, Refresh and MASTER cycles; they become output pins during DMA cycles. |
| A[8:16] | B | Host Address Lines [16:8]. Input pins during non-DMA cycles; and CA[16:9] become output pins which convey DMA address lines A16–A9 by latching XD[7:0] during 16-bit DMA cycles; and CA[15:8] convey DMA address lines A[15:8] by latching XD[7:0] during 8-bit DMA cycles. |
| A[2:7] | B | Host Address Lines [7:2]. These lines become outputs during DMA cycles. |
| D[0:15], D[24:31] | B | Host Data Bus. |
| D/C#/TAG7 | I | Host Data/Code Cycle Status or TAG7. As D/C#, this pin is used to indicate data transfer operations when high, or control operations (code fetch, halt, etc.) when low. As TAG7, this pin is used to expand the cacheable address range of the DRAM. When sampled high during reset this pin is D/C#. When sampled low during reset this pin is TAG 7. TAG7 functionality may be ignored by setting index register 20h bit 4. |

TABLE C1-continued

82C802G SIGNAL DESCRIPTIONS

| Name | Type | Description |
|---|---|---|
| | | MP2     Function |
| | | 1     D/C# |
| | | 0     TAG7 |
| DRAMS# | I | DRAM Controller Upper Address Decode. |
| M/IO# | B | Host Memory or I/O Cycle Status. It indicates a memory cycle if high, and I/O cycle if low. It becomes an output pin during MASTER and DMA cycles for LOCAL device accesses. |
| W/R# | B | Host Write or Read Cycles Status. It indicates a write cycle if high and read cycle if low. It becomes an output pin during MASTER and DMA cycles for LOCAL device accesses. |
| A20M# | O | Emulation of GateA20 OR'ed with internal fast GATEA20 output to 486 CPU. This signal must remain high during the POWER UP CPU reset period. In 486DLC mode, this is the GA20 signal indirectly buffered to the AT bus line LA20. |
| LDEV# | I | Indication of VL-Bus device Cycle. This signal is sampled at the end of the 1st T2, or at the end of the 2nd T2 at 50 Mhz. |
| LREQ0# | I | Local Request 0. |
| RDY# | B | Ready. Ready output for host to terminate the current cycle. This pin becomes an input pin during local device cycles. In low speed systems (≦33.3 MHz), this pin is connected to LRDY#, RDYRTN#, and to the CPU's Ready input pin. In high speed systems (≧40 MHz), this pin is the RDYRTN# output and is connected to the CPU's Ready input pin. The VL-bus LRDY# signal is connected to a separate LRDYI# input pin of the 802G. |
| EADS# | O | 486 address snooping strobe. This signal is asserted for two T states during DMA or MASTER cycles. |
| ADS# | B | Address Strobe. Status input from host. This active low signal indicates the host is starting a new cycle. It becomes an output pin during MASTER or DMA cycles to the Local bus. |
| | | AT Bus Interface |
| MCS16# | B | ISA 16-bit Memory Capability. 16-bit AT Memory Slave Cycle Status; Schmitt trigger input pin normally, and driven low during master cycle. |
| IOCS16# | I | ISA 16-bit IO Slave Cycle Status. Schmitt trigger input pin. |
| ALE | O | AT Bus Address Latch Enable to represent that the AT cycle has started. |
| SBHE# | B | AT Bus High Byte Enable. Input pin during MASTER cycles. |
| XD[0:15] | B | Peripheral Data Bus Lines [15:0]. |
| IORD# | B | AT IO Read Command. This pin is an input during MASTER cycles and an output for host and DMA cycles. |
| IOWR# | B | AT IO Write Command. This pin is an input during MASTER cycles and an output for host and DMA cycles. |
| MRD# | B | AT Memory Read Command. This pin is an input during MASTER cycles and an output for host and DMA cycles. |
| MWR# | B | AT Memory Write Command. This pin is an input during MASTER cycles and an output for host and DMA cycles. |
| ROMCS#/ KBDCS3 | O | BIOS ROM Output Enable. During memory cycles, this signal is used for System BIOS ROM accesses and can be either 8-bit or 16-bit. This signal will be asserted from the end of the first T2 to the end of the last T2. Keyboard Controller Chip Select. When IO to port 60h or port 64h is detected, this signal is decoded for the keyboard A[9:0]. |
| CHRDY | B | Channel Ready Input from AT-BUS. This pin a Schmitt trigger input. |
| LMGCS# | O | Memory Space Below One Megabyte Indicator. This signal is active during refresh cycles. |
| SA0 | B | System Address Line 0. This pin is an input during MASTER cycle; an output pin during host, DMA or refresh cycles. |
| SA1 | B | System Address Line 1. This pin is an input during MASTER cycle; an output pin during host, DMA or refresh cycles. |
| 0WS#/LRDYI# | I | Zero Wait State Input from AT-BUS. This pin is a Schmitt trigger input pin. Note that the system BIOS ROM is accessed as a one wait state AT cycle. This pin is either 0WS# or LRDYI# for the 82C802G, determined by strap option MP0. MP0 is sampled during reset to determine its function: |
| | | MP2     Function |
| | | 0     LRDYI# |
| | | 1     0WS# |
| | | Bus Arbitration Interface |
| RFSH# | B | AT Refresh Cycle Indication. It is an input pin during MASTER or DMA cycle. Note that 82C802G will not HOLD the CPU during AT refresh cycles. The 82C802G puts the CPU on "waiting" if an AT refresh cycle is underway. |
| HLDA | I | HOLD Acknowledge from host. |
| HOLD | O | HOLD Request to host. Hidden refresh will not hold the CPU. |
| | | Numeric Processor Interface Signals |
| NPERR# | I | Numeric Processor Error Indication. Used to generate IGERR# for the 486 CPU. |
| IGERR3 | O | Ignore Numeric Processor Error. This is a normally high signal |
| | | Cache Interface Signals |
| KEN# | O | Cacheable or Non-Cacheable Status for the 486's internal cache. This signal is low normally, and is brought high at the end of T1. The 82C802G asserts KEN# again if it is a cacheable cycle. |
| BEA3 | O | Cache Address Line A3. This pin is connected to the A3 line to the cache in the single bank mode or even bank A3 in the double bank mode. |
| BEA2OA3 | O | Cache Line A2/A3. This pin is the A2 line to the cache in single bank mode or odd bank A3 in the double bank mode. |
| DRTY | B | Dirty Bit of TAG RAM to indicate its line has been written into. |
| FLUSH# | O | This pin is FLUSH# on the 82C802G. This is an output to the host from the chipset and allows the chipset to flush the L1 cache before the SMM occurs and also once the system comes out of the SMI_GREEN mode. |
| BEOE# | O | External Cache Output Enable. |
| BOOE3 | O | External Cache Output Enable. |
| ECAWE# | O | External Cache Write Enable for the even Cache bank. |
| OCAWE# | O | External Cache Write Enable for the odd Cache bank. |
| TAG[0:6] | B | TAG RAM Output Lines. |
| TAGW# | O | TAG RAM Write Enable. It is used to update the TAG RAM. |

TABLE C1-continued

82C802G SIGNAL DESCRIPTIONS

| Name | Type | Description |
|---|---|---|
| | | DRAM Interface Signals |
| CAS[0:3]# | O | DRAM Column Address Strobes 0–3. |
| MP[0:3] | B | DRAM Parity Bits 0–3. In addition, MP1 only is used to enable the internal VESA Bus arbitration circuitry. This pin must be pulled down with a 1k resistor if the internal VESA Bus arbitration is to be used. MP1 is sampled on the rising edge of RST4. |
| RAS[0:3]# | O | DRAM Row Address Strobes 0–3. |
| RAS4#/LREQ1# | B | DRAM Row Address Strobe 4 or Local Request 1. The 82C802G uses this pin as LREQ1# or RAS4#. This pin is sampled during reset to determine its function. Please refer to the table in the RAS5# (pin 193) description for pin strapping options. |
| RAS5#/LGNT1# | B | DRAM Row Address Strobe 5 or Local Grant 1. The 82C802G uses this pin for either LGNT1# or RAS5#. This pin is sampled during reset to determine its function: <br> MP1   Pin 192   Pin 193 <br> 0   LREQ1#   LGNT1# <br> 1   RAS4#   RAS5# |
| RAS6# | O | DRAM Row Address Strobe 6. The 82C802G uses this pin for RAS6#. |
| RAS7#/MA11 | B | DRAM Row Address Strobe 7 or DRAM Row/Column Address Line 11. The 82C802G uses this pin for RAS7#/MA11. When used as MA11, the 82C802G will support 16Mx1 DRAM parts. |
| MA[0:10] | O | DRAM Row/Column Address Lines 0–10. |
| DWE# | O | DRAM Write Enable Signal. |
| | | '206 Signals |
| DRQ[0:3] DRQ[5:7] | I | DMA request lines. |
| DACK[0:2] | O | Encoded DMA Acknowledgment Lines. |
| INTER | O | Interrupt Request |
| IRQ1 | I | Interrupt Request 1, Schmitt trigger input |
| IRQ43 | I | Interrupt Request 3 & 4, Schmitt trigger input. When ATCLK is low, this pin is IRQ4. When ATCLK is high, this pin is IRQ3. |
| IRQ6 | I | Interrupt Request 6, Schmitt trigger input. |
| IRQ75 | I | Interrupt Request 5 & 7, Schmitt trigger input. When ATCLK is low, this pin is IRQ7. When ATCLK is high, this pin is IRQ5. |
| IRQ8 | I | Interrupt Request 8, Schmitt trigger input. |
| IRQ9 | I | Interrupt Request 9, Schmitt trigger input. |
| IRQ1110 | I | Interrupt Request 10 & 11, Schmitt trigger input. When ATCLK is low, this pin is IRQ11. When ATCLK is high, this pin is IRQ10. |
| IRQ14 | I | Interrupt Request 14, Schmitt trigger input. |
| IRQ1512 | I | Interrupt Request 12 & 15, Schmitt trigger input. When ATCLK is low, this pin is IRQ15. When ATCLK is high, this pin is IRQ12. |
| TC | O | Terminal Count. |
| | | Buffer Control Signals |
| XDIR# | O | SD[7:0] to XD[7:0] Direction Control. Normally high, this pin is driven low when the devices located on XD[7:0] are read. XDIR# is active for all ROM read cycles and I/O accesses to Ports 60h, 64h, 70h and 71h. |
| HLBLTH# | O | Byte 2 Data Latch Enable. This signal becomes high during the host AT byte 2 read cycle and during DMA or master cycles. |
| HLBOE1# | O | Byte 2 Data Buffer Output Enable. This signal becomes active during host DRAM cycles for parity checking and generation, during host AT byte 2 write cycle in 486 mode and during DMA or MASTER byte 2 read DRAM or LOCAL device cycles. |
| HLBOE2# | O | Byte 2 Data Latch Output Enable. This signal becomes active during host AT byte 2 read cycle and during DMA or MASTER byte 2 write to local DRAM or LOCAL device. |
| | | Reset signals |
| CPURST | O | CPU Reset for the microprocessor. |
| PWRGD | I | Power good status or reset switch on indication. |
| | | Clock Signals |
| OSC | I | 14.3 Mhz Oscillator input. |
| ATCLK | O | ATCLK to AT bus. This is a free running clock output, programmable to be CLKI/3, CLKI/4, CLKI/5, CLKI/6 or OSC/2. |
| CLK1 | I | CLK 1x input. Single phase clock input for the 82C802G internal state machine. |
| | | Misc. Signals |
| CHCK# | O | Channel Check Input from AT-bus to indicate there is a parity error generated by the AT memory card. (NMI interrupt request). |
| LGNT0# | O | Local Bus Grant 0. This signal is the VESA Bus Local Grant signal. |
| NMI | O | Non-Maskable Interrupt to host; caused by system parity error or AT bus channel check. |
| AHOLD | O | Host Address Hold. This pin is an active high output from the 82C802G used to force the host to float address lines A[31:2] on the next clock cycle. |
| HITM#/D/C# | I | L1 WriteBack Hit or D/C#. This pin is an active low input from an L1 writeback capable host (such as the P24T) used to indicate that the current cache inquiry address has been found in the internal cache and that dirty data exists in that cache line. This pin is either HITM# or HITM# and D/C# on the 82C802G. This pin can be in either configuration by the sampling of MP2 during reset. When strapped low, it is HITM# during inquiry cycles and D/C# for all other cycles. In this configuration, the D/C# and HITM# signals from the host must be ANDed into this pin. The strapping option also affects pin 108. <br> MP2   Function <br> 1   HITM# <br> 0   HITM# and D/C# |
| SPKD | O | Speaker Data Output. Generated by OUT2 and port 61h bit 1. |

82C802G Register Description

TABLE C2

| Bit | Function |
|---|---|
| | Control Register 1 - Index: 20h |
| 7–6 | Revision of 82C802G and is read-only. |
| 5 | Secondary Cache Burst wait state control. <br> 1 = secondary cache read hit cycle is X-2-2-2. <br> 0 = secondary cache read hit cycle is X-1-1-1. <br> (See register 21h/bit 0 for lead-off cycle) |
| 4 | TAG7 sampling during cache cycles. This bit will only |

TABLE C2-continued

| Bit | Function |
|---|---|
| | be active when the '802G samples MP2 low during reset. 0 = enable TAG7, 1 = disable TAG7 |
| 3 | Single ALE Enable. 82C802G will activate single ALE instead of multiple ALEs during bus conversion cycle if this bit is enabled. |
| 2 | Extra AT Cycle Wait State Enable. Insert one extra wait state in standard AT bus cycle. |
| 1 | Emulation Keyboard Reset Control. Turn on this bit requires a "Halt" instruction to be executed before the 82C802G generates CPURST. This bit also affects soft resets via writes to ports 63h and 92h. |
| 0 | Fast Reset Enable. Alternative fast CPU reset, requires a "Halt" instruction to be executed before 82C802G generate CPURST. |

Control Register 2 - Index: 21h

| Bit | Function |
|---|---|
| 7 | Master Mode Byte Swap Enable |
| 6 | Reserved |
| 5 | Parity Check |
| 4 | Cache Enable |
| 3-2 | Cache Size |

| 3 2 | Cache Size |
|---|---|
| 0 0 | 64 KB |
| 0 1 | 128 KB |
| 1 0 | 256 KB |
| 1 1 | 512 KB |

| Bit | Function |
|---|---|
| 1 | Cache Write Wait State Control |
| 0 | Cache Read 'Lead-off Cycle' Wait State Control 0 = 3-X-X-X cycle 1 = 2-X-X-X cycle |

Shadow RAM Control Register I-Index: 22h

| Bit | Function |
|---|---|
| 7 | ROM(000F0000-000FFFFh) Enable 1 = Read from ROM, write to DRAM. ROMCS# is generated during read access only. 0 = Read from write-protected DRAM. This segment is now cached in secondary cache. |
| 6 | Reserved |
| 5 | Reserved |
| 4 | Shadow RAM at D0000h-DFFFFh Area Write Protect Enable. |
| 3 | Shadow RAM at E0000h-EFFFFh Area Write Protect Enable. |
| 2 | Hidden Refresh Enable (HOLD will not be issued to the host during refresh cycles) |
| 1 | Fast Gate A20 1 = Enable A20 0 = A20M# is always active |
| 0 | Slow Refresh Enable (4 times slower than the normal refresh) (This feature requires installation of slow refresh DRAMs) |

Shadow RAM Control Register II - Index: 23h

| Bit | Function |
|---|---|
| 7 | Enable Shadow RAM at EC000h-EFFFh area |
| 6 | Enable Shadow RAM at E8000h-EBFFFh area |
| 5 | Enable Shadow RAM at E4000h-E7FFFh area |
| 4 | Enable Shadow RAM at E0000h-E3FFFh area |
| 3 | Enable Shadow RAM at DC000h-DFFFFh area |
| 2 | Enable Shadow RAM at D8000h-DBFFFh area |
| 1 | Enable Shadow RAM at D4000h-D7FFFh area |
| 0 | Enable Shadow RAM at D0000h-D3FFFh area |

DRAM Control Register I - Index: 24h

| Bit | Function |
|---|---|
| 7 | SMI Handler Upload Enable. 0 = Normal Mode, 1 = Remaps Memory 3xxxxh to Bxxxxh. |
| [6:4] | DRAM configuration. |
| 3 | Reserved. |
| [2:0] | DRAM configuration. |

DRAM Control Register II - Index: 25h

| Bit | Function |
|---|---|
| 7 | MDIR#/LMEM# (pin 62 functionality) 0 = MDIR#, 1 = LMEM# (MP3 sampled low during reset) |
| [6:5] | DRAM Read Cycle Wait State Control |

| bit6 | bit5 | DRAM Burst | Add'l Write Wait State | Default |
|---|---|---|---|---|
| 0 | 0 | 3-2-2-2 | | 33 MHz or less |
| 0 | 1 | 4-3-3-3 | page miss=1 add'l ws | |
| 1 | 0 | 4-3-3-3 | page miss=0 add'l ws | |
| 1 | 1 | 5-4-4-4 | | 50 MHz or less |

| Bit | Function |
|---|---|
| 4 | DRAM Write Cycle Wait State Control 0 = zero wait states, 1 = one wait state. |
| [3:2] | Reserved |
| [1:0] | ATCLK selection |

| 1 | 0 | ATCLK selection |
|---|---|---|
| 0 | 0 | ATCLK=CLKI/6(Default) |
| 0 | 1 | ATCLK=CLKI/5 |
| 1 | 0 | ATCLK=CLKI/4 |
| 1 | 1 | ATCLK=CLKI/3 |

Shadow RAM Control Register III - Index: 26h

| Bit | Function |
|---|---|
| 7 | Enable ROMCS# for Write Cycles 1 = Enable, generates ROMCS# for write cycles to support flash ROMs. 0 = Disable |
| 6 | Shadow RAM copy enable for address area C0000h-EFFFFh 0 = Read/write on AT bus 1 = Read from AT bus and write into shadow RAM |
| 5 | Shadow write protect at address area C0000h-CFFFFh 0 = Write protect disable 1 = Write protect enable |
| 4 | Reserved |
| 3 | Enable shadow RAM at CC000h-CFFFFh area |
| 2 | Enable shadow RAM at C8000h-CBFFFh area |
| 1 | Enable shadow RAM at C4000h-C7FFFh area |
| 0 | Enable shadow RAM at C0000h-C3FFFh area |

Control Register 3 - Index: 27h

| Bit | Function |
|---|---|
| 7 | Enable NCA# pin to low state (always non-cacheable) |
| 6 | Enable Fast AT Cycle. |
| 5 | Back to Back I/O Delay Control 0 = 3 BLK back to back I/O delay 1 = no back to back I/O delay |
| 4 | reserved |
| 3 | Turbo Bit. 1 = Normal Mode (fast), 0 = Slow Mode. |
| 2 | L1 Write Back. 1 = Disabled, 0 = L1 Write Back Enabled |
| 1 | AT Clock Change. 1 = Synchronous (see register index 25h[1:0], 0 = asynchronous (OSC/2). |
| 0 | reserved |

ROM Chip Select (ROMCS#) Control Register - Index: 2Dh

| Bit | Function |
|---|---|
| 7 | PS2 Mouse Support 0 = PS2 mode, 1 = AT mode |
| 6 | Unused |
| 5 | Enable ROMCS# at E8000h to EFFFFh Segment |
| 4 | Enable ROMCS# at E0000h to E7FFFh Segment |
| 3 | Enable ROMCS# at D8000h to DFFFFh Segment |
| 2 | Enable ROMCS# at D0000h to D7FFFh Segment |
| 1 | Enable ROMCS# at C8000h to CFFFFh Segment |
| 0 | Enable ROMCS# at C0000h to C7FFFh Segment |

Cacheable Address Range 1 - Index Register 2Eh

| Bit | Function |
|---|---|
| 7 | F0000h to FFFFFh cacheable in L1 1 = enable, 0 = disable |
| 6 | E0000h to EFFFFh cacheable in L1 1 = enable, 0 = disable |
| 5 | D0000h to DFFFFh cacheable in L1 1 = enable, 0 = disable |
| 4 | C0000h to CFFFFh cacheable in L1 1 = enable, 0 = disable |
| 3 | EC000h to EFFFFh cacheable in L2 1 = enable, 0 = disable |
| 2 | E8000h to EBFFFh cacheable in L2 1 = enable, 0 = disable |
| 1 | E4000h to E7FFFh cacheable in L2 1 = enable, 0 = disable |
| 0 | E0000h to E3FFFh cacheable in L2 |

TABLE C2-continued

| Bit | Function |
|---|---|
| | 1 = enable, 0 = disable |
| | Cacheable Address Range 2 - Index Register 2Fh |
| 7 | DC000h to DFFFFh cacheable in L2 |
| | 1 = enable, 0 = disable |
| 6 | D8000h to DBFFFh cacheable in L2 |
| | 1 = enable, 0 = disable |
| 5 | D4000h to D7FFFh cacheable in L2 |
| | 1 = enable, 0 = disable |
| 4 | D0000h to D3FFFh cacheable in L2 |
| | 1 = enable, 0 = disable |
| 3 | CC000h to CBFFFh cacheable in L2 |
| | 1 = enable, 0 = disable |
| 2 | C8000h to CBFFFh cacheable in L2 |
| | 1 = enable, 0 = disable |
| 1 | C4000h to C7FFFh cacheable in L1 |
| | 1 = enable, 0 = disable |
| 0 | C0000h to C3FFFh cacheable in L2 |
| | 1 = enable, 0 = disable |

I/O Port 60h

The 82C802G emulates the Port 60h and 64h registers of the keyboard controller, allowing the gent A20 signal. The sequence here is BIOS transparent, and there is no need for the modification of thee sequence involves writing data D1h to port 64h, then writing data 02h to port 60h.

TABLE C3

I/O Port 61h (Port B)

| Bit | Read/Write | Function |
|---|---|---|
| 0 | R/W | Timer 2 Gate. |
| 1 | R/W | Speaker Output Enable. |
| 2 | R/W | Parity Check Enable. |
| 3 | R/W | I/O channel Check Enable. |
| 4 | R | Refresh Detect. |
| 5 | R | Timer OUT2 Detect. |
| 6 | R | I/O Channel Check. |
| 7 | R | System Parity Check. |

I/O Port 64h

82C802G I/O port 64h emulates the register inside the keyboard controller by generating a fast reset pulse. Writing data F1 to port 64h asserts the reset pulse. The pulse is generated immediately after the I/O write if bit 1 of Index register 20h is set.

Port 70h

| Bit | Read/Write | Function | Polarity |
|---|---|---|---|
| 7 | R/W | NMI Enable | 0 |

Mode Register - Index EFh

This is a read/write register which is used to store configuration information.

| Bit | Description |
|---|---|
| 7-0 | 601 or 602 mode register |
| | This register selects the mode which the system board is configured in. When set to '601 mode, the system will expect an external power management port is used. |
| | CCh = 601 mode |
| | C0h = 602 mode |

APPENDIX D OPTi® 82C602

82C601/82C602 OVERVIEW

Introduction

The OPTi® 82C601 and 82C602 buffer chips are 100-pin devices designed to replace a number of discrete buffer components normally found on PC/AT motherboards. Pin compatible with each other, the 82C602 is an upgrade from the 82C601 with additional functionality. These chips replaces approximately 9 TTL components on a typical motherboard design, offering significant cost savings and a substantially simplified PCB layout.

The 82C601/82C602 are closely coupled with OPTi's 82CS01/802/802G, 82C499 and 82C495SLC/XLC chipsets to allow higher integration and lower cost.

The 82C602 is a pin-compatible upgrade to the 82C601 that adds Real Time Clock (RTC) and Power Management functionality.

82C601/82C602 Functional Description

SD0-7 to XD0-7 Data Bus Control

The 82C80X, 82C495SLC/XLC, and 82C499 families drive the SD bus directly. The 82C601 provides a bi directional buffer which controls the direction of the XD to SD bus. The XD bus is designed for devices which are not intended to drive the SD bus. These items include the RTC, Keyboard Controller and BIOS ROM. The direction of the internal buffer is controlled by the system logic chipset signal XDIR.

CD (23:16) to SD(7:0) and/or CD(31:24) to SD(15:8) Data Bus Buffering

On OPTi 82C80X and 82C499 chipsets, the third data byte is sourced from the CPU, and so is not output by the chipset. In order to align the byte properly for the 16 bit ISA bus, control signals are generated by the chipset. The control for this alignment is done by HLBOE1#, HLBOE2# and HLBTH#. On the 82C495SLC/XLC chipsets, the third and fourth byte is sourced from the CPU and not output by the chipset. This is controlled by the HLHDEN#, HDLEN# and HDDIR# of the 82C495SLC/XLC.

CA(15:2) to SA(15:2) Address Buffering

The 82C601 buffers all of the local bus address lines to the ISA bus. These address lines normally drive the ISA bus, and are inputs from the host during ISA master operations. During refresh, these buffers are disabled, allowing the refresh address to be broadcast to the ISA bus.

Refresh Counter and Refresh Address Logic

The 82C601 has its own built-in refresh counter. This refresh counter will broadcast the refresh address to the ISA bus during refresh cycles.

AEN Decode Signal

AEN is decoded by REF, MASTER# and HLDA#. This signal is normally low and is driven high during DMA accesses.

AT Command Buffer Signals MEMR# an MEMW# signals are buffered to the ISA bus.

Real Time Clock Control

Addresses 70h and 71h are decoded by the 82C601. These decoded addresses translate to RTCCS# and RTCAS strobes. This decode is needed for 82C802 designs. On 82C801 designs, the decode is done by the chipset.

Keyboard Clock Buffer

The clock signal from the keyboard controller to the keyboard can be buffered through the 82C601. This clock is tri-stated through the buffer chip and sent out to the keyboard.

Reset Circuit

SYSRST# from the 82C801 is buffered through the 82C601. RSTDRV to the ISA bus and LRESET# to the VESA local bus are generated.

82C602 Functional Description

The 82C602 has all of the functionality of the 82C601 buffer chip, adding an embedded RTC and GREEN power port.

Internal

RTC The internal RTC of the 82C602 is functionally compatible with the DS 1285/MC146818B. Additional features to the RTC are 242 bytes of general nonvolatile storage and an internal power sense monitor.

GREEN Power Port

The GREEN port on the 82C602, when coupled with the 82C802G, provides a means of controlling devices via output pins on the device. During the power saving mode, this port can be written to by the system software or can latch data from the 82C802G's port.

TABLE D1

82C602 Signal Definitions

| Name | Direction Relative to 82C602 | Description |
|---|---|---|
| MASTER# | I | Master cycle indication. This signal is used to control the CA/SA buffer direction. |
| 80XHLDA | I | HLDA from output of '80x, '499 or '495SLC/XLC. |
| RFSH# | I | Refresh cycle indication. This signal is used to: 1) enable refresh address from internal address counter, 2) Tri-state CA/SA buffer. |
| AEN | O | Address Enable. When High, the DMA controller has control of the address lines, data lines, MEMR# and MEMW#, IOR# and IOW#. This signal is connected to AEN of AT bus. |
| SA[15:2] | B | AT bus address lines [15:2]. |
| CA[15:2] | B | Host address lines [15:2]. |
| CA[1:0] | I | Connected to AT Bus address lines SA[1:0]. |
| SD[7:0] | B | AT bus data lines [7:0]. |
| XD[7:0] | B | XD bus data lines [7:0]. XD7, XD6 and XD4 lines are internally pulled-up and are sampled at reset time for the following strap options:<br>XD7 XD6 Strap Option<br>1   1   '801/'802<br>1   0   '495XLC/SLC<br>1   1   '802G<br>0   0   Reserved<br>XD4 Strap Option<br>1   Enable RTC<br>0   Disable RTC |
| XDIR# | I | SD to/from XD direction control. |
| CD[23:16] | B | Host data lines [23:16] |
| HLBOE1#/ HDLEN# | I | Output enable for CD[23:16] to SD[7:0] This signal is the HD-Bus Low-Byte Enable control from the chipset to the 82C60x. This signal is called HLBOE1# on the 82C499 and '802x chipsets and is called HDLEN# on the 82C495SLC/XLC. |
| HLBOE2# | I | Output enable for SD[7:0] to CD[23:16] Latch from the chipset to the 82C60x. |
| HLBLTH#1/ HDDIR | I | Latch control for SD[7:0] to CD[23:16] for 82C80x and 82C499. On the 82C495SLC/XLC, this signal is HD-Bus direction control for SD[15:0] to CD[31:16]. |
| IOR# | B | AT I/O Read Command. This signal is an input only for 82C499 and 82C80x chipsets and bi-directional for 495SLC/XLC. Normally an input, IOR# is an output only during ISA Master cycles. |

TABLE D1-continued

82C602 Signal Definitions

| Name | Direction Relative to 82C602 | Description |
|---|---|---|
| | | This signal is tied to IOR# of the chipset. |
| IOW# | B | AT I/O Write Command. This signal is an input only for 82C499 and 82C80x and bi-directional for the 82C495SLC/XLC. Normally an input, IOW# is an output only during ISA Master cycles. This signal is tied to IOW# of the chipset. |
| MEMR# | B | Memory Read Command. This signal is an input for the 82C499 and 82C80x and bi-directional for the 82C495SLC/XLC. Normally an input, MEMW# is an output only during ISA master cycles. This signal is tied to MEMW# of the chipset. |
| MEMW# | B | Memory Write Command. This signal is an input for the 82C499 and 82C80x and bi-directional for the 82C495SLC/XLC. Normally an input, MEMW# is an output only during ISA master cycles. This signal is tied to MEMW# of the chipset. |
| SMEMR# | B | AT Memory Read Low 1 Meg Command. This signal will follow MEMR# during refresh cycle. |
| SMEMW# | B | AT Memory Write Low 1 Meg Command. |
| LMCS#/ KBCS# | I | Low 1 Meg Memory Chip Select. This signal is also the Keyboard Chip Select. |
| IOR# | B | AT I/O Read Command. This signal is an input only for 82C499 and 82C80x chipsets and bi-directional for 495SLC/XLC. Normally an input, IOR# is an output only during ISA Master cycles. This signal is tied to IOR# of the chipset. |
| IOW# | B | AT I/O Write Command. This signal is an input only for 82C499 and 82C80x and bi-directional for the 82C495SLC/XLC. Normally an input, IOW# is an output only during ISA Master cycles. This signal is tied to IOW# of the chipset. |
| MEMR# | B | Memory Read command. This signal is an input for the 82C499 and 82C80x and bi-directional for the 82C495SLC/XLC. Normally an input, MEMR# is an output only during ISA master cycles except during refresh. This signal is tied to MEMR# of the chipset. |
| MEMW# | B | Memory Write Command. This signal is an input for the 82C499 and 82C80x and bi-directional for the 82C495SLC/XLC. Normally an input, MEMW# is an output only during ISA master cycles. This signal is tied to MEMW# of the chipset. |
| SMEMR# | B | AT Memory Read Low 1 Meg Command. This signal will follow MEMR# during refresh cycle. |
| SMEMW# | B | AT Memory Write Low 1 Meg Command. |
| LMCS#/KB CS# | I | Low 1 Meg Memory Chip Select. This signal is also the Keyboard Chip Select. |
| PP1 | B | Power Port, bit 1. |
| GPCS# | B | This port is set up through index registers F8h and F9h. This signal is derived through the I/O Read and Write commands. |
| PP2# | O | An output from the Green power control output. This pin can be accessed by either PPEN# strobe signal or by Index Register FAh depending on the configuration. |
| KBCLK | B | Clock to and from the Keyboard. |
| PPEN# | I | Green power port enable, which latches the '802G 'AUTO_GREEN' port. |

TABLE D1-continued

82C602 Signal Definitions

| Name | Direction Relative to 82C602 | Description |
|---|---|---|
| IRQ8 | O | Generated from the internal RTC. |
| PPO# | O | Output from the Green power control output. This pin can be accessed by either PPEN# strobe signal or by Index Register FAh depending on the configuration. |
| M/IO# | I | Host memory/IO status. |
| CPUCLK | I | An input from the processor 1X clock signal. |

APPENDIX E OPTi® 82C822

2.0 Overview

OPTi®'s 82C822 VESA local bus to PCI Bridge (PCIB) chip is a high integration 208-pin PQFP device designed to work with VESA VL bus compatible core logic chipsets. The 82C822 PCIB provides interface to the high performance PCI bus and is fully compliant to the PCI Version 2.0 specification. The 82C822 requires no glue logic to implement the PCI bus interface and hence it allows designers to have a highly integrated motherboard with both VESA local bus and PCI local bus support. The PCIB chip offers premium performance and flexibility for VESA VL-based desktop systems running up to 50 MHz. The 82C822 PCIB can be used with OPTi's 82C802G core logic and 82C602 buffer chipsets to build a low cost and power efficient 486-based desktop solution It also works with OPTi 82C546/547 chipset to build a high performance PCI/VL solution based on the Intel P54C (Pentium) processor.

The 82C822 PCIB provides all of the control address and data paths to access the PCI bus from the VESA Local bus (VL bus). The 82C822 provides a complete solution including data buffering, latching, steering, arbitration, DMA and master functions between the 32-bit VL bus and the 32-bit PCI bus.

The PCIB works seamlessly with the motherboard chipset bus arbiter to handle all requests of the host CPU and PCI bus masters, DMA masters, I/O relocation and refresh. Extensive register and timer support are designed into the 82C822 to implement the PCI specification.

The 82C822 is a true VESA to PCI bridge. It has the highest priority on CPU accesses after cache and system memory. It generates LDEV# automatically and then compares the addresses with its internal registers to determine whether the current cycle is a PCI cycle. When a cycle is identified as PCI cycle, the 82C822 will take over the cycle and then return RDY# to the CPU. If not, the 82C822 will give up the cycle to the local device or, in the case of an ISA slave, generate a BOFF# cycle to the CPU. This action will abort the cycle and allow the CPU to rerun the cycle.

The 82C822 includes registers to determine shadow memory space, hole locations and sizes to allow the 82C822 to determine which memory space should be local and which is located on the ISA bus. Upon access to memory, the 82C822 can determine whether or not the cycle is a PCI access by comparing the cycle with its internal registers.

TABLE E1

| Signal Name | Signal Type | Signal Description |
|---|---|---|
| 3.1.1 VESA Local Bus Interface Signals | | |
| RESET# | I | Active Low Reset Input |
| LCLK | I | VESA Local Bus Clock |
| ADS# | I/O | Address Data Strobe: Normally an input, this signal is only driven during PCI bus master cycles. ADS# is tristated when WBACK# is sampled active. This signal needs to be reasserted after WBACK# is sampled active. |
| MIO# | I/O | Memory or I/O Status: Normally an input, this signal is an output during PCI bus master cycles. This signal is tristated when WBACK# is sampled active. |
| WR# | I/O | Write or Read Status: Normally an input, this signal is an output during PCI bus master cycles. This signal is tristated when WBACK# is sampled active. |
| DC# | I/O | Data or Code Status: Normally an input, this signal is an output during PCI bus master cycles. This signal is tristated when WBACK# is sampled active. |
| BE[3:0]# | I/O | Byte Enables bits 3 through 0: Normally inputs, these signals are outputs during PCI bus master cycles. They are tristated when WBACK# is sampled active. |
| BLAST# | I/O | Burst Last: Normally an input, this signal is an output during PCI bus master cycles. This signal is tristated when WBACK# is sampled active. |
| DAT[31:0] | I/O | Data Lines bits 31 through 0: Normally inputs, these pins are outputs during CPU/VESA/DMA/ISA master reads from PCI bus slaves (this includes reading the configuration registers of the 82C822) or during PCI bus master write cycles. These pins are tristated when WBACK# is sampled active. |
| ADR[31:2] | I/O | Address Lines bits 31 through 2: Normally inputs, these signals are outputs during PCI bus master cycles. They are tristated when WBACK# is sampled active. |
| LDEVO# | I/O | Local Device Output: This signal is usually connected to the LDEV# input pin of the OPTi VL chipset. When used as an output, LDEVO# is normally asserted in the next clock after ADS#, except during a restarted cycle due to BOFF# being asserted in the previous cycle. During DMA/ISA bus master cycles, the assertion of LDEVO# is dependent on LMEM#, LDEVI#, the enable bit of the DMA/ISA bus master to PCI slave access, and general purpose decoding blocks specified in the configuration register. The assertion of LDEVO# for DMA/ISA bus master cycles is as follows: <br> LMEM# LDEVI# LDEVO# <br> 0   1   1 <br> 1   0   0 <br> 1   1   0 (if enable bit = 1 or 0 and the access address is falling into the region specified in the general purpose decoding blocks) <br> 1   1   1 (if enable bit = 0 and the access address is not falling into the region specified in the general purpose decoding |

TABLE E1-continued

| Signal Name | Signal Type | Signal Description |
|---|---|---|
| | | blocks) As an input, it is latched at the trailing edge of the reset time and used to determine the sampling point of LMEM# and LDEVI#. If sampled high during reset, the end of the first T2 is used as the sampling point; otherwise, the end of the second T2 is used as the sampling point. |
| LRDY# | O | Local Ready: This signal is asserted when: 1) A CPU/VESA/DMA/ISA master accesses a PCI bus slave. 2) A CPU/VESA/PCI bus master accesses an ISA slave (LRDY# is returned to terminate the back-off cycle. 3) A PCI bus master accesses a PCI bus slave (in this case, LRDY# is asserted to terminate the cycle on the host bus). |
| BRDY# | I/O | Burst Ready: Normally an input, this signal is asserted when a CPU/VESA master accesses a PCI bus slave and the cycle is burst-able. |
| RDYRTN# | I | Ready Return: This signal is used by the 8C822 as a handshake to acknowledge the completion of the current cycle. |
| WBACK# | I | Write-back: When WBACK# is active, the 82C822 floats all the address, data, and control signals which are driven onto the host bus during a PCI bus master cycle. The 82C822 needs to resume the back-off cycle when WBACK# becomes inactive again. |
| LREQ# | O | Local Bus Request: This signal, in conjunction with LGNT#, is used to gain control of the host bus. LREQ# goes active when any one of the PCI bus masters asserts the REQn# to request the host bus. |
| LGNT# | I | Local Bus Grant: This signal, in conjunction with LREQ#, is used to gain control of the host bus. Upon receiving LGNT#, the 82C822 grants the bus request by asserting GNTn# to one of the PCI bus masters. The active PCI bus master can be preempted by removing this signal. |

3.1.2 PCI Interface Signals

| Signal Name | Signal Type | Signal Description |
|---|---|---|
| CLK | I | Clock: This signal is used to provide timing for all transactions on the PCI bus. The clock source for this input can be the same input as LCLK for the synchronized mode, or the feedback of PCICLK or the external oscillator. |
| PCICLKIN | I | PCI Clock Input: This clock input is used to generate the PCICLK[3:1] signals. |
| PCICLK[3:1] | O | PCI Clock [3:1]: In the asynchronous mode, these signals are used as the clock inputs to the PCI slots and should be fed back to the CLK input (pin 80). |
| AD[31:0] | I/O | Multiplexed Address and Data Lines, bit 6 31 through 0: These pins are the multiplexed PCI address and data lines. During the address phase, these pins are inputs for PCI bus master cycles; otherwise they are outputs. During the data phase, these pins are inputs during PCI bus master write cycles or during CPU/VESA/DMA/ISA reads from a PCI bus slave; otherwise they are outputs. |
| C/BE[3:0] | I/O | Bus Command and Byte Enables, bits 3 through 0: These pins are the multiplexed PCI command and byte enable lines. Normally outputs, these pins are |

TABLE E1-continued

| Signal Name | Signal Type | Signal Description |
|---|---|---|
| | | inputs during PCI bus master cycles. |
| PAR | I/O | Parity: This signal is an input either during PCI bus master cycles for address and write data phases or during PCI bus slave cycles for read data phases; otherwise it is an output. |
| FRAME# | I/O | Cycle Frame: This pin is driven by PCI bus masters to indicate the beginning and duration of an access. Normally an input, FRAME# is driven during CPU/VESA/DMA/ISA master accesses to PCI bus slaves. |
| IPDY# | I/O | Initiator Ready: This signal is asserted by PCI bus masters to indicate the ability to complete the current data phase of the transaction. Normally an input, this pin is driven during CPU/VESA/DMA/ISA master accesses to PCI bus slaves. |
| TRDY# | I/O | Target Ready: This pin is asserted by the target to indicate the ability to complete the current data phase of the transaction. Normally an input, this pin is driven during PCI bus master accesses to local memory, VESA/ISA slaves, and the configuration register inside the 82C822. |
| STOP# | I/O | Stop: This signal is used by the target to request the master to stop the current transaction. Normally an input, this signal is driven during PCI bus master accesses to local memory and VESA/ISA slaves. |
| LOCK# | I | Lock: This signal is used to indicate an atomic operation that may require multiple transactions to complete. Since the 82C822 will never assert this signal, it is always an input. |
| DEVSEL# | I/O | Device Select: This pin is an output when the 82C822 decodes its address as the target of the current access via either positive or negative decoding; otherwise it is an input. |
| INTD[4:1]#, INTC[4:1]#, INTB[4:1]#, INTA[4:1]# | I | PCI Interrupt Lines D-A for Slots 4-1: These signals are used to generate synchronous interrupt requests to the CPU via the programmable interrupt controllers. |
| PERR# | I/O | Parity Error: This pin is used to report data parity errors during all PCI transactions except during a special Cycle. Normally an input, PERR# is driven when data parity errors occur either during a PCI bus master write cycle or during a CPU/VESA/DMA/ISA master read from a PCI slave. |
| SERR# | OD | System Error: This signal is used to report address parity errors, or data parity errors on the Special Cycle command, or any other system error where the result will be catastrophic. This pin is an open drain. |
| REQ[4:1]1# | I | Request Lines, bits 4 through 1: These signals are used by PCI bus masters to request use of the PCI bus. |
| GNT[4:1]# | O | Grant Lines, bits 4 through 1: these signals are used to indicate to a PCI bus master that the access to the bus has been granted. |

3.1.3 Miscellaneous Interface Signals

| Signal Name | Signal Type | Signal Description |
|---|---|---|
| LDEVI# | I | Local Device Input: This input is an ANDed signal of all LDEV# signals from VESA bus slaves; it is used to indicate to the 82C822 whether the current access is to VESA slave. |

TABLE E1-continued

| Signal Name | Signal Type | Signal Description |
|---|---|---|
| NMI | O | Non-Maskable Interrupt: This output is asserted in response to an active PERR# or SERR# if the enable bit of the NMI generation for an active PERR# or SERR is set. NMI will not be asserted if bit 7 of Port 70 is set to 1. If the NMIN input pin is connected to the NMI of the other chipset, then this output will go active in response to an active NMIN also. |
| NMIN | I | Non-maskable Interrupt Input: This input is the non-maskable interrupt input signal generated from the other chipset. The 82C822 will combine this input with its internal NMI signal and generate a new NMI to the CPU. In the case where this pin is not used, an external pull-down resistor is recommended. |
| BOFF# | O | Back-Off: This output is asserted when the assumed destination of the access for the current cycle turns out to be wrong and the cycle needs to be restarted in order to access the right target; it is asserted during a CPU or VESA bus master cycle to abort the cycle if the current access is to an ISA slave. LDEVO# is asserted as well. |
| ATCLK | I | ISA AT Clock: The 8MHz ISA AT clock. |
| MASTER# | I | ISA Master Cycle: This input is used to indicate to the 82C822 that the current cycle is an ISA bus master cycle. |
| AEN | I | ISA Address Enable: This input is used to indicate to the 82C822 that the current cycle is either a DMA or refresh cycle. |
| RFSH# | I | ISA Refresh: An input signal used to indicate to the 82C822 that the current cycle is a refresh cycle. |
| HBE4# | I | CPU Byte Enable 4: This signal is used only with Pentium chipsets. |
| LMEM# | I | Local Memory: When the enable bit at the top of the local memory decoding is disabled, this input is used to indicate to the 82C822 if the current access is to local memory. When the enable bit at the top of the local memory decoding is enabled, then internal decoding result for LMEM# is used and this input pin is ignored. |
| IRQ [15:14], IRQ [12:9]; IRQ5 | OD | PIC Interrupt Request Lines, bits 15, 14, 12 through 9, and 5: These outputs are connected to the PC-compatible programmable interrupt controllers (PIC) to generate asynchronous interrupts to the CPU in response to INTD[4:1]#. The routing of each PCI interrupt line to the PC-compatible interrupts is controlled by four bits specified in the configuration register. |
| ROMCS# | O | PCI ROM BIOS Chip Select: Used to select the BIOS ROM used to configure the chipset. |
| NVMCS# | O | Non-Volatile Memory Chip Select: This output signal is used to select the non-volatile memory in which the system information is stored; the memory address space for the non-volatile memory is always a 16KB chuck and between C8000h and DFFFFh. It is used to select any ROM located in the memory address space from E0000h to EFFFFh. |

4.0 Functional Description

The following sub-sections will explain the various cycle operations the 82C822 PCIB performs to determine which memory space should be local and which is located on the ISA bus.

4.1 CPU Cycles

Cache/DRAM Accesses

The CPU begins the cycle. The 82C822 asserts LDEVO# on the next clock in response to LADS# (VESA local bus ADS#). In the OPTi Pentium chipsets, LADS# will not be generated for a local memory cycle and therefore, LDEVO# will not be generated by the 82C822. In the OPTi 486 chipsets, the CPU will generate LADS# (LADS# and CPU ADS# are the same in the 486 implementation). The 82C822 will generate LDEVO#, but this will be ignored by the OPTi 486 chipsets during a local memory cycle. In this case, the 82C822 will deassert LDEVO# after the last BRDY#. The 82C822 is also programmable to mask LDEVO# during a local memory cycle.

VESA Slave Accesses

The CPU begins the cycle. The 82C822 asserts LDEVO# on the next clock in response to ADS#. The VESA slave will generate LDEV# to the 82C822 at the end of the first T2 or second T2 (depending on the VL speed). At this point, the 82C822 will keep asserting LDEVO# until the VESA slave returns LRDY#/LBRDY#.

PCI Slave Accesses

The CPU begins the cycle. The 82C822 asserts LDEVO# on the next clock. It then determines that the cycle is a PCI slave cycle and starts the PCI cycle after synchronization. Data is latched into the 82C822 for read cycles. The 82C822 completes the cycle, returns LRDY#, and deasserts LDEVO#.

ISA Slave Accesses

The CPU begins the cycle. The 82C822 asserts LDEVO# on the next clock. It then determines that the cycle is not a local memory or VESA slave cycle and starts the PCI cycle after synchronization. The 82C822 receives master-abort termination and asserts BOFF# after synchronization. It then asserts LRDY# either at the same time or one or two clock cycles thereafter, programmably. The CPU restarts the aborted cycle. The 82C822 ignores the restarted cycle by keeping LDEVO# inactive. The OPTi VL chipset returns RDY# to the CPU at the end of the AT cycle.

4.2 VESA Master Cycles

Cache/DRAM Accesses

The VL bus master begins the cycle. The 82C822 asserts LDEVO# on the next clock. The OPTi VL chipset determines that the cycle is a local memory cycle and ignores LDEVO#. (The 82C822 is programmable to mask LDEVO# as well on local memory cycles). The OPTi VL chipset will then return BRDY# after the data is transferred. The 82C822 also determines that the cycle is a local memory cycle and takes no action other than to deassert LDEVO# after the last BRDY#.

VESA Slave Accesses

The VL bus master begins the cycle. The 82C822 asserts LDEVO# on the next clock. It then samples LDEVI# and, determining that the cycle is a VESA cycle, takes no further action. The VESA slave will then return LRDY#/LBRDY# after the data is transferred. RDYRTN# will be generated by the OPTi VL chipset. The 82C822 deasserts LDEVO# after the last BRDY#/RDYRTN#.

PCI Slave Accesses

The VL bus master begins the cycle. The 82C822 asserts LDEVO# on the next clock. It then determines that the cycle is a PCI slave cycle and starts the PCI cycle after synchronization. Data is latched into the 82C822 for read cycles.

The 82C822 returns LRDY# to the OPTi VL chipset and deasserts LDEVO#.

ISA Slave Accesses

The VL bus master begins the cycle. The 82C822 asserts LDEVO# on the next clock. It then determines that the cycle is not a local memory or VESA slave cycle and starts the PCI cycle after synchronization. The 82C822 receives a master-abort termination and asserts BOFF# after synchronization. It then asserts LRDY# either at the same time or one or two clock cycles thereafter, programmably. The CPU restarts the aborted cycle. The 82C822 ignores the restarted cycle by keeping LDEVO# inactive. The OPTi VL chipset returns RDY# to the CPU at the end of the AT cycle.

4.3 PCI Master Cycles
Cache/DRAM Accesses

The PCI master begins the cycle by asserting PCI REQ# to the 82C822. The 82C822 asserts LREQ# to the OPTi VL chipset after arbitration of the bus requests from the PCI bus masters. The 82C822 receives LGNT# from the OPTi VL chipset and generates the appropriate VL bus signals according to the PCI command, address, and status lines. The OPTi VL chipset determines that the cycle is a local memory cycle. The 82C822 also determines that the cycle is a local memory cycle and asserts DEVSEL# to claim the cycle. Data is latched into the 82C822 for read cycles. The OPTi VL chipset returns RDY# to the 82C822. The 82C822 returns TRDY# to the PCI bus master after synchronization. The 82C822 deasserts DEVSELS after the last transfer.

VESA Slave Accesses

The PCI master begins the cycle by asserting PCI REQ# to the 82C822. The 82C822 asserts LREQ# to the OPTi VL chipset after arbitration of the bus requests from the PCI bus masters. The 82C822 receives LGNT# from the OPTi VL chipset and generates the appropriate VL bus signals according to the PCI command, address, and status lines. It then determines that the cycle is a VESA slave cycle and asserts DEVSEL# to claim the cycle. Data is latched into the 82C822 for read cycles. The OPTi VL chipset returns RDY# to the 82C822. The 82C822 returns TRDY# to the PCI bus master after synchronization. The 82C822 deasserts DEVSEL# after the last transfer.

PCI Slave Accesses

The PCI master begins the cycle by asserting PCI REQ# to the 82C822. The 82C822 asserts LREQ# to the OPTi VL chipset after arbitration of the bus requests from the PCI bus masters. The 82C822 receives LGNT# from the OPTi VL chipset and generates the appropriate VL bus signals according to the PCI command, address, and status lines. It then determines that the cycle is a PCI slave cycle and waits for DEVSEL# from the PCI slave. The 82C822 takes no action.

ISA Slave Accesses

The PCI master begins the cycle by asserting PCI REQ# to the 82C822. The 82C822 assets LREQ# to the OPTi VL chipset after arbitration of the bus requests from the PCI bus masters. The 82C822 receives LGNT# from the OPTi VL chipset and generates the appropriate VL bus signals according to the PCI command, address, and status lines. It then determines that the cycle is a not a local memory or VESA slave cycle and, detecting no DEVSEL# from the PCI slave, realizes the cycle is an ISA slave cycle. The OPTi VL chipset returns LRDY# to the 82C822 at the end of the AT cycle. The data is latched into the 82C822 for the read cycle when it returns RDY# to the OPTi VL chipset. The 82C822 returns TRDY# to the PCI master after synchronization. The 82C822 deasserts DEVSEL# after the data is transferred.

4.4 DMA/ISA Master Cycles
Cache/DRAM Accesses

The OPTi VL chipset determines that the DMA/VISA master cycle is accessing local memory by detecting LMEM# asserted and LDEVI# unasserted at the sample point when the command is asserted. The OPTi VL chipset asserts MEMCS16# if this is an ISA master cycle. LADS# will not be generated by the OPTi VL chipset. No action is taken by the 82c822.

VESA Slave Accesses

The OPTi VL chipset determines that the DMA/ISA master cycle is a not a local memory cycle once the command is asserted. The OPTi VL chipset will generate the VESA local bus command lines. In response to LADS#, the 82C822 will assert LDEVO#. The 82C822 will receive LDEVI# by the next or subsequent clock. The OPTi chipset pulls IOCHRDY low to stall the command. The OPTi VL chipset samples LDEVO# active. If the cycle is a read cycle, the OPTi VL chipset will start driving the SD bus. LRDY# is asserted by the VESA slave. The OPTi VL chipset releases IOCHRDY and asserts RDY# at the end of the command after synchronization. The 82C822 takes no action other than to deassert LDEVO# as soon as LDEVI# goes inactive. The OPTi VL chipset deasserts MEMCS16# when LDEVO# goes inactive.

PCI Slave Accesses

The OPTi VL chipset determines that the DMA/ISA master cycle is a not a local memory cycle once the command is asserted. The OPTi VL chipset will generate the VESA local bus command lines. In response to LADS#, the 82C822 will assert LDEVO#. The OPTi VL chipset pulls IOCHRDY low to stall the command. The OPTi VL chipset samples LDEVO# active and pulls MEMCS16# low if the command is not an I/O cycle. The 82C822 starts the PCI cycle after synchronization, only if the ISA/DMA-to-PCI bit is set. Data is latched into the 82C822 for read cycles when both TRDY# and IRDY# are active. The 82C822 asserts LRDY# after synchronization. The OPTi VL chipset releases IOCHRDY and asserts RDY# at the end of the command after synchronization. The 82C822 deasserts LDEVO# at the end of the bus cycle. The OPTi chipset deasserts MEMCS16# when LDEVO# goes inactive. In the case of a master abort, the 82C822 still asserts LRDY# to release IOCHRDY and drive FFFFFFFFh onto the VL-bus data lines for a read cycle.

ISA Slave Accesses

The DMA/ISA master can access an ISA slave only if the ISA/DMA-to-PCI bit is low. Otherwise the 82C822 will claim this cycle. The OPTi VL chipset determines that the DMA/ISA master cycle is a not a local memory cycle once the command is asserted. The OPTi VL chipset will generate the VESA local bus command lines. In response to LADS#, the 82C822 does not assert LDEVO#. The OPTi VL chipset pulls IOCHRDY low to stall the command. The OPTi VL chipset samples LDEVO# inactive and keeps SD lines tri-stated for a read cycle. It also negates IOCHRDY. The chipset asserts RDY# at the end of command after synchronization. No action is taken by the 82C822.

4.5 Guidelines to Program the 82C822

The following briefly describes how to access the 82C822 and the PCI devices on the slots. The 82C822 uses the PCI Configuration Mechanism #1 to access the configuration spaces. Two double-word I/O locations are used in this mechanism. The first double-word location (CF8h) references a read/write register that is named CONFIG_ADDRESS. The second double-word address (CFCh) references a register name CONFIG_DATA. The general mechanism for accessing the configuration space is to write a value into CONFIG_ADDRESS that specifies the PCI bus, the device on that bus, and the configuration register in that device being accessed. A read or write to CONFIG_DATA will then cause the 82C822 to translate that CONFIG_ADDRESS value to the requested configuration cycle on the PCI bus.

4.6 Asynchronous and Synchronous Modes of Operation

The 82C822 supports both synchronous and asynchronous modes of operation. In the synchronous mode, the PCI bus interfaces runs at the same speed as the VL bus. In the asynchronous mode, the PCI bus can run at a different speed than the VL bus. This facilitates the VL bus to run at 50 MHz with the PCI running at 33 MHz. The synchronous mode of operation is recommended when the VL bus is operating below 33 MHz. The asynchronous mode of operation is recommended when the VL bus is running at 50 MHz or to implement PCI interface in the riser card.

5.0 Configuration Registers 5.1 PCI Configuration Register Space

Note: In the address offsets given below, the most significant bit (MSB) corresponds to the upper address offset. Registers not pertinent to an understanding of the invention are omitted.

TABLE E2

| Bit(s) | Type | Default | Function |
|---|---|---|---|
| Address Offset 04h–05h: Command Register | | | |
| 15:10 | RO | 0000 00 | Reserved Bits |
| 9 | RO | 0 | Enable Fast Back-to-Back: Must always = 0 otherwise the 82C822 will never generate fast back-to-back transactions to different PCI bus slaves |
| 8 | R/W | 0 | SERR# Enable: 0 = Disable 1 = Enable |
| 7 | RO | 0 | Wait Cycle Control: Must always = 0 always. No programmable wait states are supported by the 82C822. |
| 6 | R/W | 0 | Enable Parity Error Response: 0 = Disable 1 = Enable |
| 5 | RO | 0 | Reserved Bit |
| 4 | RO | 0 | Enable Memory Write and Invalidate Cycle Generation: Must always = 0. No memory write and invalidate cycles will be generated by the 82C822. |
| 3 | RO | 0 | Enable Special Cycles: Must always = 0. The 82C822 does not respond to the PCI special cycle. |
| 2 | RO | 1 | Enable Bus Master Operations: Must always = 1. The allows the 82C822 to perform bus master operations all the time. |
| 1 | RO | 1 | Enable Memory Access: Must always = 1. The 82C822 allows a PCI bus master access to main memory all the time. |
| 0 | RO | 1 | Enable I/O Access: Must always = 1. The 82C822 allows a PCI bus master access to the PCI I/o all the time. |
| Address Offset 06h–07h: Status Register | | | |
| 15 | R/W | 0 | Detected Parity Error: 0 = No parity 1 = Parity error occurred |
| 14 | RO | 0 | SERR# Status: 0 = No system error 1 = System error occurred |
| 13 | R/W | 0 | Master-Abort Status: 0 = Mo master abort 1 = Master abort occurred |
| 12 | RO | 0 | Received Target-Abort Status 0 = No target abort 1 = Target abort occurred |
| 11 | R/W | 0 | Signaled Target-Abort Status: 0 = No target abort |

TABLE E2-continued

| Bit(s) | Type | Default | Function |
|---|---|---|---|
| | | | 1 = Target abort generated |
| 10:9 | RO | 01 | DEVSEL# Timing Status: These bits must always = 01. Medium timing is selected. The 82C822 asserts the DEVSEL# based on medium timing. |
| 8 | R/W | 0 | Data Parity Detected: 0 = No data parity detected 1 = Data parity has detected |
| 7 | R/W | 1 | Fast Back-to-Back Capable: 1 = Capable 0 = Not Capable Note: Can be set to 0 only when bit 2 of register at offset 52h is set to 0; for debugging purposes only. |
| 6:0 | RO | 0000 000 | Reserved Bits |
| Address Offset 40h–41h | | | |
| 15 | R/W | 0 | 82C822 PCI Bridge Enable: 0 = Disable  1 = Enable |
| 14 | R/W | 0 | CPU Type Select: 0 = L1 Write-through CPU 1 = L1 Write-back CPU |
| 13:12 | RO | 00 | Reserved Bits |
| 11:10 | R/W | 1X | The delay of LRDY# after the assertion of BOFF#: 11 10 Delay 0  0  No Delay 0  1  1 LCLK Delay 1  x  2 LCLK Delay |
| 9 | R/W | 0 | Disable LDEVO# Assertion during local Memory Cycle: 0 = Enable  1 = Disable |
| 8 | R/W | 0 | Disable BOFF# Assertion: 0 = No retry error  1 = Retry error occurred |
| 7 | R/W | 0 | Enable NMIIN Input: 0 = Disable  1 = Enable |
| 6 | R/W | 0 | Enable Back-to-Back CFC read/write without CF8 write: 0 = Disable  1 = Enable |
| 5:3 | RO | 000 | Reserved Bits |
| 2 | RO | 0 | NMI Output Enable (via Port 70h) Status: 0 = NMI Output Disable 1 = NMI Output Enable |
| 1 | RO | 0 | Master Retry Status: 0 = No retry error 1 = Retry error has occurred |
| 0 | RO | 1 | LMEM#/LDEVI# Sampling Point Select: 1 = End of the first T2 0 = End of the second T2 |
| Address Offset 42h–43h | | | |
| 15:4 | R/W | 20h | A[31:20] for the Top of local Memory Decoding. |
| 3 | R/W | 00h | Enable Top of local Memory Decoding: 0 = Disable  1 = Enable Note: If bit 3 is enabled, then the LMEM# input pin is ignored; otherwise an external LMEM# is used to decide if the access for the current cycle is to local memory Bits  Top of  Bits  Top of 15:4  Memory  15:4  Memory 000h  1MB  03Fh  64MB 001h  2MB  :  : 002h  3MB  07Fh  128MB 003h  4MB  :  : :  :  0FFh  256MB 00Fh  16MB  :  : :  :  100h  Reserved 01Fh  32MB  :  : :  :  FFFh  Reserved |
| 2:0 | RO | 000 | Reserved Bits |
| Address Offset 44h | | | |
| 7:6 | R/W | 0 | Master Retry Timer: 7  6  Operation 0  0  Retries unmasked after 8 PCICLKs |

TABLE E2-continued

| Bit(s) | Type | Default | Function |
|---|---|---|---|
| | | | 0   1   Retries unmasked after 16 PCICLKs |
| | | | 1   0   Retries unmasked after 32 PCICLKs |
| | | | 1   1   Retries unmasked after 64 PCICLKs |
| 5:4 | RO | 00 | Reserved Bits |
| 3 | R/W | 0 | LMEM#/LDEV# sampling point select for PCI master cycle:<br>0 = 1 PCI clock after FRAME#<br>1 = 2 PCI clocks after FRAME# |
| 2 | RO | 0 | Reserved Bit |
| 1 | R/W | 0 | Enable Read Shadowed RAM for F0000h–FFFFFh Block:<br>0 = Disable<br>1 = Enable |
| 0 | R/W | 0 | Enable Write Shadowed RAM for F0000h–FFFFFh Block:<br>0 = Disable<br>1 = Enable |

Address Offset 45h

| Bit(s) | Type | Default | Function |
|---|---|---|---|
| 7 | R/W | 0 | Enable Read Shadowed RAM for EC000h–EFFFFh Block:<br>0 = Disable    1 = Enable |
| 6 | R/W | 0 | Enable Read Shadowed RAM for E8000h–EBFFFh Block:<br>0 = Disable    1 = Enable |
| 5 | R/W | 0 | Enable Read Shadowed RAM for E4000h–E7FFFh Block:<br>0 = Disable    1 = Enable |
| 4 | R/W | 0 | Enable Read Shadowed RAM for E0000h–E3FFFh Block:<br>0 = Disable    1 = Enable |
| 3 | R/W | 0 | Enable Write Shadowed RAM for EC000h–EFFFFh Block:<br>0 = Disable    1 = Enable |
| 2 | R/W | 0 | Enable Write Shadowed RAM for E8000h–EBFFFh Block:<br>0 = Disable    1 = Enable |
| 1 | R/W | D | Enable Write Shadowed RAM for E4000h–E7FFFh Block:<br>0 = Disable    1 = Enable |
| 0 | R/W | 0 | Enable Write Shadowed RAM for E0000h–E3FFFh Block:<br>0 = Disable    1 = Enable |

Address Offset 46h

| Bit(s) | Type | Default | Function |
|---|---|---|---|
| 7 | R/W | 0 | Enable Read Shadowed RAM for DC000h–DFFFFh Block:<br>0 = Disable    1 = Enable |
| 6 | R/W | 0 | Enable Read Shadowed RAM for D8000h–DBFFFh Block:<br>0 = Disable    1 = Enable |
| 5 | R/W | 0 | Enable Read Shadowed RAM for D4000h–D7FFFh Block:<br>0 = Disable    1 = Enable |
| 4 | R/W | 0 | Enable Read Shadowed RAM for D0000h–D3FFFh Block:<br>0 = Disable    1 = Enable |
| 3 | R/W | 0 | Enable Write Shadowed RAM for DC000h–DFFFFh Block:<br>0 = Disable    1 = Enable |
| 2 | R/W | 0 | Enable Write Shadowed RAM for D8000h–DBFFFh Block:<br>0 = Disable    1 = Enable |
| 1 | R/W | 0 | Enable Write Shadowed RAM for D4000h–D7FFFh Block:<br>0 = Disable    1 = Enable |
| 0 | R/W | 0 | Enable Write Shadowed RAM for D0000h–D3FFFh Block:<br>0 = Disable    1 = Enable |

Address Offset 47h

| Bit(s) | Type | Default | Function |
|---|---|---|---|
| 7 | R/W | 0 | Enable Read Shadowed RAM for CC000h–CFFFFh Block:<br>0 = Disable    1 = Enable |
| 6 | R/W | 0 | Enable Read Shadowed RAM for C800h–CBFFFh Block:<br>0 = Disable    1 = Enable |
| 5 | R/W | 0 | Enable Read Shadowed RAM for C4000h–C7FFFh Block:<br>0 = Disable    1 = Enable |
| 4 | R/W | 0 | Enable Read Shadowed RAM for C0000h–C3FFFh Block:<br>0 = Disable    1 = Enable |
| 3 | R/W | 0 | Enable Write Shadowed RAM for CC000h–CFFFFh Block:<br>0 = Disable    1 = Enable |
| 2 | R/W | 0 | Enable Write Shadowed RAM for C8000h–CBFFFh Block:<br>0 = Disable    1 = Enable |
| 1 | R/W | 0 | Enable Write Shadowed RAM for C4000h–C7FFFh Block:<br>0 = Disable    1 = Enable |
| 0 | R/W | 0 | Enable Write Shadowed RAM for C0000h–C3FFFh Block:<br>0 = Disable    1 = Enable |

Note: Address offsets 48h–51h are meant for setting the local memory holes 0–3.

Address Offset 48h

| Bit(s) | Type | Default | Function |
|---|---|---|---|
| 7 | R/W | 0 | Enable Memory Hole 3:<br>0 = Disable    1 = Enable |
| 6:4 | R/W | 000 | Block Size for Memory Hole 3 |
| 3 | R/W | 0 | Enable Memory Hole 2:<br>0 = Disable    1 = Enable |
| 2:0 | R/W | 000 | Block Size for Memory Hole 2 |

Address Offset 49h

| Bit(s) | Type | Default | Function |
|---|---|---|---|
| 7 | R/W | 0 | Enable Memory Hole 1:<br>0 = Disable    1 = Enable |
| 6:4 | R/W | 00 | Block Size for Memory Hole 1 |
| 3 | R/W | 0 | Enable Memory Hole 0:<br>0 = Disable    1 = Enable |
| 2:0 | R/W | 0 | Block Size for Memory Hole 0: Block Size Definition<br>2  1  0    Size<br>0  0  0    64KB<br>0  0  1    128KB<br>0  1  0    256KB<br>0  1  1    512KB<br>1  0  0    1MB<br>1  0  1    2MB<br>1  1  0    4MB<br>1  1  1    8MB |

Address Offset 4Ah–4Bh

| Bit(s) | Type | Default | Function |
|---|---|---|---|
| 15:0 | R/W | 0000h | A[31:16] for Starting Address of Memory Hole 2 |

Address Offset 4Ch–4Dh

| Bit(s) | Type | Default | Function |
|---|---|---|---|
| 15:0 | R/W | 0000h | A[31:16] for Starting Address of Memory Hole 2 |

Address Offset 4Eh–4Fh

| Bit(s) | Type | Default | Function |
|---|---|---|---|
| 15:0 | R/W | 0000h | A[31:16] for Starting Address of Memory Hole 1 |

Address Offset 50h–51h

| Bit(s) | Type | Default | Function |
|---|---|---|---|
| 15:0 | R/W | D000h | A[31:16] for Starting Address of Memory Hole 0 |

Address Offset 52h

| Bit(s) | Type | Default | Function |
|---|---|---|---|
| 7 | R/W | 0 | DMA/ISA Bus Master to PCI Bus Slave Access Enable:<br>0 = Disable    1 = Enable |
| 6 | R/W | 0 | Enable Write Buffers from Host Bus to PCI Bus:<br>0 = Disable    1 = Enable |
| 5 | R/W | 0 | Enable Write Buffers from PCI Bus to Host Bus:<br>0 = Disable    1 = Enable |
| 4 | R/W | 0 | Disable NMI Generation Globally:<br>0 = Disable    1 = Enable |
| 3 | R/W | 0 | Enable SERR# Generation for Target Abort:<br>0 = Disable    1 = Enable |
| 2 | R/W | 1 | Fast Back-to-Back Capable:<br>1 = Enable    0 = Disable<br>Note: The change on this bit will reflect on bit 7 of the register in address offset 06h. |

TABLE E2-continued

| Bit(s) | Type | Default | Function |
|---|---|---|---|
| 1:0 | R/W | 10 | Subtractive Decoding Sample Point:<br>1  0  Operation<br>0  0  Fast sample point<br>0  1  Typical sample point<br>1  0  Slow sample point |

Address Offset 53h

| Bit(s) | Type | Default | Function |
|---|---|---|---|
| 7 | R/W | 1 | PCI Bus Clock Synchronous to System Clock Enable:<br>1 = Asynchronous   0 = Synchronous<br>Clock   Clock |
| 6 | R/W | 0 | Host-to-PCI Bus FIFO Wait State:<br>0 = No Wait   1 = One Wait |
| 5 | R/W | 0 | Conversion of PERR# to SERR# Enable:<br>0 = Disable   1 = Enable |
| 4 | R/W | 1 | Enable Address Parity Checking:<br>1 = Enable   0 = Disable |
| 3 | R/W | 0 | Enable Conversion of PCI Shared Interrupts to ISA Edge Triggered Interrupts:<br>0 = Disable   1 = Enable |
| 2 | R/W | 0 | Expansion Bus Selection:<br>0 = ISA bus   1 = EISA |
| 1 | R/W | 0 | PCI Bus Burst Cycle Enable:<br>0 = Disable   1 = Enable |
| 0 | R/W | 0 | Host Bus to PCI Bus Post Write Enable:<br>0 = Disable   1 = Enable |

Address Offset 54h–57h

| Bit(s) | Type | Default | Function |
|---|---|---|---|
| 31:8 | R/W | 000000h | A[31:8] for Starting Address of General Purpose decode Block 3 for PCI Address space |
| 7:2 | R/W | 0000 00 | A[7:2] for Starting Address of General Purpose decode Block 3 for PCI Address Space |
| 1 | R/W | 0 | Enable Block 3 Decoding Function:<br>0 = Disable   1 = Enable |
| 0 | R/W | 0 | Memory or I/O Space Indicator for Block 3:<br>0 = Memory Space   = I/O Space<br>Note: If bit 0 = 0, then A[3:2] are ignored on decoding. |

Address Offset 58h–5Bh

| Bit(s) | Type | Default | Function |
|---|---|---|---|
| 31:8 | R/W | 000000h | A[31:8] for Ending Address of General Purpose decode Block 3 for PCI Address Space |
| 7:2 | R/W | 0000 00 | A[7:2] for Ending Address of General Purpose decode Block 3 for PCI Address Space |
| 1:0 | RO | 00 | Reserved Bits |

Address Offset 5Ch–5Fh

| Bit(s) | Type | Default | Function |
|---|---|---|---|
| 31:8 | R/W | 000000h | A[31:8] for Starting Address of General Purpose decode Block 2 for PCI Address Space |
| 7:2 | R/W | 0000 00 | A[7:2] for Starting Address of General Purpose decode Block 2 for PCI Address Space |
| 1 | R/W | 0 | Enable Block 2 Decoding Function:<br>0 = Disable   1 = Enable |
| 0 | R/W | 0 | Memory or I/O Space Indicator for Block 2:<br>0 = Memory Space   1 = I/O Space<br>Note: If bit 0 = 0, then A[3:2] are ignored on decoding. |

Address Offset 60h–63h

| Bit(s) | Type | Default | Function |
|---|---|---|---|
| 31:8 | R/W | 000000h | A[31:8] for Ending Address of General Purpose decode Block 2 for PCI Address Space |
| 7:2 | R/W | 0000 00 | A[7:2] for Ending Address of General Purpose decode Block 2 for PCI Address Space |
| 1:0 | RO | 00 | Reserved Bits |

Address Offset 64h–67h

| Bit(s) | Type | Default | Function |
|---|---|---|---|
| 31:8 | R/W | 000000h | A[31:8] for Starting Address of General Purpose decode Block 1 for PCI Address Space |
| 7:2 | R/W | 0000 00 | A[7:2] for Starting Address of General Purpose decode Block 1 for PCI Address Space |
| 1 | R/W | 0 | Enable Block 1 Decoding Function:<br>0 = Disable   1 = Enable |
| 0 | R/W | 0 | Memory or I/O Space Indicator for Block 1:<br>0 = Memory Space   1 = I/O Space<br>Note: If bit 0 = 0, then A[3:2] are ignored on decoding. |

Address Offset 68h–6bh

| Bit(s) | Type | Default | Function |
|---|---|---|---|
| 31:8 | R/W | 000000h | A[31:8] for Ending Address of General Purpose decode Block 1 for PCI Address Space |
| 7:2 | R/W | 0000 00 | A[7:2] for Ending Address of General Purpose decode Block 1 for PCI Address Space |
| 1:0 | RO | 00 | Reserved Bits |

Address Offset 6Ch–6Fh

| Bit(s) | Type | Default | Function |
|---|---|---|---|
| 31:8 | R/W | 000000h | A[31:8] for Starting Address of General Purpose decode Block 0 for PCI Address Space |
| 7:2 | R/W | 0000 00 | A[7:2] for Starting Address of General Purpose decode Block 0 for PCI Address Space |
| 1 | R/W | 0 | Enable Block 0 Decoding Function:<br>0 = Disable   1 = Enable |
| 0 | R/W | 0 | Memory or I/O Space Indicator for Block 0:<br>0 = Memory Space   1 = I/O Space<br>Note: If bit 0 = 0, then A[3:2] are ignored on decoding. |

Address Offset 70h–73h

| Bit(s) | Type | Default | Function |
|---|---|---|---|
| 31:8 | R/W | 000000h | A[31:8] for Ending Address of General Purpose decode Block 0 for PCI Address Space |
| 7:2 | R/W | 0000 00 | A[7:2] for Ending Address of General Purpose decode Block 0 for PCI Address Space |
| 1:0 | RO | 00 | Reserved Bits |

Address Offset 74h

| Bit(s) | Type | Default | Function |
|---|---|---|---|
| 7 | R/W | 0 | PCI Bus Master to Host Memory Burst cycle Enable:<br>0 = Disable   1 = Enable |
| 6 | R/W | 0 | Enable I/O Port 3F7h Write at ISA Bus:<br>0 = Disable   1 = Enable |
| 5 | R/W | 0 | Enable I/O Port 3F7h Read at ISA Bus:<br>0 = Disable   1 = Enable |
| 4 | R/W | 0 | Enable I/O Port 377h Write at ISA Bus:<br>0 = Disable   1 = Enable |
| 3 | R/W | 0 | Enable I/O Port 377h Read at ISA Bus:<br>0 = Disable   1 = Enable |
| 2:0 | RO | 000 | Reserved Bits |

Address Offset 75h

| Bit(s) | Type | Default | Function |
|---|---|---|---|
| 7 | R/W | 0 | Enable E6000h–EFFFFh Memory Block for ROMCS#:<br>0 = Disable   1 = Enable |
| 6 | R/W | 0 | Enable E0000h–E7FFFh Memory Block for ROMCS#:<br>0 = Disable   1 = Enable |
| 5 | R/W | 0 | Enable DC000h–DFFFFh Memory Block for NVMCS#:<br>0 = Disable   1 = Enable |
| 4 | R/W | 0 | Enable D8000h–DBFFFh Memory Block for NVMCS#:<br>0 = Disable   1 = Enable |
| 3 | R/W | 0 | Enable D4000h–D7FFFh Memory Block for NVMCS#:<br>0 = Disable   1 = Enable |
| 2 | R/W | 0 | Enable D0000h–D3FFFh Memory Block for NVMCS#:<br>0 = Disable   1 = Enable |
| 1 | R/W | 0 | Enable CC000h–CFFFFh Memory Block for NVMCS#:<br>0 = Disable   1 = Enable |
| 0 | R/W | 0 | Enable C8000h–CBFFFh Memory Block for NVMCS#:<br>0 = Disable   1 = Enable |

Address Offset 76h

| Bit(s) | Type | Default | Function |
|---|---|---|---|
| 7 | R/W | 0 | Enable Serial Port 1 at ISA Bus (Address Decoded 3F6h–3FFh):<br>0 = Disable   1 = Enable |
| 6 | R/W | 0 | Enable Serial Port 2 at ISA Bus (Address Decoded 2F8h–2FFh):<br>0 = Disable   1 = Enable |
| 5 | R/W | 0 | Enable Parallel Port 1 at ISA Bus (Address Decoded 3BCh–3BFh):<br>0 = Disable   1 = Enable |

TABLE E2-continued

| Bit(s) | Type | Default | Function |
|---|---|---|---|
| 4 | R/W | 0 | Enable Parallel Port 2 at ISA Bus (Address Decoded 378h–37Fh): 0 = Disable  1 = Enable |
| 3 | R/W | 0 | Enable Parallel Port 3 at ISA Bus (Address Decoded 278h–27Fh): 0 = Disable  1 = Enable |
| 2 | R/W | 0 | Enable Primary Floppy Disk at ISA Bus (Address decoded 3F0h–3F5h): 0 = Disable  1 = Enable |
| 1 | R/W | 0 | Enable Secondary Floppy Disk at ISA Bus (Address Decoded 370h–375h): 0 = Disable  1 = Enable |
| 0 | R/W | 0 | Enable VGA Palette Snooping at ISA Bus (Address Decoded 3C6h–3C9h Write Cycle): 0 = Disable  1 = Enable |

Address Offset 77h

| Bit(s) | Type | Default | Function |
|---|---|---|---|
| 7 | R/W | 0 | Enable Primary IDE at ISA Bus (Address Decoded IF0h–IF7h, 3F6h): 0 = Disable  1 = Enable |
| 6 | R/W | 0 | Enable Secondary IDE at ISA Bus (Address Decoded 170h–177h, 376h): 0 = Disable  1 = Enable |
| 5 | R/W | 0 | Enable VGA at ISA Bus (Address Decoded 3C0h–3CFh, 3B4h–3B5h, 3BAh, 3D4h–3D5h and 3DAh): 0 = Disable  1 = Enable |
| 4:3 | R/W | 00 | Reserved Bits |
| 2 | R/W | 0 | Enable System Board Controllers and I/O Address Range for EISA System (Address Decoded 0400h–04FFh, 0800h–08FFh, excluding 0C00h–0CFFh due to the overlap with CF8h and CFCh in PCI configuration read/write): 0 = Disable  1 = Enable |
| 1 | R/W | 0 | Enable System Board I/O Address Range for ISA/EISA System (Address Decoded 000h–0FFh): 0 = Disable  1 = Enable |
| 0 | R/W | 0 | Enable F0000h to FFFFFh Memory Block at ISA Bus: 0 = Disable  1 = Enable |

Address Offset 78h

| Bit(s) | Type | Default | Function |
|---|---|---|---|
| 7 | R/W | 0 | Enable EC600h–EFFFFh Memory Block at ISA Bus: 0 = Disable  1 = Enable |
| 6 | R/W | 0 | Enable E8000h–EBFFFh Memory Block at ISA Bus: 0 = Disable  1 = Enable |
| 5 | R/W | 0 | Enable E4000h–E7FFFh Memory Block at ISA Bus: 0 = Disable  1 =0 Enable |
| 4 | R/W | 00 | Enable E0000h–E3FFFh Memory Block at ISA Bus: 0 = Disable  1 = Enable |
| 3 | R/W | 00 | Enable DC000h–DFFFFh Memory Block at ISA Bus: 0 = Disable  1 = Enable |
| 2 | R/W | 0 | Enable D8000h–DBFFFh Memory Block at ISA Bus: 0 = Disable  1 = Enable |
| 1 | R/W | 0 | Enable D4000h–D7FFFh Memory Block at ISA Bus: 0 = Disable  1 = Enable |
| 0 | R/W | 0 | Enable D0000h–D3FFFh Memory Block at ISA Bus: 0 = Disable  1 = Enable |

Address Offset 79h

| Bit(s) | Type | Default | Function |
|---|---|---|---|
| 7 | R/W | 0 | Enable CC000h–CFFFFh Memory Block at ISA Bus: 0 = Disable  1 = Enable |
| 6 | R/W | 0 | Enable C8000h–CBFFFh Memory Block at ISA Bus: 0 = Disable  1 = Enable |
| 5 | R/W | 0 | Enable C4000h–C7FFFh Memory Block at ISA Bus: 0 = Disable  1 = Enable |
| 4 | R/W | 00 | Enable C0000h–C3FFFh Memory Block at ISA Bus: 0 = Disable  1 = Enable |
| 3 | R/W | 00 | Enable A0000h–AFFFFh Memory Block at ISA Bus: 0 = Disable  1 = Enable |
| 2 | R/W | 0 | Enable B0000h–BFFFFh Memory Block at ISA Bus: 0 = Disable  1 = Enable |
| 1:0 | RO | 00 | Reserved Bits |

Note: Offsets 7Ah–87h are for positive decode blocks of ISA bus memory and I/O.

Address Offset 7Ah

| Bit(s) | Type | Default | Function |
|---|---|---|---|
| 7 | R/W | 0 | Enable Memory Space 1 at ISA Bus: 0 = Disable  1 = Enable |
| 6:4 | R/W | 00 | Block Size for Memory Space 1 |
| 3 | R/W | 0 | Enable Memory Space 2 at ISA Bus: 0 = Disable  1 = Enable |
| 2:0 | R/W | 0 | Block Size for Memory Space 2: Block Size Definition<br>2 1 0  Size<br>0 0 0  64KB<br>0 0 1  128KB<br>0 1 D  526KB<br>0 1 1  512KB<br>1 0 0  1MB<br>1 0 1  2MB<br>1 1 0  4MB<br>1 1 1  8MB |

Address Offset 7Bh–7Ch

| Bit(s) | Type | Default | Function |
|---|---|---|---|
| 15:0 | R/W | 00h | A[31:8] for Starting Address of Memory Space 1 |

Address Offset TDh–7Eh

| Bit(s) | Type | Default | Function |
|---|---|---|---|
| 15:0 | R/W | 00h | A[31:8] for Starting Address of Memory Space 2 |

Address Offset 7Fh

| Bit(s) | Type | Default | Function |
|---|---|---|---|
| 7:2 | RO | 0000 00 | Reserved Bits |
| 1 | R/W | 0 | Enable I/D Space 1 at ISA Bus: 0 = Disable  1 = Enable |
| 0 | R/W | 0 | Enable I/O Space 2 at ISA Bus: 0 = Disable  1 = Enable |

Address Offset 80h–81h

| Bit(s) | Type | Default | Function |
|---|---|---|---|
| 15:0 | R/W | 0000h | A[15:0] for Comparison of I/O Space 1 |

Address Offset 82h–83h

| Bit(s) | Type | Default | Function |
|---|---|---|---|
| 15:8 | RO | 0000 0000 | Reserved Bits |
| 7:0 | R/W | 0000 0000 | A[7:0] for Masking of I/O Space 1 |

Address Offset 84h–85h

| Bit(s) | Type | Default | Function |
|---|---|---|---|
| 15:0 | R/W | 0000h | A[15:0] for Comparison of I/O Space 2 |

Address Offset 86h–87h

| Bit(s) | Type | Default | Function |
|---|---|---|---|
| 15:8 | RO | 0000 0000 | Reserved Bits |
| 7:0 | R/W | 0000 0000 | A[7:0] for Masking of I/O Space 2 |

Note: Offsets 88h–8Fh are for PCI interrupt to ISA interrupt mapping.

Address Offset 88h–8Bh

| Bit(s) | Type | Default | Function |
|---|---|---|---|
| 31:28 | R/W | 0000 | Selects which IRQ signal is to be generated when PCI Interrupt Request A2 has been triggered. |
| 27:24 | R/W | 0000 | Selects which IRQ signal is to be generated when PCI Interrupt Request B2 has been triggered. |
| 23:20 | R/W | 0000 | Selects which IRQ signal is to be generated when PCI Interrupt Request C2 has been triggered. |
| 19:16 | R/W | 0000 | Selects which IRQ signal is to be generated when PCI Interrupt Request D2 has been triggered. |
| 15:12 | R/W | 0000 | Selects which IRQ signal is to be generated when PCI Interrupt Request A1 has been triggered. |

TABLE E2-continued

| Bit(s) | Type | Default | Function |
|---|---|---|---|
| 11:8 | R/W | 0000 | Selects which IRQ signal is to be generated when PCI Interrupt Request B1 has been triggered. |
| 7:4 | R/W | 0000 | Selects which IRQ signal is to be generated when PCI Interrupt Request C1 has been triggered. |
| 3:0 | R/W | 0000 | Selects which IRQ signal is to be generated when PCI Interrupt Request D1 has been triggered. |

Address Offset 8Ch–8Fh

| Bit(s) | Type | Default | Function |
|---|---|---|---|
| 31:28 | R/W | 0000 | Selects which IRQ signal is to be generated when PCI Interrupt Request A4 has been triggered. |
| 27:24 | R/W | 0000 | Selects which IRQ signal is to be generated when PCI Interrupt Request B4 has been triggered. |
| 23:20 | R/W | 0000 | Selects which IRQ signal is to be generated when PCI Interrupt Request C4 has been triggered. |
| 19:16 | R/W | 0000 | Selects which IRQ signal is to be generated when PCI Interrupt Request D4 has been triggered. |
| 15:12 | R/W | 0000 | Selects which IRQ signal is to be generated when PCI Interrupt Request A3 has been triggered. |
| 11:8 | R/W | 0000 | Selects which IRQ signal is to be generated when PCI Interrupt Request B3 has been triggered. |
| 7:4 | R/W | 0000 | Selects which IRQ signal is to be generated when PCI Interrupt Request C3 has been triggered. |
| 3:0 | R/W | 0000 | Selects which IRQ signal is to be generated when PCI Interrupt Request D3 has been triggered. |

Routing Definition:

| Routing | Definition |
|---|---|
| 0000 | Disabled |
| 0001 | IRQ5: flow through mode |
| 0010 | IRQ9: flow through mode |
| 0011 | IRQ10: flow through mode |
| 0100 | IRQ11: flow through mode |
| 0101 | IRQ12: flow through mode |
| 0110 | IRQ14: flow through mode |
| 0111 | IRQ15: flow through mode |
| 1000 | Disabled |
| 1001 | IRQ5: level |
| 1010 | IRQ9: level |
| 1011 | IRQ10: level |
| 1100 | IRQ11: level |
| 1101 | IRQ12: level |
| 1110 | IRQ14: level |
| 1111 | IRQ15: level |

Port Address 70h

| Bit(s) | Type | Default | Function |
|---|---|---|---|
| 7 | WO | 1 | Enable NMI: 1 = Disable  0 = Enable |
| 6:0 | RO | 0000 000 | Reserved Bits |

We claim:

1. A method for bridging a first bus (VL-bus) cycle to a second bus (PCI-bus), in a system including a first bus (VL-bus) having first bus cycle definition lines (e.g. R/W#, M/IO#, D/C#, VA, BE#) and a first bus device claiming signal line (LDEV0#), said system further including said second bus (PCI-bus) and a third bus (system bus), said second bus having cycle definition lines (e.g. C/BE#, FRAME#) and a second bus device claiming line (DEVSEL#), for use with a first bus (VL-bus) host (102) defining said first bus cycle by asserting first bus cycle definition signals on said first bus cycle definition lines (e.g. R/W#, M/IO#, D/C#, VA, BE#), said first bus host further having a back-off input line (BOFF#) and repeating said first bus cycle after detecting assertion of a back-off signal on said back-off input line, for use further with a first-bus/third-bus (VL-bus/system-bus) bridge coupled to receive said first bus cycle definition signals, said first-bus/third-bus bridge defining a cycle on said third bus in response to certain combinations of said first bus cycle definition signals only if no first bus device claiming signal (LDEV0#) is asserted before a predetermined first bus device claiming deadline following detection by said first-bus/third-bus bridge of an asserted first bus cycle start signal (ADS#) (e.g. R/W#, M/IO#, D/C#, VA, BE#), said method comprising the steps of:

asserting said first bus device claiming signal (LDEV0#) prior to said first bus device claiming deadline, in response to a first assertion of said first bus cycle start signal (ADS#), at the time of which the signals on said first bus cycle definition lines (e.g. R/W#, M/IO#, D/C#, VA, BE#), being a first valid first bus cycle definition, are within a predetermined set of first bus cycle definitions;

defining a cycle on said second bus (PCI-bus) in response to said first assertion of said first bus cycle start signal (ADS#) by asserting second bus cycle definition signals on said second bus cycle definition lines (e.g. C/BE#, FRAME#); and asserting said back-off signal (BOFF#) if no second bus device claiming signal (DEVSEL#) is asserted before a predetermined second bus device claiming deadline following said assertion of second bus cycle definition signals on said second bus cycle definition lines.

2. A method according to claim 1, wherein said first bus is a VL-bus, said second bus is a PCI-bus and said third bus is an IBM PC/AT-compatible system bus.

3. A method according to claim 2, wherein said system bus comprises in combination an X-bus and a bus selected from the group consisting of an ISA-bus and an EISA-bus.

4. A method according to claim 2, wherein said first bus cycle definition lines include R/W#, M/IO#, D/C#, VA and BE# signal lines, and wherein said second bus cycle definition lines include C/BE# and FRAME#.

5. A method according to claim 1, wherein said first bus host comprises at least one element selected from the group consisting of a CPU, a cache memory controller and a bridge bridging said first bus (VL-bus) with a fourth bus (host-bus) different from said first, second and third buses.

6. A method according to claim 1, for use with at least one first bus device each coupled to receive said first bus cycle definition lines (e.g. R/W#, M/IO#, D/C#, VA, BE#) and having a respective first bus device claiming output (LDEV<x>#), further comprising the step of asserting said first bus device claiming signal (LDEV0#) in response to assertion of one of said first bus device claiming outputs (LDEV(x)#).

7. A method according to claim 1, wherein said predetermined set of first bus cycle definitions excludes all first bus cycles which match a programmable indication of first bus cycles intended for devices on said first bus (VL-bus), further comprising, prior to said step of asserting said first bus device claiming signal (LDEV0#), the step of comparing said first valid first bus cycle definition signals with said programmable indication of first bus cycles intended for devices on said first bus.

8. A method according to claim 1, wherein said predetermined set of first bus cycle definitions excludes all first bus cycles which match a programmable indication of first bus cycles intended for devices on said third bus (system bus), further comprising, prior to said step of asserting said first bus device claiming signal (LDEVO#), the step of comparing said first bus cycle definition signals with said programmable indication of first bus cycles intended for devices on said third bus.

9. A method according to claim 1, wherein said predetermined set of first bus cycle definitions excludes all first bus cycles which match a predefined indication of first bus cycles not intended for devices on said second bus (PCI-bus), further comprising, prior to said step of asserting said first bus device claiming signal (LDEVO#), the step of comparing said first valid first bus cycle definition signals with said indication of first bus cycles not intended for devices on said second bus.

10. A method according to claim 1, wherein said first bus host comprises a first-bus/fourth-bus bridge bridging said first bus with a fourth bus (host bus) different from said first, second and third buses, said first-bus/fourth-bus bridge defining a plurality of said first bus (VL-bus) cycles in response to each fourth bus (host-bus) cycle detected by said first-bus/fourth-bus bridge on said fourth bus, further comprising the step of asserting said first bus device claiming signal (LDEVO#) prior to said first bus device claiming deadline, in response to each assertion of said first-bus cycle start signal prior to said first assertion of said cycle start signal, and at the time of which the signals on said first bus (VL-bus) cycle definition lines (e.g. R/W#, M/IO#, D/C#, VA, BE#), are within a predetermined set of first bus cycle definitions.

11. A method according to claim 1, further comprising the steps of:

after assertion of said back-off signal in said step of asserting said back-off signal, in response to a second assertion of said first bus cycle start signal (ADS#), determining whether a second valid first bus cycle definition then asserted on said first bus (VL-bus) cycle definition lines is a repetition of said first valid first bus cycle definition;

asserting said first bus device claiming signal (LDEVO#) prior to said first bus device claiming deadline, in response to said second assertion of said first bus cycle start signal, only if said second valid first bus cycle definition is not a repetition of said first valid first bus cycle definition; and defining a cycle on said second bus (PCI-bus) in response to said second assertion of first bus cycle start signal by asserting second bus cycle definition signals on said second bus cycle definition lines (e.g. C/BE#, FRAME#), only if said second valid first bus cycle definition is not a repetition of said first valid first bus cycle definition and only if said second valid first bus cycle definition is within said predetermined set of first bus cycle definitions.

12. A method according to claim 11, wherein said first bus host comprises a first-bus/fourth-bus bridge bridging said first bus with a fourth bus (host bus) different from said first, second and third buses, said first-bus/fourth-bus bridge defining a plurality of said first bus (VL-bus) cycles in response to each fourth bus (host-bus) cycle detected by said first-bus/fourth-bus bridge on said fourth bus, wherein said step of asserting said first bus device claiming signal (LDEVO#) in response to said second assertion of said first bus cycle start signal, asserts said first bus device claiming signal (LDEVO#) in response to said second assertion of said first bus cycle start signal only if said second valid first bus cycle definition is not one of the plurality of first bus (VL-bus) cycles defined by said first-bus/fourth-bus bridge which includes said repetition of said first valid first bus cycle definition.

13. A method according to claim 1, wherein said first bus (VL-bus) host (102) after asserting a first bus cycle start signal, withholds further assertions of said first bus cycle start signal until after detection by said first bus host (102) of a first bus (VL-bus) ready return signal (e.g. RDYRTN#), said first-bus/third-bus (VL-bus/system-bus) bridge asserting said ready return signal (e.g. RDYRTN#) in response to detection by said first-bus/third-bus (VL-bus/system-bus) bridge of a first bus (VL-bus) device ready signal (e.g. LRDY#), further comprising the step of asserting said first bus device ready signal (e.g. LRDY#) if no second bus device claiming signal (DEVSEL#) is asserted before said predetermined second bus device claiming deadline following said assertion of second bus cycle definition signals on said second bus cycle definition lines.

14. A method according to claim 13, wherein said back-off signal (BOFF#) is asserted in said step of asserting said back-off signal, before said first bus device ready signal (e.g. LRDY#) is asserted in said step of asserting said first bus device ready signal, further comprising the steps of:

unasserting said first bus device ready signal (LRDY#); and subsequently unasserting said back-off signal (BOFF#).

15. A method according to claim 14, further comprising the step of unasserting said first bus device claiming signal (LDEVO#) after detection of said first bus ready return signal (e.g. RDYRTN#) asserted.

16. A method for responding to a first bus (VL-bus) cycle, for use with a first bus (VL-bus) host (102) defining said first bus cycle by asserting first bus cycle definition signals on first bus cycle definition lines (e.g. R/W#, M/IO#, D/C#, VA, BE#) and asserting a first bus cycle start signal (ADS#), said first bus host withholding any further assertion of said first bus cycle start signal until detecting a first bus (VL-bus) ready signal (RDYRTN#) subsequent to said assertion of first bus cycle start signal, or a first bus back-off (BOFF#) signal, whichever occurs earlier, said first bus host repeating said first bus cycle after detecting said back-off signal (BOFF#), for use further with a first bus controller which asserts said first bus ready signal (RDYRTN#) in response to detecting assertion of a local device ready signal (LRDY#), comprising, after assertion by said first bus host of a given first bus cycle start signal and no later than any assertion of said first bus start signal subsequent to said given first bus cycle start signal, the steps of:

asserting said back-off signal (BOFF#) in response to a first clock pulse;

asserting said local device ready signal (LRDY#) in response to a second clock pulse after said first clock pulse;

negating said local device ready signal (LRDY#) in response to a third clock pulse after said second clock pulse; and negating said back-off signal (BOFF#) in response to a fourth clock pulse after said third clock pulse.

17. A method according to claim 16, further comprising the step of detecting said first bus ready signal (RDYRTN#) no later than said step of negating said back-off signal (BOFF#).

18. A method according to claim 16, for use further with a first-bus/third-bus (VL-bus/system-bus) bridge coupled to receive said first bus cycle definition signals, said first-bus/third-bus bridge defining a cycle on said third bus in response to certain combinations of said first bus cycle definition signals only if said first-bus/third-bus bridge fails to detect a first bus device claiming signal (LDEVO#) before a predetermined first bus device claiming deadline following detection by said first-bus/third-bus bridge of an asserted first bus cycle start signal(ADS#), further comprising the steps of:

asserting said first bus device claiming signal (LDEVO#) before said first bus device claiming deadline in response to detecting said given first bus cycle start signal, and before said step of asserting said back-off signal (BOFF#); and negating said first bus device claiming signal (LDEVO#) no earlier than said step of negating said local device ready signal (LRDY#).

19. A method for bridging a first bus (VL-bus) cycle to a second bus (PCI-bus), in a system including a first bus (VL-bus) having first bus cycle definition lines (e.g. R/W#, M/IO#, D/C#, VA, BE#), said system further including said second bus (PCI-bus), said second bus having second bus cycle definition lines (e.g. C/BE#, FRAME#), for use with a first bus (VL-bus) master (102) defining said first bus cycle by asserting first bus cycle definition signals on said first bus cycle definition lines (e.g. R/W#, M/IO#, D/C#, VA, BE#), said first bus master further having a back-off input line (BOFF#) which causes said first bus master to repeat said first bus cycle after detecting assertion of a back-off signal on said back-off input line, said method comprising the steps of:

defining a cycle on said second bus (PCI-bus) in response to a first assertion of said first bus cycle start signal (ADS#) by asserting second bus cycle definition signals on said second bus cycle definition lines (e.g. C/BE#, FRAME#); and asserting said back-off signal (BOFF#) in response to a predefined event occurring on said second bus (PCI-bus) in response to said assertion of second bus cycle definition signals on said second bus cycle definition lines.

20. A method according to claim 19, wherein said predefined event is defined at least in part by expiration of a predefined time period that begins in response to said assertion of second bus cycle definition signals on said second bus cycle definition lines.

21. A method according to claim 20, wherein said predefined event is defined further by non-detection of a predefined signal before expiration of said predefined time period.

22. A method according to claim 19, wherein said predefined event occurs on said second bus without any intervening event occurring on said second bus in response to said assertion of second bus cycle definition signals on said second bus cycle definition lines.

23. A method according to claim 19, wherein said second bus further has a second bus device claiming signal line (DEVSEL#), and wherein said predefined event is defined at least in part by non-assertion of a second bus device claiming signal on said second bus device claiming signal line (DEVSEL#) before a predetermined second bus device claiming deadline following said assertion of second bus cycle definition signals on said second bus cycle definition lines.

24. A method according to claim 23, wherein said first bus further has a first bus device claiming signal line (LDEVO#), and wherein at the time of said first assertion of said first bus cycle start signal (ADS#) the signals on said first bus cycle definition lines (e.g. R/W#, M/IO#, D/C#, VA, BE#) are within a predetermined set of first bus cycle definitions, for use further with a third bus (system bus) and a first-bus/third-bus (VL-bus/system-bus) bridge coupled to receive said first bus cycle definition signals, said first-bus/third-bus bridge defining a cycle on said third bus in response to certain combinations of said first bus cycle definition signals only if no first bus device claiming signal (LDEVO#) is asserted before a predetermined first bus device claiming deadline following detection by said first-bus/third-bus bridge of an asserted first bus cycle start signal (ADS#) (e.g. R/W#, M/IO#, D/C#, VA, BE#), further comprising the step of asserting said first bus device claiming signal (LDEVO#) prior to said first bus device claiming deadline, in response to said first assertion of said first bus cycle start signal (ADS#).

25. A method according to claim 19, wherein the signals on said first bus cycle definition lines at the time of said first assertion of said first bus cycle start signal (ADS#) define a first valid first bus cycle, further comprising the steps of:

after assertion of said back-off signal in said step of asserting said back-off signal, in response to a second assertion of said first bus cycle start signal (ADS#), determining whether a second valid first bus cycle defined by signals then asserted on said first bus (VL-bus) cycle definition lines is a repetition of said first valid first bus cycle; and defining a cycle on said second bus (PCI-bus) in response to said second assertion of first bus cycle start signal by asserting second bus cycle definition signals on said second bus cycle definition lines (e.g. C/BE#, FRAME#), only if said second valid first bus cycle is not a repetition of said first valid first bus cycle.

26. A method according to claim 19, for use further with a third bus (ISA bus) having third bus cycle definition lines, further comprising a step of defining a cycle on said third bus (ISA-bus) in dependence upon said first bus cycle, after said step of defining a cycle on said second bus (PCI-bus).

27. A method according to claim 26, wherein said step of defining a cycle on said third bus (ISA-bus) occurs after said step of asserting said back-off signal (BOFF#).

28. Apparatus for bridging a first bus (VL-bus) cycle to a second bus (PCI-bus), in a system including a first bus (VL-bus) having first bus cycle definition lines (e.g. R/W#, M/IO#, D/C#, VA, BE#), said system further including said second bus (PCI-bus), said second bus having second bus cycle definition lines (e.g. C/BE#, FRAME#), for use with a first bus (VL-bus) master (102) defining said first bus cycle by asserting first bus cycle definition signals on said first bus cycle definition lines (e.g. R/W#, M/IO#, D/C#, VA, BE#), said first bus master further having a back-off input line (BOFF#) and repeating said first bus cycle after detecting assertion of a back-off signal on said back-off input line, comprising:

second bus interface logic which defines a cycle on said second bus (PCI-bus) in response to a first assertion of said first bus cycle start signal (ADS#) by asserting second bus cycle definition signals on said second bus cycle definition lines (e.g. C/BE#, FRAME#); and first bus interface logic which asserts said back-off signal (BOFF#) in response to a predefined event occurring on said second bus (PCI-bus) in response to said assertion of second bus cycle definition signals on said second bus cycle definition lines.

29. Apparatus according to claim 28, wherein said second bus further has a second bus device claiming signal line (DEVSEL#), and wherein said predefined event is defined at least in part by non-assertion of a second bus device claiming signal on said second bus device claiming signal line (DEVSEL#) before a predetermined second bus device claiming deadline following said assertion of second bus cycle definition signals on said second bus cycle definition lines.

30. Apparatus according to claim 29, wherein said first bus further has a first bus device claiming signal line (LDEVO#), and wherein at the time of said first assertion of said first bus cycle start signal (ADS#) the signals on said first bus cycle definition lines (e.g. R/W#, M/IO#, D/C#, VA, BE#) are within a predetermined set of first bus cycle definitions, for use further with a third bus (system bus) and a first-bus/third-bus (VL-bus/system-bus) bridge coupled to receive said first bus cycle definition signals, said first-bus/third-bus bridge defining a cycle on said third bus in response to certain combinations of said first bus cycle definition signals only if no first bus device claiming signal (LDEVO#) is asserted before a predetermined first bus device claiming deadline following detection by said first-bus/third-bus bridge of an asserted first bus cycle start signal (ADS#) (e.g. R/W#, M/IO#, D/C#, VA, BE#), further comprising circuitry which asserts said first bus device claiming signal (LDEVO#) prior to said first bus device claiming deadline, in response to said first assertion of said first bus cycle start signal (ADS#).

31. Apparatus according to claim 28, wherein the signals on said first bus cycle definition lines at the time of said first assertion of said first bus cycle start signal (ADS#) define a first valid first bus cycle, further comprising a repetition detector which, after assertion of said back-off signal by said first bus interface logic in response to said predefined event, in response to a second assertion of said first bus cycle start signal (ADS#), determines whether a second valid first bus cycle defined by signals then asserted on said first bus (VL-bus) cycle definition lines is a repetition of said first valid first bus cycle, and wherein said second bus interface logic further defines a cycle on said second bus (PCI-bus) in response to said second assertion of first bus cycle start signal by asserting second bus cycle definition signals on said second bus cycle definition lines (e.g. C/BE#, FRAME#), only if said repetition detector determines that said second valid first bus cycle is not a repetition of said first valid first bus cycle.

32. Apparatus according to claim 28, for use further with a third bus (ISA bus) having third bus cycle definition lines, further comprising third bus interface logic which defines a cycle on said third bus (ISA-bus) in dependence upon said first bus cycle, after said second bus interface logic defines a cycle on said second bus (PCI-bus).

33. Apparatus according to claim 32, wherein said third bus interface logic defines said cycle on said third bus (ISA-bus) after said first bus interface logic asserts said back-off signal (BOFF#).

* * * * *